US012456449B2

(12) United States Patent
Oto et al.

(10) Patent No.: US 12,456,449 B2
(45) Date of Patent: Oct. 28, 2025

(54) ACTIVE NOISE CONTROL SYSTEM

(71) Applicants: NITTO DENKO CORPORATION, Ibaraki (JP); THE SCHOOL CORPORATION KANSAI UNIVERSITY, Suita (JP)

(72) Inventors: Kohei Oto, Osaka (JP); Yusuke Komoto, Osaka (JP); Ryohei Oban, Osaka (JP); Saori Yamamoto, Osaka (JP); Yoshinobu Kajikawa, Osaka (JP); Shun Hirose, Osaka (JP)

(73) Assignees: NITTO DENKO CORPORATION, Osaka (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 484 days.

(21) Appl. No.: 17/595,617

(22) PCT Filed: Apr. 2, 2020

(86) PCT No.: PCT/JP2020/015246
§ 371 (c)(1),
(2) Date: Nov. 19, 2021

(87) PCT Pub. No.: WO2020/235231
PCT Pub. Date: Nov. 26, 2020

(65) Prior Publication Data

US 2022/0223136 A1 Jul. 14, 2022

(30) Foreign Application Priority Data

May 20, 2019 (JP) ................................ 2019-094731

(51) Int. Cl.
*G10K 11/178* (2006.01)

(52) U.S. Cl.
CPC .. *G10K 11/17881* (2018.01); *G10K 11/17825* (2018.01); *G10K 11/17853* (2018.01); *G10K 11/17857* (2018.01)

(58) Field of Classification Search
CPC .................... G10K 2210/32291; H04R 17/005
See application file for complete search history.

(56) References Cited

U.S. PATENT DOCUMENTS 4,947,434 A * 8/1990 Ito .................... G10K 11/17857 381/71.7
5,117,463 A 5/1992 Oyaba et al.
(Continued)

FOREIGN PATENT DOCUMENTS

CN 1433661 A 7/2003
CN 1550625 A 12/2004
(Continued)

OTHER PUBLICATIONS

Machine translation of JPH0598926A, 5 pages. (Year: 1993).*
(Continued)

*Primary Examiner* — Ping Lee
(74) *Attorney, Agent, or Firm* — HSML P.C.

(57) ABSTRACT

A speaker (10) includes a radiation surface (15). The radiation surface (15) has a first region (15*a*), a second region (15*b*), and a third region (15*c*) between the first region (15*a*) and the second region (15*b*). When an axis passing through the third region (15*c*) and extending away from the radiation surface (15) is defined as a reference axis (10X), the speaker (10) forms a first wavefront (16*a*) propagating from the first region so as to approach the reference axis (10X) and a second wavefront (16*b*) propagating from the second region (15*b*) so as to approach the reference axis (10X).

5 Claims, 76 Drawing Sheets

(56) References Cited

U.S. PATENT DOCUMENTS

| | | | | |
|---|---|---|---|---|
| 5,828,760 | A * | 10/1998 | Jacobson ......... G10K 11/17857 381/71.11 |
| 2002/0015507 | A1 * | 2/2002 | Harris .................... H04R 7/045 381/431 |
| 2003/0002687 | A1 | 1/2003 | Raptopoulos et al. |
| 2005/0157890 | A1 | 7/2005 | Nakajima et al. |
| 2008/0144851 | A1 * | 6/2008 | Kim ................ G10K 11/17815 381/71.5 |
| 2009/0041258 | A1 | 2/2009 | Nakajima |
| 2009/0301805 | A1 | 12/2009 | Kakuhari |
| 2018/0064960 | A1 * | 3/2018 | Kim ....................... A61B 90/18 |
| 2018/0316995 | A1 | 11/2018 | Miyoshi |
| 2020/0206777 | A1 | 7/2020 | Suzuki et al. |
| 2020/0332518 | A1 | 10/2020 | Komoto et al. |

FOREIGN PATENT DOCUMENTS

| | | | | |
|---|---|---|---|---|
| CN | 111373472 | A | | 7/2020 |
| JP | H02222999 | A | | 9/1990 |
| JP | H0486898 | A | | 3/1992 |
| JP | H0598926 | A | * | 4/1993 |
| JP | H0756580 | A | | 3/1995 |
| JP | H0865787 | A | | 3/1996 |
| JP | H09281977 | A | | 10/1997 |
| JP | 2003066969 | A | | 3/2003 |
| JP | 2003514265 | A | | 4/2003 |
| JP | 2003253628 | A | | 9/2003 |
| JP | 2004004583 | | | 1/2004 |
| JP | 2004036299 | A | | 2/2004 |
| JP | 2004187410 | A | | 7/2004 |
| JP | 2005003777 | A | | 1/2005 |
| JP | 2006053503 | A | | 2/2006 |
| JP | 2010015552 | A | | 1/2010 |
| JP | 2010106537 | A | | 5/2010 |
| JP | 2015215415 | | | 12/2015 |
| JP | 2016122187 | | | 7/2016 |
| JP | 2017090767 | A | | 5/2017 |
| JP | 2020106080 | A | | 7/2020 |
| WO | 0137256 | A1 | | 5/2001 |
| WO | 0150810 | A1 | | 7/2001 |
| WO | 2012135642 | A2 | | 10/2012 |
| WO | 2017126257 | | | 7/2017 |
| WO | 2019103017 | A1 | | 5/2019 |

OTHER PUBLICATIONS

Yu, X. et al., "Active Noise Control for Infant Incubators," 31st Annual International Conference of the IEEE EMBS, Sep. 2-6, 2009, pp. 2531-2534.

Dias, T. et al., "Acoustic response of a curved active PVDF-paper/fabric speaker for active noise control of automotive Interior noise," Meas. Sci. Technol. 18 (2007) pp. 1521-1532.

Extended European Search Report issued for European Patent Application No. 20809590.1, dated Jan. 4, 2023, 9 pages.

International Search Report and Written Opinion issued for International Patent Application No. PCT/JP2020/015246, Date of mailing: Jun. 30, 2020, 13 pages including English translation.

Communication pursuant to Article 94(3) EPC issued for European Patent Application No. 20809590.1, dated Jun. 6, 2024, 6 pages.

International Search Report and Written Opinion issued for International Patent Application No. PCT/JP2021/029238, Date of mailing: Oct. 5, 2021, 17 pages including English translation.

Notice of Reasons for Refusal issued for Japanese Patent Application No. 2020-153725, Dispatch date: Aug. 20, 2024, 12 pages including English machine translation.

Notice of Reasons for Refusal issued for Japanese Patent Application No. 2020-153725, Dispatch date: Dec. 10, 2024, 12 pages including English machine translation.

Extended European Search Report issued for European Patent Application No. 21866435.7, dated Dec. 17, 2024, 13 pages.

Liao, Y. et al., "Design of a novel auto-position tracking near head space active noise control system," Journal of Electronic Measurement and Instrument, vol. 25, No. 8, 2011, pp. 676-681 (with English abstract).

Office Action and Search Report issued for Chinese Patent Application No. 202080034969.4, dated Nov. 21, 2024, 29 pages including English machine translation.

Second Office Action issued for Chinese Patent Application No. 202080034969.4, dated Jun. 6, 2025, 14 pages including English translation.

Decision of Refusal issued for Japanese Patent Application No. 2020-153725, Dispatch date: Apr. 1, 2025, 11 pages including English machine translation.

* cited by examiner

PRIOR ART

PRIOR ART

| Sample number | Whole configuration | Type of interposed layer | Thickness (mm) of interposed layer | Elastic modulus E (N/m²) of interposed layer | Pore structure of interposed layer | Pore diameter (mm) of interposed layer | Porosity of interposed layer | Surface filling area ratio of interposed layer | Holding degree (N/m³) | Frequency (Hz) at which emission of sound starts |
|---|---|---|---|---|---|---|---|---|---|---|
| R1 | 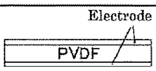  | – | – | – | – | – | – | – | 0 | 3,500 |
| E1 | 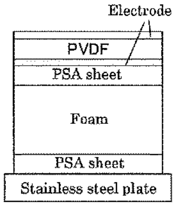  | Foam | 3 | 9.4E+04 | Closed-cell | 0.5 | 0.90 | 1.00 | 3.12E+07 | 3,300 |
| E2 | | Foam | 3 | 6.5E+04 | Semi-open-/semi-closed-cell | 0.5 | 0.90 | 0.10 | 2.17E+06 | 2,400 |
| E3 | | Foam | 5 | 6.5E+04 | Semi-open-/semi-closed-cell | 0.5 | 0.90 | 0.10 | 1.30E+06 | 2,100 |
| E4 | | Foam | 10 | 6.5E+04 | Semi-open-/semi-closed-cell | 0.5 | 0.90 | 0.10 | 6.51E+05 | 1,400 |
| E5 | | Foam | 20 | 6.5E+04 | Semi-open-/semi-closed-cell | 0.5 | 0.90 | 0.10 | 3.25E+05 | 2,000 |
| E6 | | Foam | 20 | 2.1E+04 | Semi-open-/semi-closed-cell | 0.5 | 0.90 | 0.10 | 1.05E+05 | 3,000 |
| E7 | | Foam | 20 | 1.1E+04 | Semi-open-/semi-closed-cell | 0.5 | 0.95 | 0.05 | 2.83E+04 | 4,000 |
| E8 | 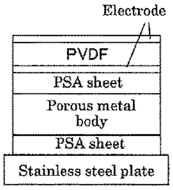  | Porous metal body | 2 | 3.0E+06 | Open-cell | 0.9 | 0.95 | 0.05 | 7.62E+07 | 4,000 |
| E9 | 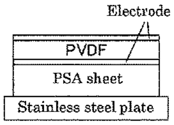  | Pressure-sensitive adhesive sheet | 3 | 2.5E+05 | Non-porous | – | 0.00 | 1.00 | 8.19E+07 | 4,000 |
| E10 | 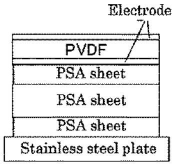  | Pressure-sensitive adhesive sheet | 3 | 2.5E+05 | Non-porous | – | 0.00 | 1.00 | 8.19E+07 | 6,000 |
| E11 | 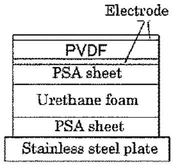  | Urethane foam | 5 | 2.0E+04 | Open-cell | 1.5 | 0.96 | 0.04 | 1.46E+05 | 3,000 |
| E12 | | Urethane foam | 10 | 1.6E+05 | Open-cell | 0.5 | 0.98 | 0.02 | 3.24E+05 | 2,500 |

※PSA:Pressure-sensitive adhesive

FIG.23A

| Sample number | Whole configuration | Type of interposed layer | Thickness (mm) of interposed layer | Elastic modulus E (N/m²) of interposed layer | Pore structure of interposed layer | Pore diameter (mm) of interposed layer | Porosity of interposed layer | Surface filling area ratio of interposed layer | Holding degree (N/m³) | Frequency (Hz) at which emission of sound starts |
|---|---|---|---|---|---|---|---|---|---|---|
| E13 | 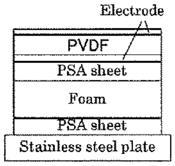 | Foam | 5 | 1.1E+05 | Closed-cell | 0.4 | 0.88 | 0.12 | 2.82E+06 | 2,300 |
| E14 | 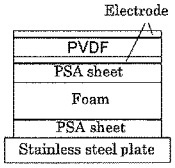 | Foam | 5 | 8.6E+04 | Closed-cell | 0.3 | 0.86 | 0.14 | 2.45E+06 | 2,400 |
| E15 | 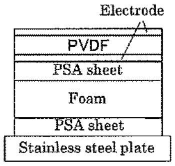 | Foam | 5 | 1.2E+05 | Closed-cell | 0.3 | 0.79 | 0.21 | 5.17E+06 | 2,500 |
| E16 | 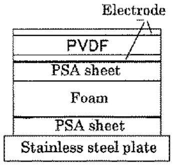 | Foam | 5 | 3.9E+04 | Closed-cell | 0.6 | 0.80 | 0.20 | 1.54E+06 | 1,800 |
| E17 | 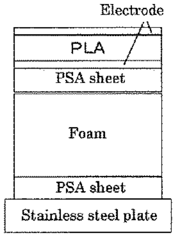 | Foam | 10 | 9.4E+04 | Closed-cell | 0.5 | 0.90 | 1.00 | 9.35E+06 | 2,200 |

※PSA:Pressure-sensitive adhesive

FIG.23B

Piezoelectric speaker (500Hz)

Plane speaker (800Hz)

ACTIVE NOISE CONTROL SYSTEM

TECHNICAL FIELD

The present invention relates to an active noise control system.

BACKGROUND ART

An active noise control system (hereinafter, referred to also as ANC system) is known. In the ANC system, noise is reduced by opposite-phase sound. Patent Literature 1 describes an example of the ANC system.

Patent Literature 1 describes an ANC system according to which noise that is diffracted above a sound insulating wall to propagate is reduced. Specifically, in the ANC system of Patent Literature 1, a speaker having a characteristic of a line sound source is attached to the sound insulating wall. According to the description in Patent Literature 1, the characteristic of the line sound source is such that a radiated sound wave propagates cylindrically with a center axis that is identical with the line sound source.

CITATION LIST

Patent Literature

Patent Literature 1: JP 2004-004583 A
Patent Literature 2: JP 2016-122187 A

SUMMARY OF THE INVENTION

Technical Problem

In the case where a structure is on a noise propagation path, diffraction may occur at a first end portion and a second end portion of the structure that face each other. Wave fronts generated by the diffraction at these end portions propagate so as to go around behind the structure. Specifically, the wave front generated by the diffraction at the first end portion and the wave front generated by the diffraction at the second end portion propagate so as to approach an axis passing between these end portions and extending in a direction away from the structure. The characteristic of the line sound source in Patent Literature 1 is not suitable for reducing the diffracted sounds generated in this manner at the first end portion and the second end portion.

Solution to Problem

The present invention provides an active noise control system including;

a structure; and a speaker attached to the structure, wherein the speaker includes a radiation surface, the radiation surface has a first region, a second region, and a third region between the first region and the second region, and when an axis passing through the third region and extending away from the radiation surface is defined as a reference axis, the speaker forms a first wavefront propagating from the first region so as to approach the reference axis and a second wavefront propagating from the second region so as to approach the reference axis.

Advantageous Effects of Invention

In the case where the above structure is on a noise propagation path, diffraction may occur at a first end portion and a second end portion of the structure that face each other. A wave front generated by diffraction at the first end portion and a wave front generated by diffraction at the second end portion propagate so as to approach the reference axis. Meanwhile, in the above ANC system, the first wave front propagates from the first region so as to approach the reference axis, and the second wave front propagates from the second region so as to approach the reference axis. Thus, the wave front derived from diffraction at the first end portion and the wave front derived from diffraction at the second end portion have common propagation directions with the first wave front and the second wave front derived from the ANC system. This is suitable for reducing diffracted sounds generated by diffraction of noise at the first end portion and the second end portion.

BRIEF DESCRIPTION OF THE DRAWINGS

FIG. 23A is a table showing evaluation results of samples.

FIG. 23B is a table showing evaluation results of samples.

DESCRIPTION OF EMBODIMENT

Figure 1:
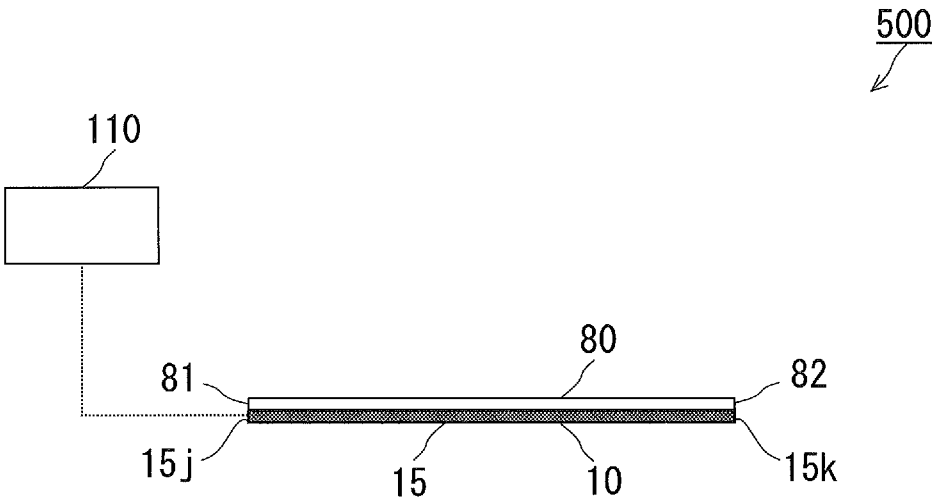
FIG. 1 is a diagram illustrating an ANC system.

Hereinafter, an embodiment of the present invention will be described with reference to the accompanying drawings. The following description is only illustrative of the embodiment of the present invention and has no intention to limit the present invention. In the following description, the same or similar components are given the same reference numerals, and description thereof may be omitted.

[Active Noise Control System]

FIG. 1 shows an active noise control system (ANC system) 500 according to an embodiment. The ANC system 500 includes a structure 80 and a speaker 10. The speaker 10 is attached to the structure 80.

In the illustrated example, the structure 80 is a plate-like body. The structure 80, which is a plate-like body, for example has a dimension of 20 cm to 600 cm (may have a dimension of 20 cm to 200 cm) in the longitudinal direction, a dimension of 20 cm to 600 cm (may have a dimension of 20 cm to 200 cm) in the lateral direction, and a dimension of 0.1 cm to 15 cm in the front-back direction. Here, the longitudinal direction, the lateral direction, and the front-back direction are perpendicular to each other. The dimension in the longitudinal direction and the dimension in the lateral direction may be the same as or different from each other.

A specific example of the structure 80 is a partition.

The speaker 10 has a radiation surface 15. The radiation surface 15 radiates a sound wave by vibrating. This sound wave reduces noise. In the illustrated example, the radiation surface 15 is a continuous radiation surface.

Specifically, the structure 80 has end portions 81 and 82 facing each other. The ANC system 500 is suitable for reducing diffracted sounds generated at the end portions 81 and 82. This point will be described below with reference to FIG. 2 and FIG. 3.

Figure 2:
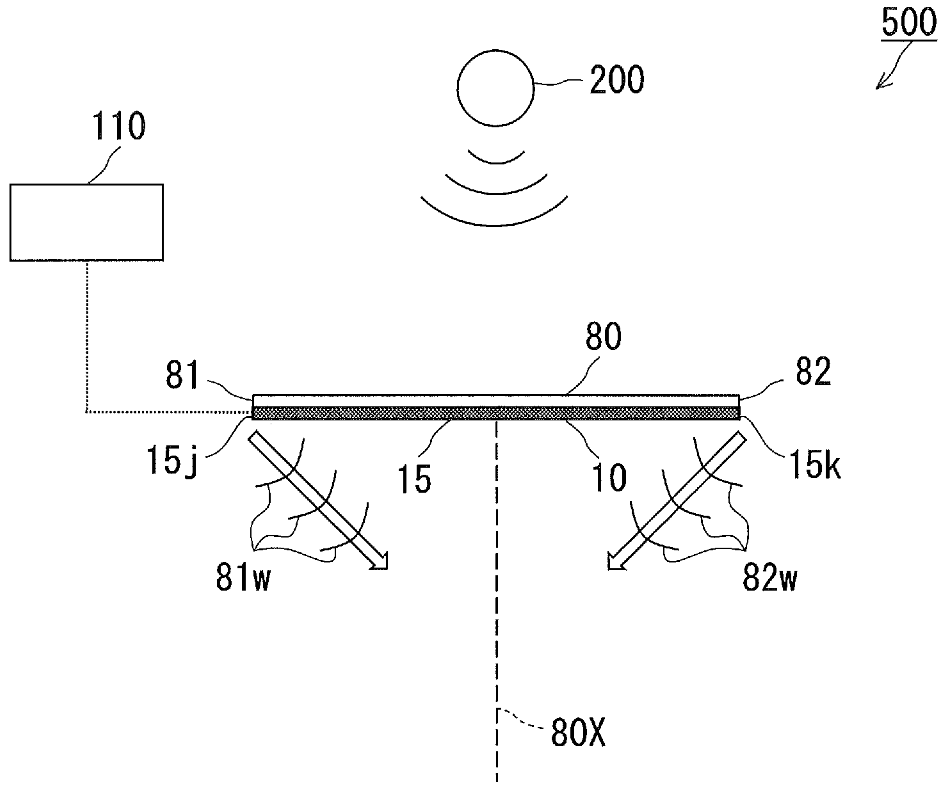
FIG. 2 is a diagram illustrating diffracted waves.

As shown in FIG. 2, it is assumed that noise from a noise source 200 has propagated toward the structure 80. In this case, diffraction may occur at the first end portion 81 and the second end portion 82. Wave fronts generated by diffraction at the end portions 81 and 82 propagate so as to go around behind the structure 80. Specifically, a wave front 81*w* generated by diffraction at the first end portion 81 and a wave front 82*w* generated by diffraction at the second end portion 82 propagate so as to approach an axis 80X. Here, the axis 80X is an axis passing between the first end portion 81 and the second end portion 82 and extending in a direction away from the structure 80. Specifically, the axis 80X is perpendicular to a mounting surface of the structure 80 on which the speaker 10 is mounted. The axis 80X may pass through the center of the mounting surface.

Figure 3:
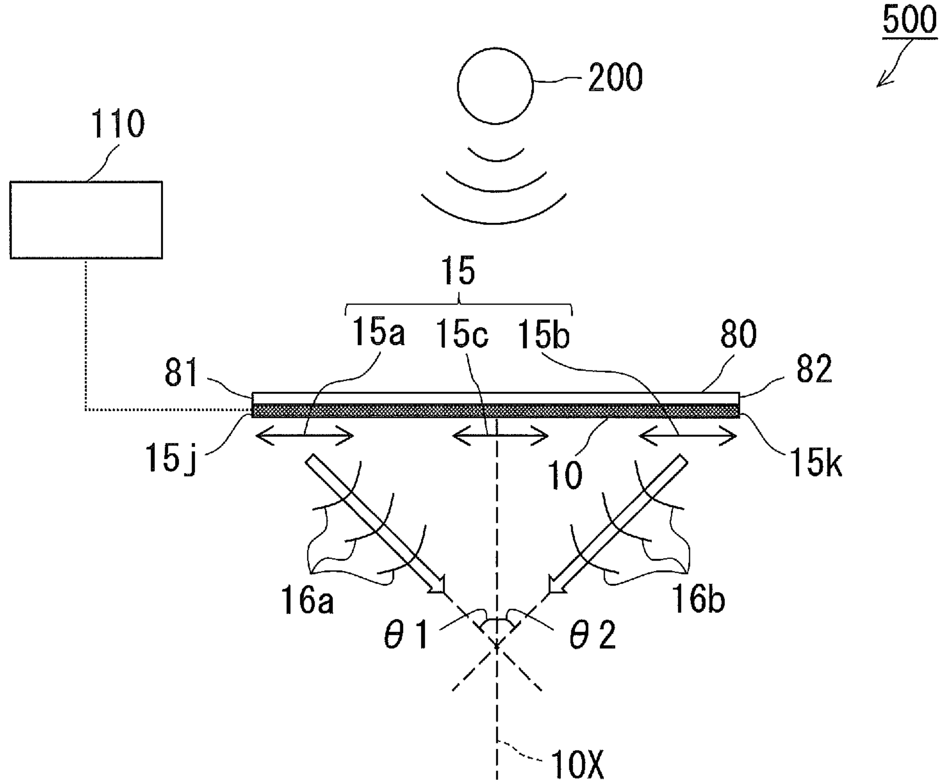
FIG. 3 is a diagram illustrating a wave front formed by a speaker of the ANC system.

The ANC system 500 is suitable for reducing diffracted sounds generated in this manner at the end portions 81 and 82. Specifically, as shown in FIG. 3, the radiation surface 15 has a first region 15*a*, a second region 15*b*, and a third region 15*c*. The third region 15*c* is a region between the first region 15*a* and the second region 15*b*. The speaker 10 forms a first wave front 16*a* propagating from the first region 15*a* so as to approach a reference axis 10X, and a second wave front 16*b* propagating from the second region 15*b* so as to approach the reference axis 10X. Specifically, in the present embodiment, such first wave front 16*a* and second wave front 16*b* are formed by the radiation surface 15 vibrating. Here, the reference axis 10X is an axis passing through the third region 15*c* and extending away from the radiation surface 15. It should be noted that a wave front refers to a surface composed of linked points having the same wave phase.

It can be also said that the wave front 81*w* derived from diffraction at the first end portion 81 and the wave front 82*w* derived from diffraction at the second end portion 82 propagate so as to approach the reference axis 10X shown in FIG. 3. Accordingly, the wave front 81*w* derived from diffraction at the first end portion 81 and the wave front 82*w* derived from diffraction at the second end portion 82 have common propagation directions with the first wave front 16*a* and the second wave front 16*b* derived from the ANC system 500. This is suitable for reducing diffracted sounds generated by diffraction of noise at the first end portion 81 and the second end portion 82.

It is not impossible to mount two speakers separated from each other on the structure 80, one speaker forming a wave front corresponding to the first wave front 16*a*, and the other speaker forming a wave front corresponding to the second wave front 16*b*. However, such a case needs for example adjustment on the difference in phase between sounds to be output from the two speakers. Meanwhile, in the present embodiment, the first wave front 16*a* and the second wave front 16*b* can be formed by the radiation surface 15 (continuous radiation surface in the illustrated example) of one speaker 10. This is advantageous in view of simplifying the control on the speaker 10.

In the present embodiment, the reference axis 10X is perpendicular to the third region 15*c* in a state where the third region 15*c* does not vibrate. A deviation angle θ1 of the first wave front 16*a* relative to the reference axis 10X in the propagation direction falls within a range of for example 5° to 85°, and may fall within a range of 15° to 75° or a range of 25° to 65°. A deviation angle θ2 of the second wave front 16*b* relative to the reference axis 10X in the propagation direction falls within a range of for example 5° to 85°, and may fall within a range of 15° to 75° or a range of 25° to 65°. The third region 15*c* may be plane in a state where the third region 15*c* does not vibrate. Also, the entire radiation surface 15 may be plane in a state where the entire radiation surface 15 does not vibrate. The reference axis 10X may be an axis passing through the center of the radiation surface 15.

Figure 4:
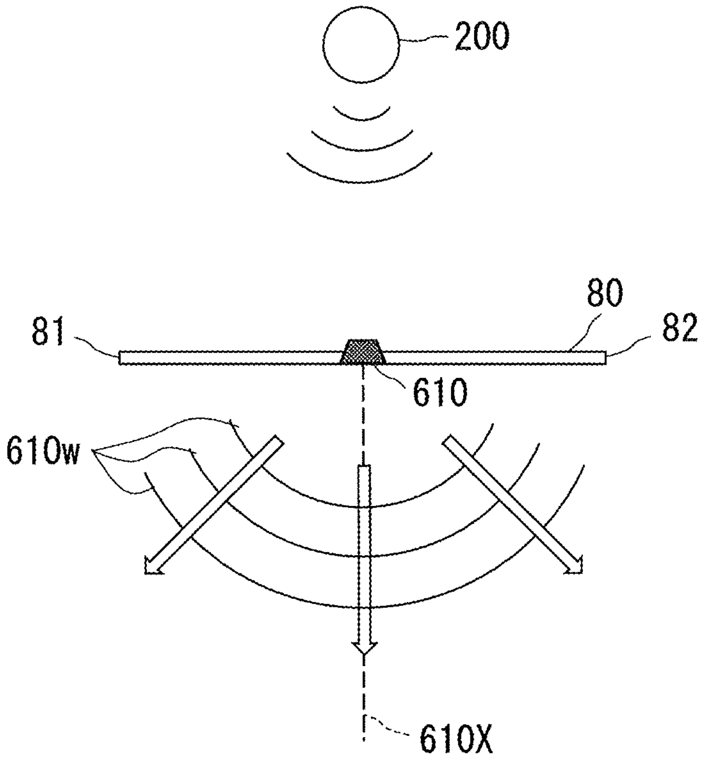
FIG. 4 is a diagram illustrating a wave front formed by a conventional dynamic speaker.

A conventional dynamic speaker 610 shown in FIG. 4 radiates a substantially hemispherical wave from its radiation surface. The substantially hemispherical wave has a wave front 610*w* that is also substantially hemispherical. In FIG. 4, an axis 610X is an axis passing through the radiation surface of the dynamic speaker 610 and extending away from the radiation surface.

Figure 5:
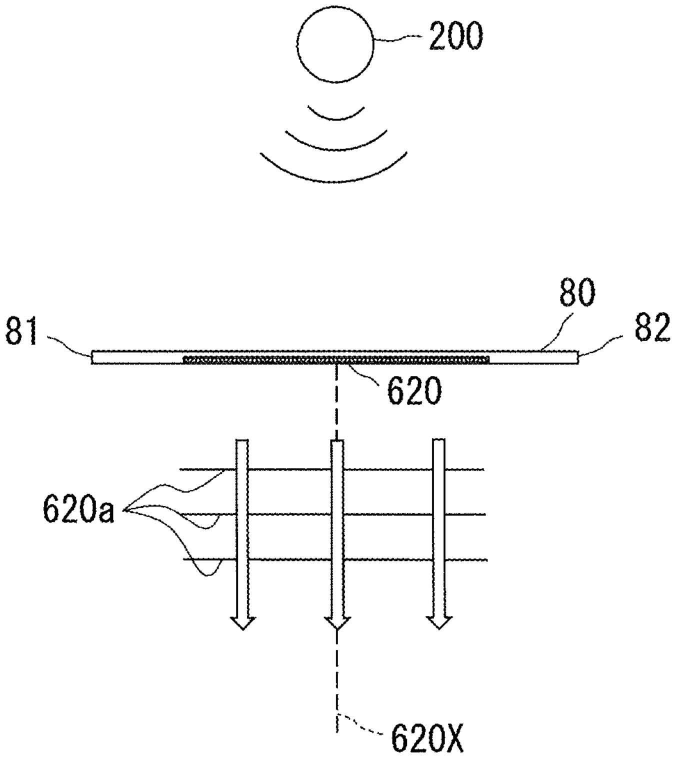
FIG. 5 is a diagram illustrating a wave front formed by a conventional plane speaker.

A conventional plane speaker 620 shown in FIG. 5 radiates a substantially plane wave from its radiation surface. The substantially plane wave has a wave front 620*a* that is also substantially plane. In FIG. 5, an axis 620X is an axis passing through the radiation surface of the plane speaker 620 and extending away from the radiation surface.

Figure 6A:
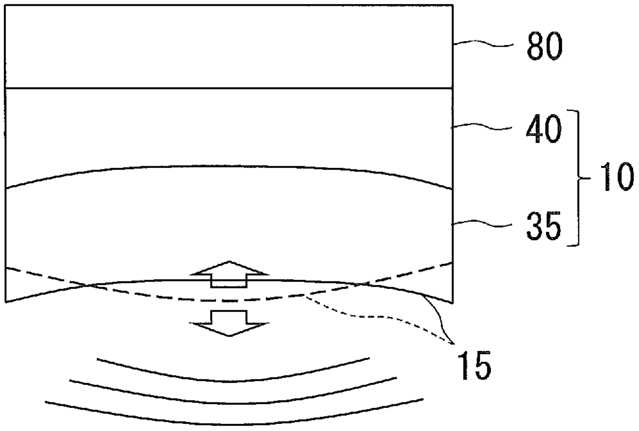
FIG. 6A is a diagram illustrating vibration of a radiation surface of the speaker.

As can be understood from FIG. 3, FIG. 4, and FIG. 5, the conventional speakers 610 and 710 cannot achieve the combination according to the present embodiment composed of the first wave front 16*a* propagating from the first region 15*a* so as to approach the reference axis 10X and the second wave front 16*b* propagating from the second region 15*b* so as to approach the reference axis 10X. As shown in FIG. 6A, the speaker 10 of the present embodiment is configured to vibrate well even at the end portions of the radiation surface 15. The radiation surface 15 as a whole has a high degree of freedom of vibration. This may contribute to formation of the first wave front 16*a* and the second wave front 16*b*, although the details need to be studied in the future. In addition, the radiation surface 15 may vibrate in a mode that is close to a free-end vibration mode to a certain extent. Specifically, the radiation surface 15 may vibrate in a mode close to a primary free-end vibration mode to a certain extent.

An advantage of a sound reducing effect by the speaker 10 compared to the conventional speakers 610 and 710 tends to be exhibited when noise from the noise source 200 has a high frequency.

In a typical example, a portion of an end portion of the radiation surface 15 is formed in the first region 15*a*, and a portion of an end portion of the radiation surface 15 is formed in the second region 15*b*.

Here, a situation is considered in which the speaker 10 is not vibrating and the ANC system 500 does not exhibit its sound reducing function. In this situation, although depending on the size of the structure 80 and the wavelength of noise from the noise source 200, diffraction of the noise from the noise source 200 at the first end portion 81 and the second end portion 82 of the structure 80 can cause appearance of a period during which the phase of a sound wave in the first region 15*a* and the phase of a sound wave in the second region 15*b* are the same in terms of whether positive or negative, the phase of the sound wave in the first region 15*a* and the phase of a sound wave in the third region 15*c* are opposite to each other in terms of whether positive or negative, and the phase of the sound wave in the second region 15*b* and the phase of the sound wave in the third region 15*c* are opposite to each other in terms of whether positive or negative.

With respect to this point, in the present embodiment, a period appears during which the phase of the first wave and the phase of the second wave are the same in terms of whether positive or negative, the phase of the first wave and the phase of the third wave are opposite to each other in terms of whether positive or negative, and the phase of the second wave and the phase of the third wave are opposite to each other in terms of whether positive or negative. Here, the first sound wave is a sound wave in the first region 15*a* formed by the speaker 10. The second sound wave is a sound wave in the second region 15*b* formed by the speaker 10. The third sound wave is a sound wave in the third region 15*c* formed by the speaker 10. According to the present embodiment, noise derived from the noise source 200 having such a phase distribution as described above in the first region 15*a*, the second region 15*b*, and the third region 15*c* can be reduced by sound derived from the ANC system 500.

As described above, the first sound wave is a sound wave in the first region 15*a* formed by the speaker 10. The first sound wave is a concept including a sound wave at a position infinitely close to the first region 15*a* in a space facing the first region 15*a*. Accordingly, measurement of the first sound wave can be achieved by measuring the sound wave at this "infinitely close position". The same applies to the second sound wave and the third sound wave.

The fact that the phase distribution such as above of the first sound wave, the second wave, and the third sound wave is obtained is consistent with the assumption that the radiation surface 15 is vibrating in the mode close to the primary free-end vibration mode to a certain extent.

In the present embodiment, the ANC system 500 includes a controller 110. A certain frequency range is set in the controller 110. The controller 110 controls a frequency of sound to be output from the speaker 10 to have a value within the frequency range. The frequency range is, for example, 20 Hz to 20000 Hz, and may be 20 Hz to 6000 Hz.

In the present embodiment, when the radiation surface 15 is viewed in plan, the radiation surface 15 has a first end portion 15*j* and a second end portion 15*k* facing each other. When the radiation surface 15 is viewed in plan, a first margin M1 between the first end portion 15*j* and one of the end portions of the structure 80 is 0 or more and 1/10 or less of a reference wavelength. When the radiation surface 15 is viewed in plan, a second margin M2 between the second end portion 15*k* and the other end portion of the structure 80 is 0 or more and 1/10 or less of the reference wavelength. Here, the reference wavelength is a wavelength of sound having the upper limit frequency of the above frequency range. This is suitable for reducing diffracted sounds generated by diffraction of noise at the first end portion 81 and the second end portion 82. The ratio 1/10 is derived from the fact that a sound reducing region by a typical ANC is 1/10 of a wavelength of noise to be controlled.

In fact, there are cases where the first margin M1 and the second margin M2 should be increased to a certain extent for the sake of commercialization. Taking this into consideration, the upper limits of the first margin M1 and the second margin M2 may be increased to exceed 1/10 of the reference wavelength. In view of performing a reasonable commercialization while achieving an effect of reducing diffracted sounds, the first margin M1 can be set to 0 or more and 1/3 or less of the reference wavelength, for example. Also, the second margin M2 can be set to 0 or more and 1/3 or less of the reference wavelength when the radiation surface 15 is viewed in plan.

The first margin M1 is, for example, 0 cm to 50 cm, and may be 0 cm to 10 cm. The second margin M2 is, for example, 0 cm to 50 cm, and may be 0 cm to 10 cm.

The first margin M1 is the distance (specifically, the shortest distance) between the first end portion 15*j* and the one end portion of the structure 80 when the radiation surface 15 is viewed in plan. The second margin M2 is the distance (specifically, the shortest distance) between the second end portion 15*k* and the other end portion of the structure 80 when the radiation surface 15 is viewed in plan. In the present embodiment, the first margin M1 is the distance between the first end portion 15*j* and the first end portion 81 when the radiation surface 15 is viewed in plan. In the present embodiment, the second margin M2 is the distance between the second end portion 15*k* and the second end portion 82 when the radiation surface 15 is viewed in plan.

The first margin M1 and the second margin M2 will be further described with reference to FIG. 7 to FIG. 12. FIG. 8 to FIG. 12 show a long direction 80L and a short direction 80S of the structure 80 when the radiation surface 15 is viewed in plan. FIG. 8 to FIG. 12 omit the controller 110.

Figure 7:
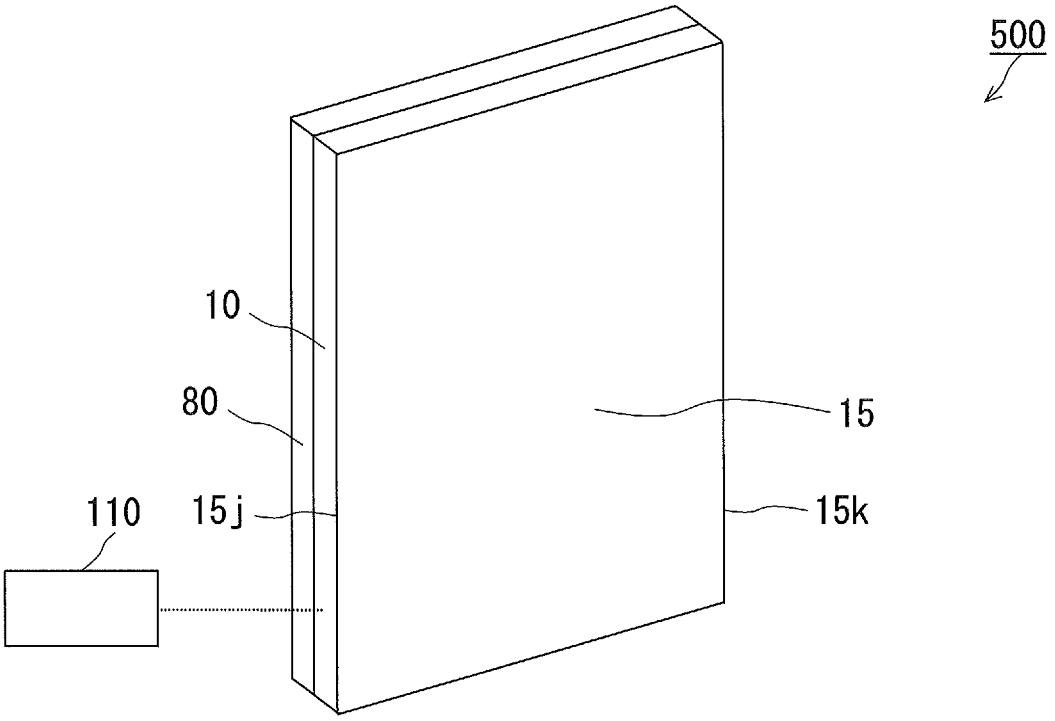
FIG. 7 is a perspective view for illustrating a first margin and a second margin.
Figure 8:
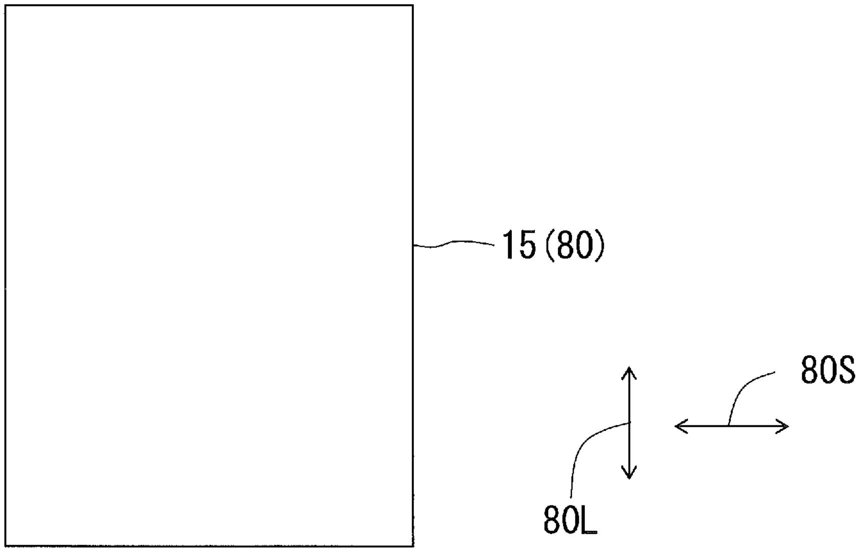
FIG. 8 is a plan view for illustrating the first margin and the second margin.

In the examples shown in FIG. 7 and FIG. 8, when the radiation surface 15 is viewed in plan, a peripheral portion of the radiation surface 15 and a peripheral portion of the structure 80 completely coincide with each other over the entire periphery. Accordingly, the first margin M1 and the second margin M2 are 0.

In the examples shown in FIG. 9 to FIG. 12, the first margin M1 and the second margin M2 are larger than 0.

Figure 9:
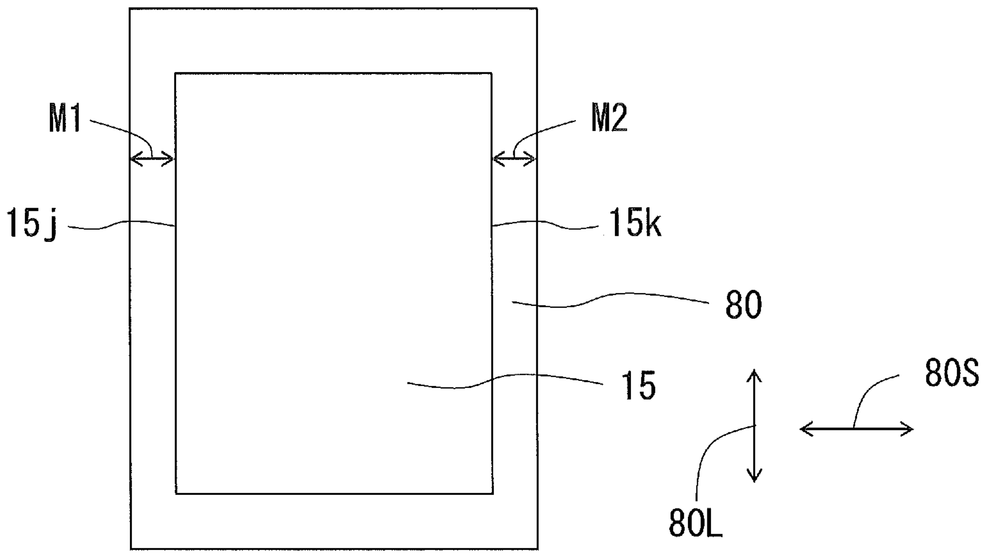
FIG. 9 is a plan view for illustrating the first margin and the second margin.

In the example in FIG. 9, when the radiation surface 15 is viewed in plan, the distance between every portion of an outer periphery of the radiation surface 15 and the end portion of the structure 80 is 1/3 or less of the reference wavelength. Specifically, when the radiation surface 15 is viewed in plan, the distance between every portion of the outer periphery of the radiation surface 15 and the end portion of the structure 80 is 1/10 or less of the reference wavelength.

Figure 10:
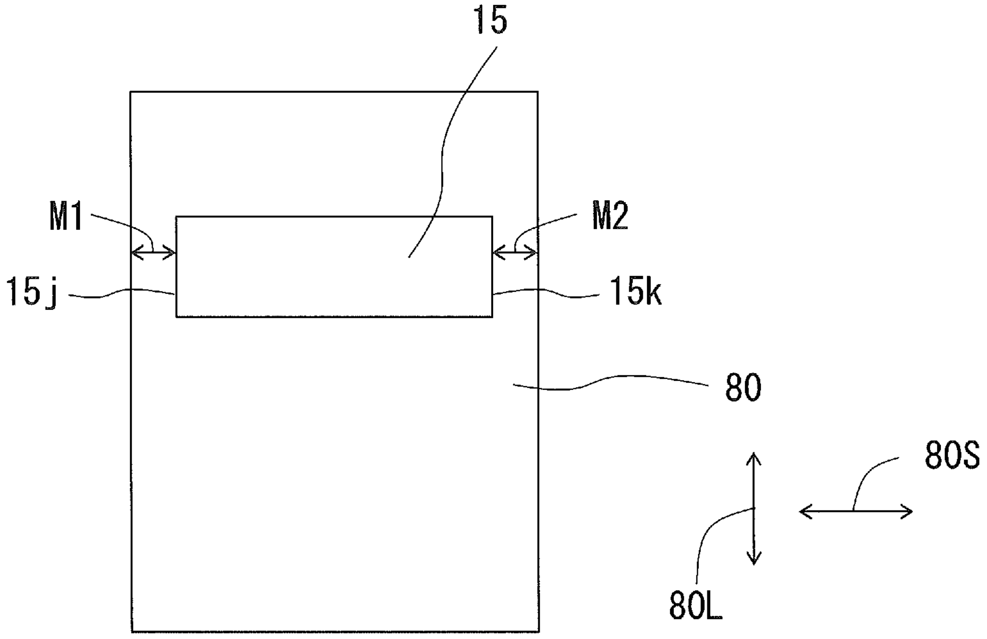
FIG. 10 is a plan view for illustrating the first margin and the second margin.

In the example in FIG. 10, when the radiation surface 15 is viewed in plan, the long direction of the radiation surface 15 is the same as the short direction 80S of the structure 80. The first margin M1 and the second margin M2 are margins in the short direction 80S. In the example in FIG. 10, meanwhile, when the radiation surface 15 is viewed in plan, the margin between the end portion of the structure 80 and the end portion of the radiation surface 15 in the long direction 80L is larger than 1/3 of the reference wavelength.

Figure 11:
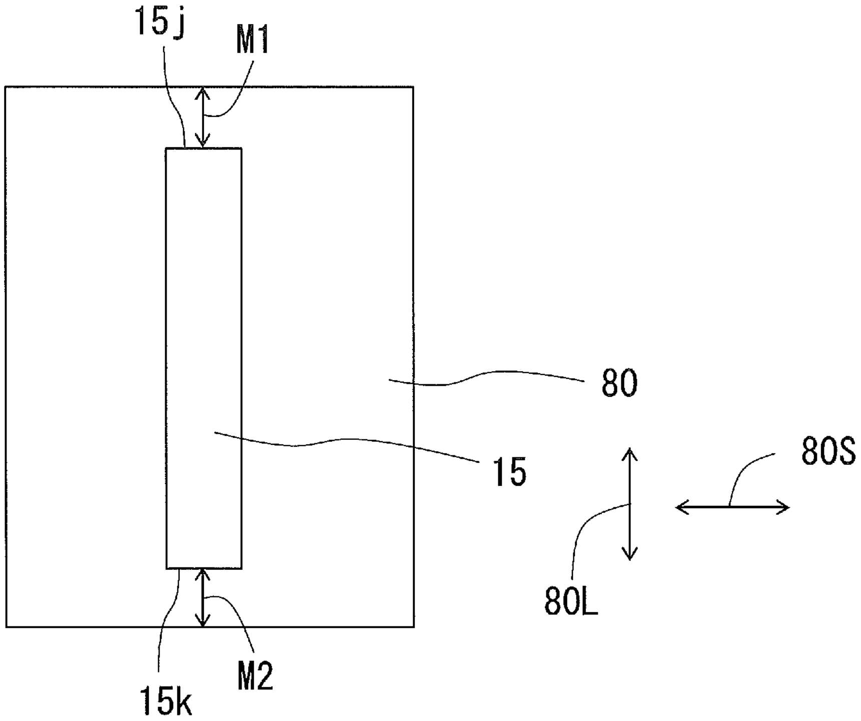
FIG. 11 is a plan view for illustrating the first margin and the second margin.

In the example in FIG. 11, when the radiation surface 15 is viewed in plan, the long direction of the radiation surface 15 is the same as the long direction 80L of the structure 80. The first margin M1 and the second margin M2 are margins in the long direction 80L. In the example in FIG. 11, meanwhile, when the radiation surface 15 is viewed in plan, the margin between the end portion of the structure 80 and the end portion of the radiation surface 15 in the short direction 80S is larger than ⅓ of the reference wavelength.

Although not shown, in another example, when the radiation surface 15 is viewed in plan, the long direction of the radiation surface 15 is different from the long direction 80L and the short direction 80S of the structure 80. The first margin M1 and the second margin M2 are margins in the short direction 80S. In the other example, meanwhile, when the radiation surface 15 is viewed in plan, the margin between the end portion of the structure 80 and the end portion of the radiation surface 15 in the long direction 80L is larger than ⅓ of the reference wavelength.

Figure 12:
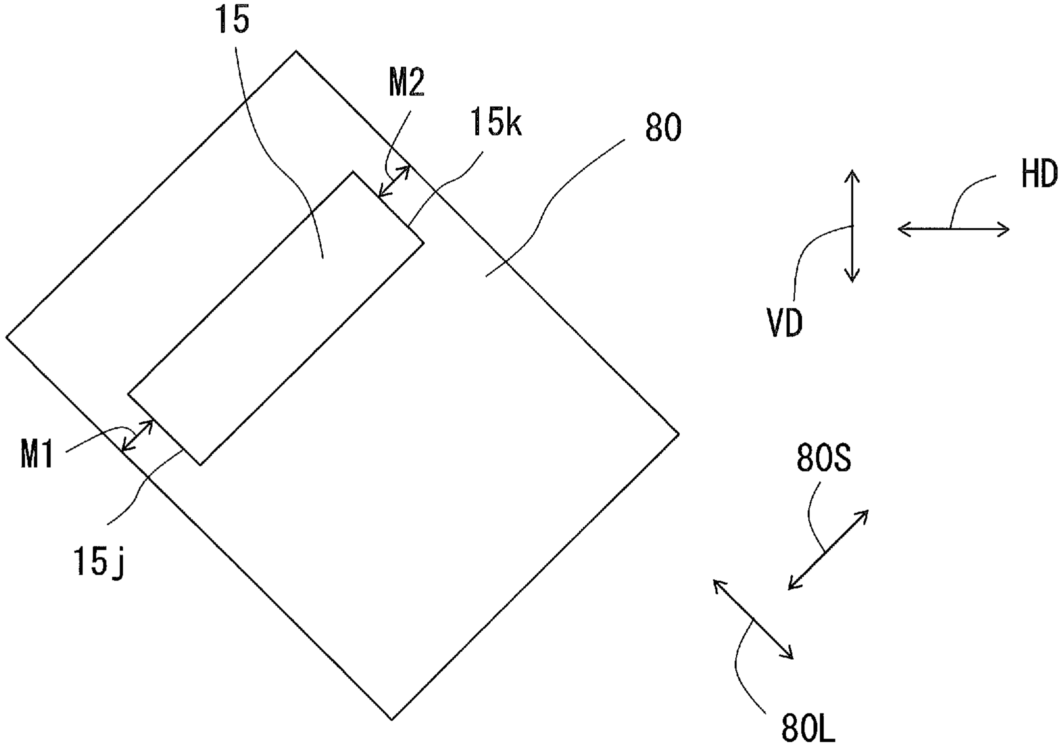
FIG. 12 is a plan view for illustrating the first margin and the second margin.

In a specific example, an assembly of the structure 80 and the speaker 10 of the examples shown in FIG. 7 to FIG. 11 and the other example described above is disposed such that the short direction 80S is parallel to the horizontal direction and the long direction 80L is parallel to the vertical direction. In another specific example, the assembly is disposed such that the short direction 80S is parallel to the vertical direction and the long direction 80L is parallel to the horizontal direction. In still another specific example, the assembly is disposed such that the short direction 80S is parallel to a direction that is inclined relative to the horizontal direction and the vertical direction, and the long direction 80L is parallel to the direction that is inclined relative to the horizontal direction and the vertical direction, too. For reference, FIG. 12 shows the assembly of FIG. 10 to which this inclined disposition is applied. In FIG. 12, reference numeral HD indicates the horizontal direction, and reference numeral VD indicates the vertical direction.

The first margin M1 and the second margin M2 may be the same or different from each other. One of the first margin M1 and the second margin M2 may be 0, and the other may be larger than 0.

The dimension in the longitudinal direction and the dimension in the lateral direction of the radiation surface 15 when viewed in plan may be the same. In this case, the "long direction of the radiation surface 15" and the "short direction of the radiation surface 15" in the above description can be replaced with a "first direction of the radiation surface 15" and a "second direction of the radiation surface 15". In the case where this replacement is performed, the first direction and the second direction may be directions perpendicular to each other.

When the radiation surface 15 is viewed in plan, the dimension in the longitudinal direction and the dimension in the lateral direction of the structure 80 may be the same. In this case, the "long direction of the structure 80" and the "short direction of the structure 80" in the above description can be replaced with a "third direction of the structure 80" and a "fourth direction of the structure 80". In the case where this replacement is performed, the third direction and the fourth direction may be directions perpendicular to each other.

As can be understood from the description with reference to FIG. 7 to FIG. 12, the direction in which the speaker 10 is mounted on the structure 80 is not particularly limited. Of course, this is also the case where the structure 80 is a partition.

[Feedforward ANC System]

In a specific example, the ANC system 500 performs feedforward control. Hereinafter, the ANC system 500 performing feedforward control is referred to also as feedforward ANC system 500A or ANC system 500A. Further, the controller 110 in the ANC system 500A is referred to also as controller 110A. An ANC system 500A according to an example will be described with reference to FIG. 13A to FIG. 13D.

Figure 13A:
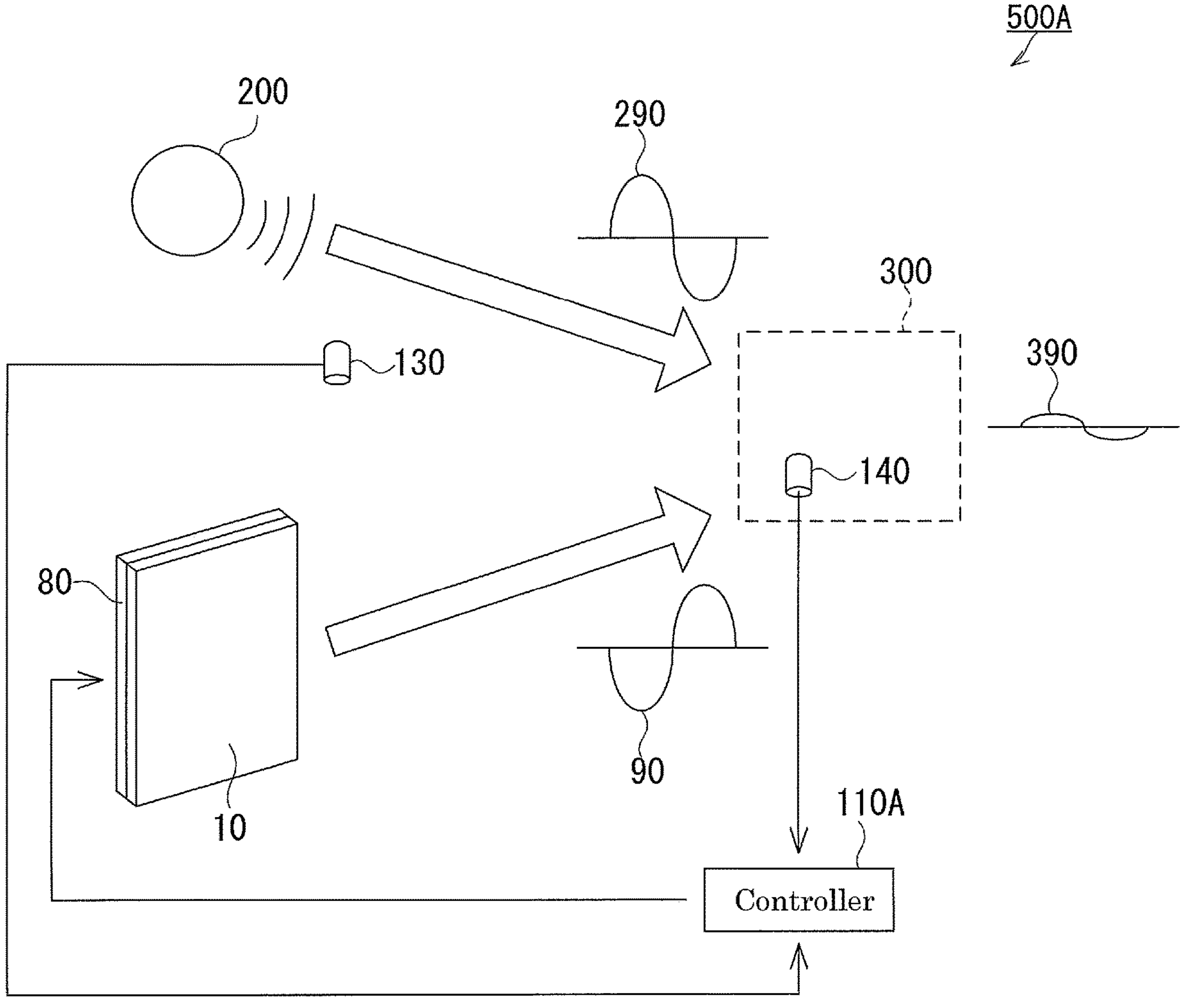
FIG. 13A is a configuration diagram of a feedforward ANC system.

As shown in FIG. 13A, the feedforward ANC system 500A includes a reference microphone 130, an error microphone 140, and a controller 110A.

As shown in FIG. 13A, it is assumed that a sound wave to be cancelled out reaches a region 300 from the noise source 200, and has a waveform 290 in the region 300. The speaker 10 radiates a sound wave that is to have, upon reaching the region 300, a waveform 90 opposite in phase to the waveform 290. These sound waves cancel out each other in the region 300. In other words, these sound waves are synthesized in the region 300 to generate a synthetic sound wave having a waveform 390 whose amplitude is reduced to 0 or a low level. In the ANC system 500A, sound reduction is achieved in this manner.

In the ANC system 500A shown in FIG. 13A, feedforward control is performed using the reference microphone 130, the error microphone 140, and the controller 110A. Specifically, the reference microphone 130 is disposed on the noise source 200 side when viewed from the speaker 10. The reference microphone 130 detects sound from the noise source 200. The error microphone 140 is disposed in the region 300 and detects sound in the region 300. Based on the sounds detected by the reference microphone 130 and the error microphone 140, the controller 110A adjusts a sound wave to be radiated from the speaker 10.

In the example in FIG. 13A, the ANC system 500A has only one error microphone 140. Such an ANC system 500A may be referred to as single-channel ANC system 500A.

The ANC system 500A may have a plurality of error microphones 140. Such an ANC system 500A may be referred to as multi-channel ANC system 500A.

Figure 13B:
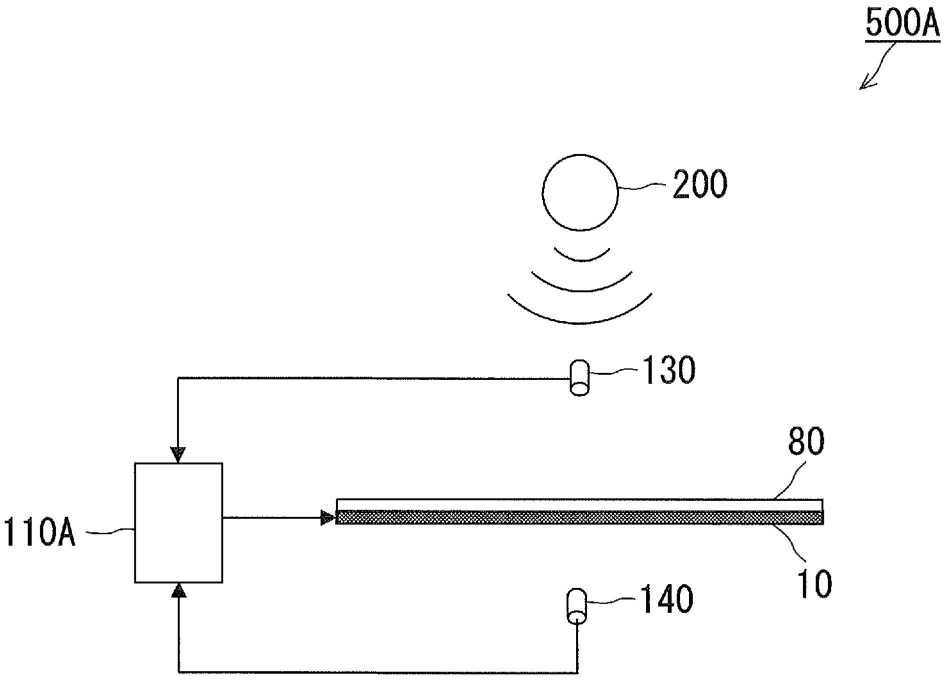
FIG. 13B is a configuration diagram of a single-channel ANC system.
Figure 13C:
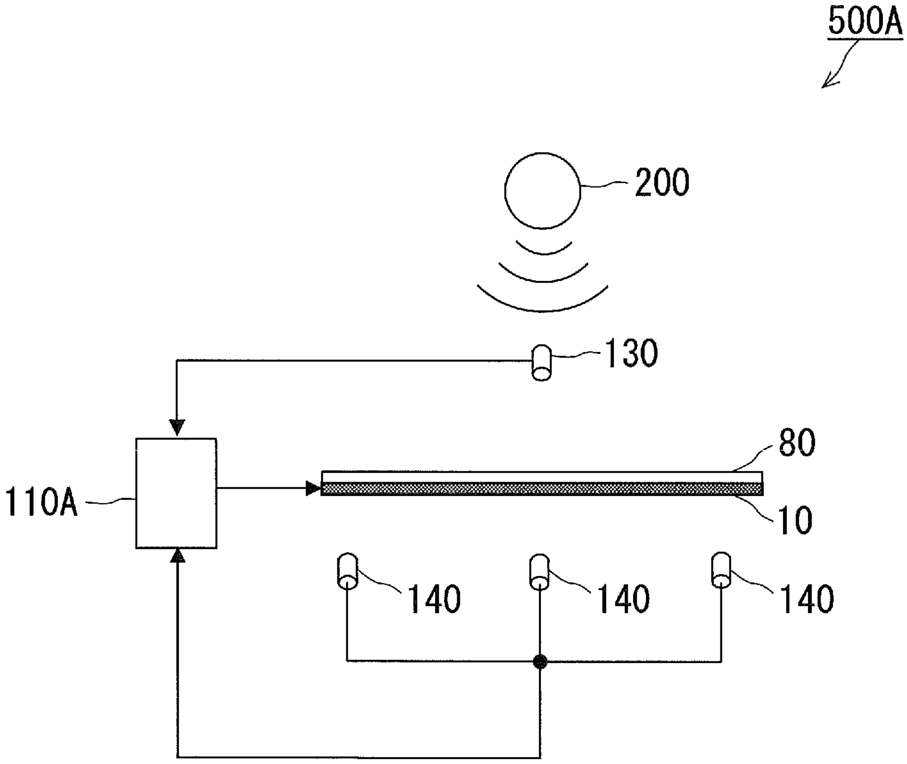
FIG. 13C is a configuration diagram of a multi-channel ANC system.

FIG. 13B schematically shows the single-channel ANC system 500A. FIG. 13C schematically shows the multi-channel ANC system 500A. The single-channel ANC system 500A is advantageous in view of achieving simple control. Meanwhile, the multi-channel ANC system 500A can reduce noise at a point of each of the error microphones 140. Providing a plurality of points at which noise can be reduced by the plurality of error microphones 140 (control points) is advantageous in view of achieving sound reduction in a large space.

Figure 13D:
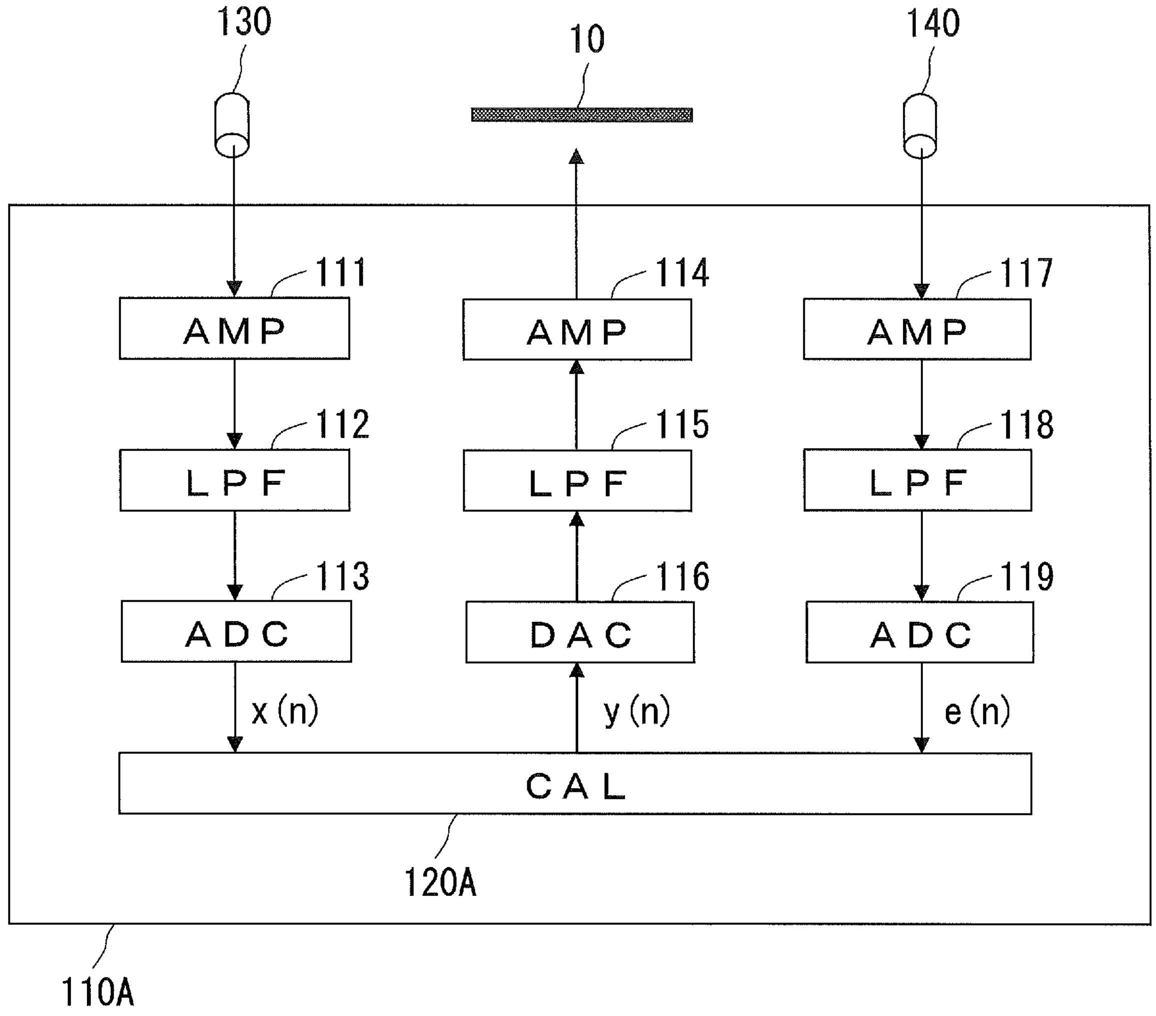
FIG. 13D is a configuration diagram of a controller.

FIG. 13D is a configuration diagram of a controller 110A according to an example. The controller 110A has a preamplifier (hereinafter, amplifier is referred to also as amp) 111, a low-pass filter 112, an analog-to-digital converter (hereinafter, referred to also as AD converter) 113, a power amp 114, a low-pass filter 115, a digital-to-analog converter (hereinafter, referred to also as DA converter) 116, a preamp 117, a low-pass filter 118, an AD converter 119, and a calculation unit 120A.

The preamp 111 amplifies an output signal of the reference microphone 130. The low-pass filter 112 passes a low-pass component of an output signal of the preamp 111. The AD converter 113 converts an output signal of the low-pass filter 112 into a digital signal. As a result, a reference signal x(n) at a time n is output from the AD converter 113.

The preamp 117 amplifies an output signal of the error microphone 140. The low-pass filter 118 passes a low-pass component of an output signal of the preamp 117. The AD converter 119 converts an output signal of the low-pass filter 118 into a digital signal. As a result, an error signal e(n) at the time n is output from the AD converter 119.

The calculation unit 120A generates a control signal y(n) at the time n from the reference signal x(n) and the error signal e(n). The calculation unit 120A includes, for example, a digital signal processor (DSP) or a field-programmable gate array (FPGA). The calculation unit 120A operates based on, for example, a filtered-x algorithm.

The DA converter 116 converts the control signal y(n) into an analog signal. The low-pass filter 115 passes a low-pass component of an output signal of the DA converter 116. The power amp 114 amplifies an output signal of the low-pass filter 115. A signal output from the power amp 114 is transmitted as a control signal to the speaker 10. Based on this signal, sound is output from the radiation surface 15.

As can be understood from the above description, the ANC system 500A includes the error microphone 140, the reference microphone 130, and the controller 110A. The reference microphone 130, the structure 80, the speaker 10, and the error microphone 140 are arranged in this order. The controller 110A performs feedforward control of controlling sound to be output from the speaker 10 based on an output signal of the reference microphone 130 and an output signal of the error microphone 140. Feedforward control enables reduction of not only a periodic signal but also a non-periodic signal.

[Feedback ANC System]

In a specific example, the ANC system 500 performs feedback control.

Hereinafter, the ANC system 500 performing feedback control is referred to also as feedback ANC system 500B or ANC system 500B. Further, the controller 110 in the ANC system 500B is referred to also as controller 110B. An ANC system 500B according to an example will be described with reference to FIG. 14A to FIG. 14D.

Figure 14A:
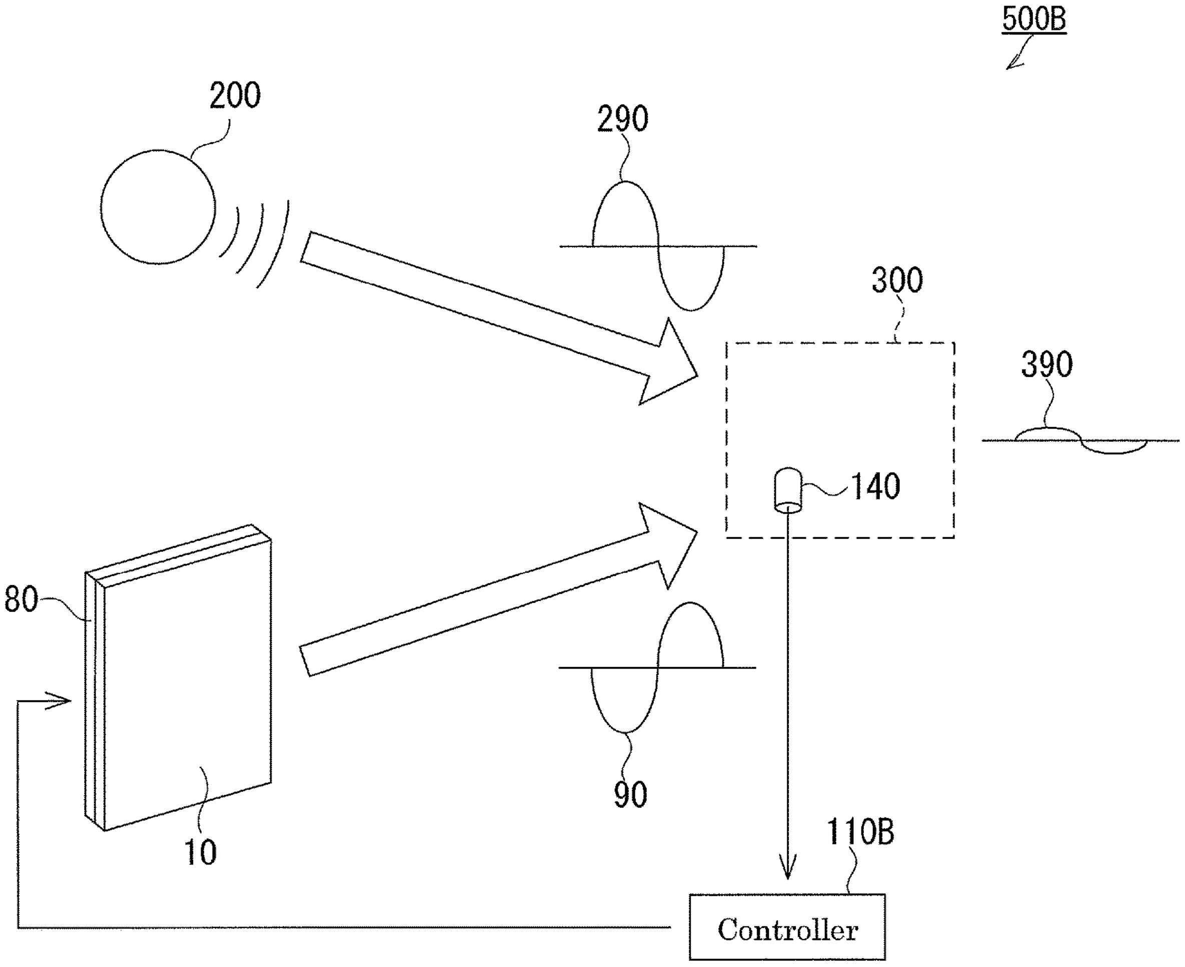
FIG. 14A is a configuration diagram of a feedback ANC system.

As shown in FIG. 14A, the feedback ANC system 500B includes an error microphone 140 and a controller 110B.

As shown in FIG. 14A, it is assumed that a sound wave to be cancelled out reaches the region 300 from the noise source 200, and has a waveform 290 in the region 300. The speaker 10 radiates a sound wave that is to have, upon reaching the region 300, a waveform 90 opposite in phase to the waveform 290. These sound waves cancel out each other in the region 300. In other words, these sound waves are synthesized in the region 300 to generate a synthetic sound wave having a waveform 390 whose amplitude is reduced to 0 or a low level. In the ANC system 500B, sound reduction is achieved in this manner.

In the ANC system 500B shown in FIG. 14A, feedback control is performed using the error microphone 140 and the controller 110B. Specifically, the error microphone 140 is disposed in the region 300 and detects sound in the region 300. Based on the sound detected by the error microphone 140, the controller 110B adjusts a sound wave to be radiated from the speaker 10.

In the example in FIG. 14A, the ANC system 500B has only one error microphone 140. Such an ANC system 500B may be referred to as single-channel ANC system 500B.

The ANC system 500B may have a plurality of error microphones 140. Such an ANC system 500B may be referred to as multi-channel ANC system 500B.

Figure 14B:
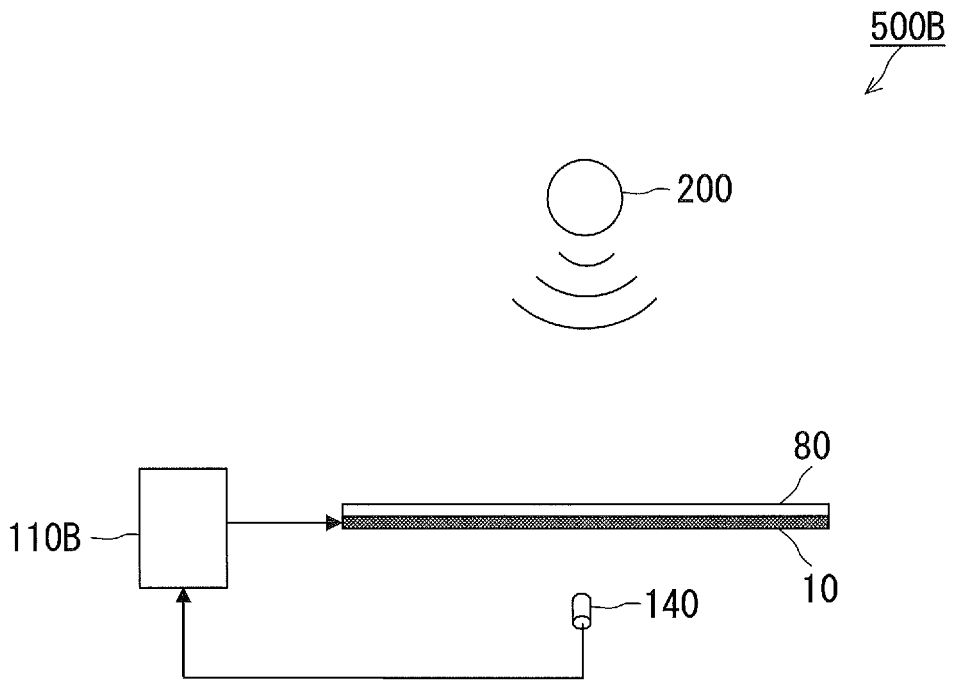
FIG. 14B is a configuration diagram of a single-channel ANC system.
Figure 14C:
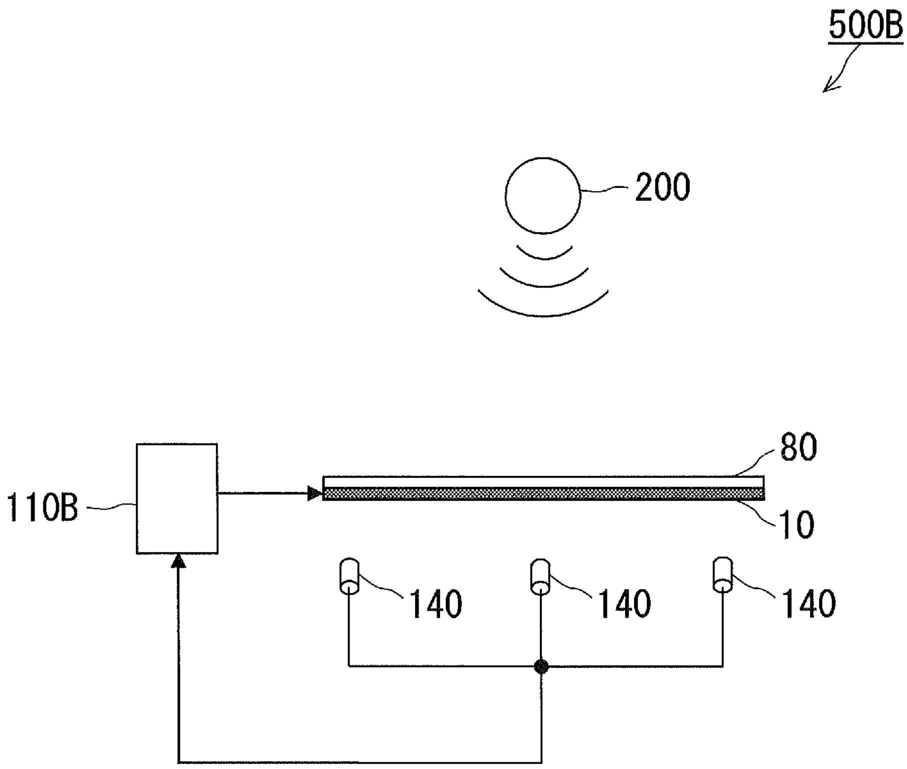
FIG. 14C is a configuration diagram of a multi-channel ANC system.

FIG. 14B schematically shows the single-channel ANC system 500B. FIG. 14C schematically shows the multi-channel ANC system 500B. The single-channel ANC system 500B is advantageous in view of achieving simple control. Meanwhile, the multi-channel ANC system 500B can reduce noise at a point of each of the error microphones 140. Providing a plurality of control points by the plurality of error microphones 140 is advantageous in view of achieving sound reduction in a large sp ace.

Figure 14D:
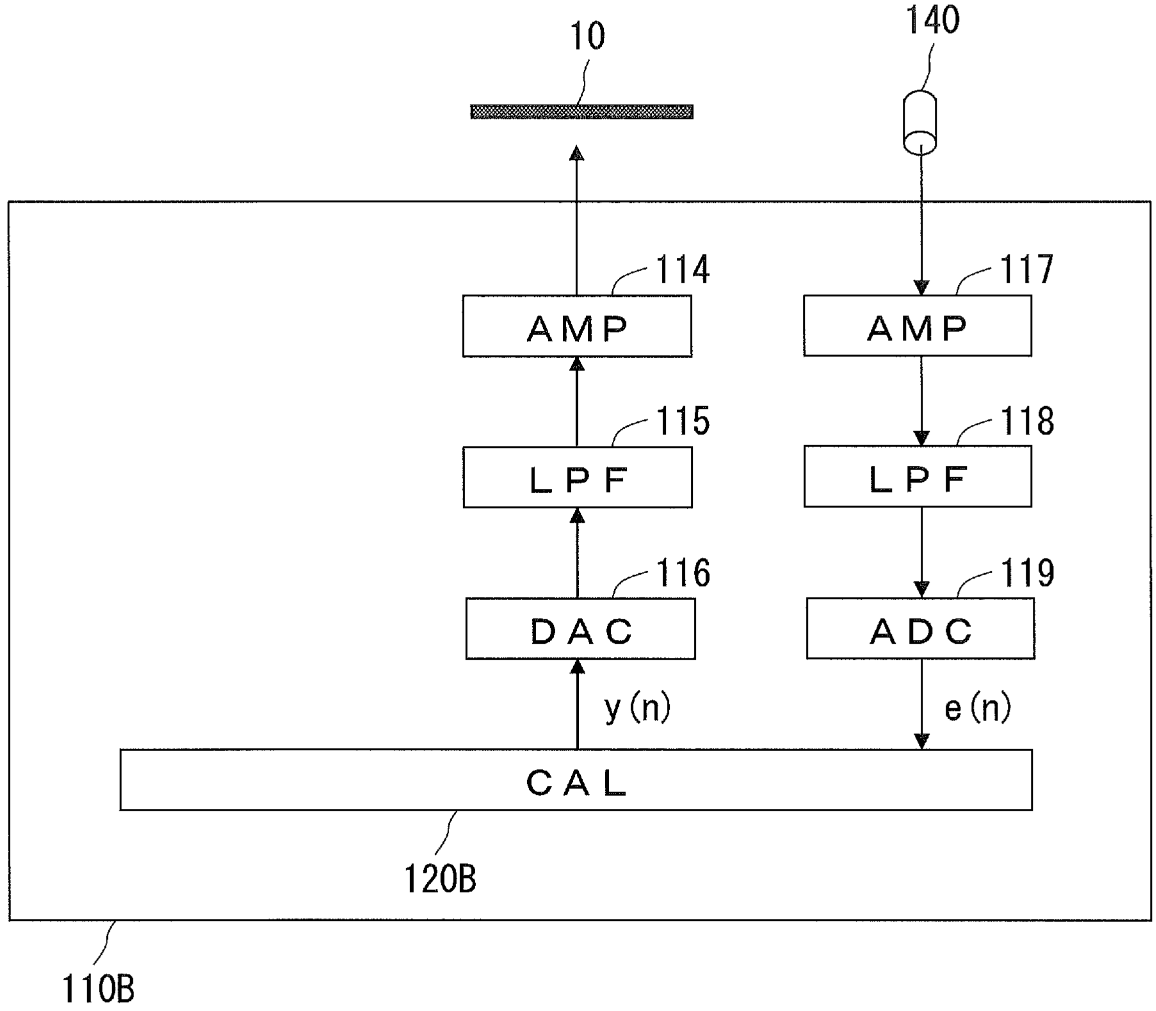
FIG. 14D is a configuration diagram of a controller.

FIG. 14D is a configuration diagram of a controller 110B according to an example. The controller 110B includes the power amp 114, the low-pass filter 115, the DA converter 116, the preamp 117, the low-pass filter 118, the AD converter 119, and a calculation unit 120B.

The preamp 117 amplifies an output signal of the error microphone 140. The low-pass filter 118 passes a low-pass component of an output signal of the preamp 117. The AD converter 119 converts an output signal of the low-pass filter 118 into a digital signal. As a result, an error signal e(n) at the time n is output from the AD converter 119.

The operation unit 120B generates a control signal y(n) at the time n from the error signal e(n). The operation unit 120B includes, for example, a DSP or an FPGA. The operation unit 120B operates based on, for example, the filtered-x algorithm.

The DA converter 116 converts the control signal y(n) into an analog signal. The low-pass filter 115 passes a low-pass component of an output signal of the DA converter 116. The power amp 114 amplifies an output signal of the low-pass filter 115. A signal output from the power amp 114 is transmitted as a control signal to the speaker 10. Based on this signal, sound is output from the radiation surface 15.

As can be understood from the above description, the ANC system 500B includes the error microphone 140 and the controller 110B. The structure 80, the speaker 10, and the error microphone 140 are arranged in this order. The controller 110B performs feedback control of controlling sound to be output from the speaker 10 based on an output signal of the error microphone 140. Feedback control enables reduction of a periodic signal with no need for the reference microphone 130 of FIG. 13A.

As can be understood from the description on the ANC systems 500A and 500B, the controller 110 of the ANC system 500 can have at least one amp. The controller 110 can have at least one low-pass filter. The controller 110 can have at least one AD converter. The controller 110 can have at least one DA converter. These elements can contribute to control on sound to be output from the speaker 10.

The ANC system 500 may be provided in an office and the like. In a specific example, the speaker 10 is attached to the structure 80 that is a partition. The noise source 200 is a person in a certain conference space. The region 300 is another conference space.

[First Structure Example of Speaker 10]

A speaker 10 according to a first structure example will be described with reference to FIG. 15 and FIG. 16. In the first structure example, the speaker 10 is a piezoelectric speaker including a piezoelectric film. Hereinafter, the speaker 10 according to the first structure example is referred to also as piezoelectric speaker 10.

The piezoelectric speaker 10 includes a piezoelectric film 35, a first joining layer 51, an interposed layer 40, and a second joining layer 52. The first joining layer 51, the interposed layer 40, the second joining layer 52, and the piezoelectric film 35 are laminated in this order.

The piezoelectric film 35 includes a piezoelectric body 30, a first electrode 61, and a second electrode 62.

The piezoelectric body 30 has the shape of a film. The piezoelectric body 30 is vibrated by application of voltage. A ceramic film, a resin film, and the like can be used as the piezoelectric body 30. Examples of the material of the piezoelectric body 30 that is a ceramic film include lead zirconate, lead zirconate titanate, lead lanthanum zirconate titanate, barium titanate, Bi-layered compounds, compounds having a tungsten bronze structure, and solid solutions of barium titanate and bismuth ferrite. Examples of the material of the piezoelectric body 30 that is a resin film include polyvinylidene fluoride and polylactic acid. The material of the piezoelectric body 30 that is a resin film may be a polyolefin such as polyethylene or polypropylene. The piezoelectric body 30 may be a non-porous body or may be a porous body.

The thickness of the piezoelectric body 30 falls within a range of for example 10 μm to 300 μm, and may fall within a range of 30 μm to 110 μm.

The first electrode 61 and the second electrode 62 are in contact with the piezoelectric body 30 so as to sandwich the piezoelectric body 30 therebetween. The first electrode 61 and the second electrode 62 each have the shape of a film. The first electrode 61 and the second electrode 62 are each connected to a lead wire which is not illustrated. The first electrode 61 and the second electrode 62 can be formed on the piezoelectric body 30 by vapor deposition, plating, sputtering, or the like. A metal foil can be used as each of the first electrode 61 and the second electrode 62. A metal foil can be stuck to the piezoelectric body 30 using a double-faced tape, a pressure-sensitive adhesive, an adhesive, or the like. Examples of the materials of the first electrode 61 and the second electrode 62 include metals, and specific examples thereof include gold, platinum, silver, copper, palladium, chromium, molybdenum, iron, tin, aluminum, and nickel. Examples of the materials of the first electrode 61 and the second electrode 62 also include carbon and electrically conductive polymers. Examples of the materials of the first electrode 61 and the second electrode 62 also include alloys of the above metals. The first electrode 61 and the second electrode 62 may include, for example, a glass component.

The thickness of the first electrode 61 and that of the second electrode 62 each may fall within a range of for example 10 nm to 150 μm, and may fall within a range of 20 nm to 100 μm.

Figure 15:
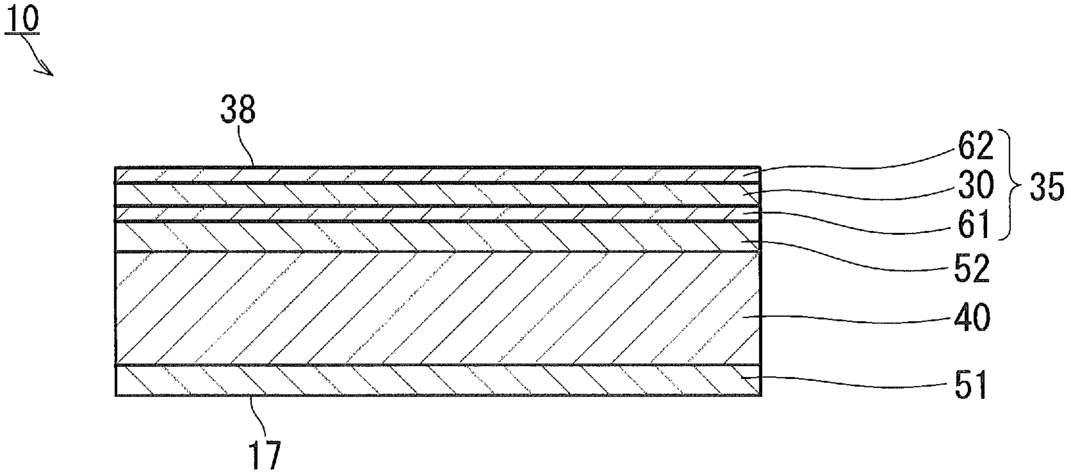
FIG. 15 is a cross-sectional view taken along a section parallel to a thickness direction of a piezoelectric speaker.
Figure 16:
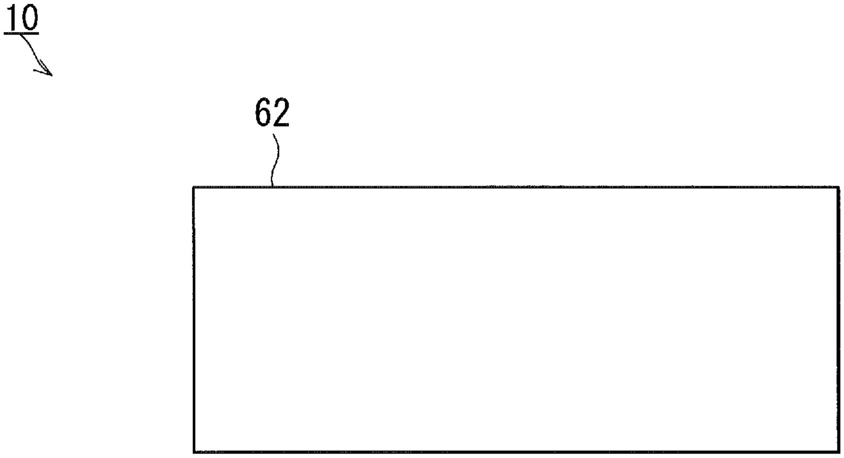
FIG. 16 is a top view of the piezoelectric speaker when viewed from the opposite side to a fixing surface.

In the examples in FIG. 15 and FIG. 16, the first electrode 61 entirely covers one of principal surfaces of the piezoelectric body 30. The first electrode 61 may only partially cover the one principal surface of the piezoelectric body 30. The second electrode 62 entirely covers the other principal surface of the piezoelectric body 30. The second electrode 62 may only partially cover the other principal surface of the piezoelectric body 30.

In the first structure example, the interposed layer 40 is disposed between the piezoelectric film 35 and the first joining layer 51. The interposed layer 40 may be a layer other than an adhesive layer and a pressure-sensitive adhesive layer, or may be an adhesive layer or a pressure-sensitive adhesive layer. In the first structure example, the interposed layer 40 is a porous body layer and/or a resin layer. Here, the resin layer is a concept including a rubber layer and an elastomer layer. Accordingly, the interposed layer 40 that is a resin layer may be a rubber layer or an elastomer layer. Examples of the interposed layer 40 that is a resin layer include an ethylene propylene rubber layer, a butyl rubber layer, a nitrile rubber layer, a natural rubber layer, a styrene-butadiene rubber layer, a silicone layer, a urethane layer, and an acrylic resin layer. Examples of the interposed layer 40 that is a porous body layer include foam layers. Specifically, examples of the interposed layer 40 that is a porous body layer and a resin layer include an ethylene propylene rubber foam layer, a butyl rubber foam layer, a nitrile rubber foam layer, a natural rubber foam layer, a styrene-butadiene rubber foam layer, a silicone foam layer, and a urethane foam layer. Examples of the interposed layer 40 that is not a porous body layer and is a resin layer include acrylic resin layers. Examples of the interposed layer 40 that is not a resin layer and is a porous body layer include porous metal body layers. Here, the resin layer refers to a layer containing a resin, and refers to a layer that may contain a resin in an amount of 30% or more, in an amount of 45% or more, in an amount of 60% or more, or in an amount of 80% or more. The same applies to, for example, a rubber layer, an elastomer layer, an ethylene propylene rubber layer, a butyl rubber layer, a nitrile rubber layer, a natural rubber layer, a styrene-butadiene rubber layer, a silicone layer, a urethane layer, an acrylic resin layer, and a metal layer. Further, the same applies to a resin film, a ceramic film, and the like that can be employed as the piezoelectric body 30. The interposed layer 40 may be a blended layer including two or more materials.

The elastic modulus of the interposed layer 40 is, for example, 10000 $N/m^2$ to 20000000 $N/m^2$, and may be 20000 $N/m^2$ to 100000 $N/m^2$.

In an example, the pore diameter of the interposed layer 40 that is a porous body layer is 0.1 mm to 7.0 mm, and may be 0.3 mm to 5.0 mm. In another example, the pore diameter of the interposed layer 40 that is a porous body layer is, for example, 0.1 mm to 2.5 mm, and may be 0.2 mm to 1.5 mm or 0.3 mm to 0.7 mm. The porosity of the interposed layer 40 that is a porous body layer is, for example, 70% to 99%, and may be 80% to 99% or 90% to 95%.

A known foam (for example, the foam used in Patent Literature 2) can be used as the interposed layer 40 that is a foam layer. The interposed layer 40 that is a foam layer may have an open-cell structure, a closed-cell structure, or a semi-open-/semi-closed-cell structure. The term "open-cell structure" refers to a structure having an open cell rate of 100%. The term "closed-cell structure" refers to a structure having an open cell rate of 0%. The term "semi-open-/semi-closed-cell structure" refers to a structure having an open cell rate of greater than 0% and less than 100%. The open cell rate can be calculated, for example, using the following equation after a test in which a foam layer is sunk in water: open cell rate (%)={(volume of absorbed water)/(volume of cell part)}×100. In a specific example, the "volume of absorbed water" can be obtained by sinking and leaving a foam layer in water under a reduced pressure of −750 mmHg for 3 minutes, measuring the mass of water having replaced the air in cells of the foam layer, and converting the mass of water in the cells into volume on the assumption that the density of water is 1.0 $g/cm^3$. The term "volume of cell part" refers to a value calculated using the following equation: volume of cell part ($cm^3$)={(mass of foam layer)/(apparent density of foam layer)}-{(mass of foam layer)/(density of material)}. The term "density of material" refers to the density of a matrix (solid, or non-hollow, body) forming the foam layer.

The foaming factor (the ratio between the density before foaming and that after foaming) of the interposed layer 40 that is a foam layer is, for example, 5 to 40, and may be 10 to 40.

The interposed layer 40 in an uncompressed state has a thickness of, for example, 0.1 mm to 30 mm, and may have a thickness of 1 mm to 30 mm, 1.5 mm to 30 mm, or 2 mm to 25 mm. The interposed layer 40 in an uncompressed state is typically thicker than the piezoelectric film 35 in an uncompressed state. The thickness of the interposed layer 40 in an uncompressed state is, for example, 3 or more times the thickness of the piezoelectric film 35 in an uncompressed state, and may be 10 or more times or 30 or more times the thickness of the piezoelectric film 35 in an uncompressed state. The interposed layer 40 in an uncompressed state is typically thicker than the first joining layer 51 in an uncompressed state.

A surface of the first joining layer 51 forms the fixing surface 17. The first joining layer 51 is a layer to be joined to the structure 80. In the example in FIG. 15, the first joining layer 51 is joined to the interposed layer 40.

In the first structure example, the first joining layer 51 is a layer having pressure-sensitive adhesiveness or adhesiveness. In other words, the first joining layer 51 is an adhesive layer or a pressure-sensitive adhesive layer. The fixing surface 17 is an adhesive surface or a pressure-sensitive adhesive surface. The first joining layer 51 can be stuck to the structure 80. In the example in FIG. 1, the first joining layer 51 is in contact with the interposed layer 40.

Examples of the first joining layer 51 include a double-faced tape including a substrate and a pressure-sensitive adhesive applied to the both sides of the substrate. Examples of the substrate of the double-faced tape used as the first joining layer 51 include non-woven fabric. Examples of the pressure-sensitive adhesive of the double-faced tape used as the first joining layer 51 include pressure-sensitive adhesives including an acrylic resin. The first joining layer 51 may be a layer including no substrate and formed of a pressure-sensitive adhesive.

The thickness of the first joining layer 51 is, for example, 0.01 mm to 1.0 mm, and may be 0.05 mm to 0.5 mm.

The second joining layer 52 is disposed between the interposed layer 40 and the piezoelectric film 35. In the first structure example, the second joining layer 52 is a layer having pressure-sensitive adhesiveness or adhesiveness. In other words, the second joining layer 52 is an adhesive layer or a pressure-sensitive adhesive layer. Specifically, the second joining layer 52 is joined to the interposed layer 40 and the piezoelectric film 35.

Examples of the second joining layer 52 include a double-faced tape including a substrate and a pressure-sensitive adhesive applied to the both sides of the substrate. Examples of the substrate of the double-faced tape used as the second joining layer 52 include non-woven fabric. Examples of the pressure-sensitive adhesive of the double-faced tape used as the second joining layer 52 include pressure-sensitive adhesives including an acrylic resin. The second joining layer 52 may be a layer including no substrate and formed of a pressure-sensitive adhesive.

The thickness of the second joining layer 52 is, for example, 0.01 mm to 1.0 mm, and may be 0.05 mm to 0.5 mm.

In the first structure example, the piezoelectric film 35 is integrated with the layers on the fixing surface 17 side by bringing an adhesive surface or a pressure-sensitive adhesive surface into contact with the piezoelectric film 35. Specifically, in the first structure example, the adhesive surface or the pressure-sensitive adhesive surface is a face formed of a surface of the second pressure-sensitive adhesive or adhesive layer 52.

The piezoelectric speaker 10 is applicable to the ANC system 500. Compared with dynamic speakers, the piezoelectric speaker 10 requires a short time from reach of an electric signal to the speaker to output of sound (hereinafter, this time is referred to also as delay time). Accordingly, the piezoelectric speaker 10 is suitable for configuring a compact ANC system because of not only being small in size but also being able to reduce the distance between the reference microphone 130 and the piezoelectric speaker 10. It is also possible, for example, to attach the reference microphone 130, the controller 110, and the piezoelectric speaker 10 to a single partition.

While the piezoelectric speaker 10 is fixed to the structure 80, a voltage is applied to the piezoelectric film 35 through a lead wire. This vibrates the piezoelectric film 35, and thus a sound wave is radiated from the piezoelectric film 35.

The piezoelectric speaker 10 and the ANC system 500 to which the piezoelectric speaker 10 is applied will be further described.

The piezoelectric speaker 10 can be fixed to the structure 80 by the fixing surface 17. In such a manner, the ANC system 500 employing the piezoelectric speaker 10 can be configured. In the ANC system 500, the interposed layer 40 is disposed between the piezoelectric film 35 and the structure 80.

It is likely that lower-frequency sound in the audible range is easily generated from the piezoelectric film 35 owing to the interposed layer 40 adequately holding one of the principal surfaces of the piezoelectric film 35, although the detail of the effect needs to be studied in the future. Given this, the interposed layer 40 can be disposed on a region accounting for 25% or more of the area of the piezoelectric film 35 when the piezoelectric film 35 is viewed in plan. The interposed layer 40 may be disposed on a region accounting for 50% or more of the area of the piezoelectric film 35, on a region accounting for 75% or more of the area of the piezoelectric film 35, or on the entire region of the piezoelectric film 35 when the piezoelectric film 35 is viewed in plan. Also, 50% or more of a principal surface 38 can be formed of the piezoelectric film 35. The principal surface 38 is one of principal surfaces of the piezoelectric speaker 10 and is opposite to the fixing surface 17 that is the other principal surface. 75% or more of the principal surface 38 may be formed of the piezoelectric film 35, or the entire principal surface 38 may be formed of the piezoelectric film 35.

In the first structure example, the second joining layer 52 prevents the piezoelectric film 35 and the interposed layer 40 from separating from each other. In view of adequate holding, which is mentioned above, the second joining layer 52 and the interposed layer 40 can be disposed on a region accounting for 25% or more of the area of the piezoelectric film 35 when the piezoelectric film 35 is viewed in plan. The second joining layer 52 and the interposed layer 40 may be disposed on a region accounting for 50% or more of the area of the piezoelectric film 35, on a region accounting for 75% or more of the area of the piezoelectric film 35, or on the entire region of the piezoelectric film 35 when the piezoelectric film 35 is viewed in plan.

In the case where the interposed layer 40 is a porous body, the rate of the region where the interposed layer 40 is disposed is defined not from a microscopical perspective in consideration of pores in the porous structure of the interposed layer 40, but rather from a relatively macroscopic perspective. For example, in the case where the piezoelectric film 35, the interposed layer 40 that is a porous body, and the second joining layer 52 are plate-like bodies having the same outline in plan, the second joining layer 52 and the interposed layer 40 are described as being disposed on a region accounting for 100% of the area of the piezoelectric film 35. In the first structure example, the interposed layer 40 has a holding degree of $5\times10^9$ N/m$^3$ or less. The interposed layer 40 has a holding degree of, for example, $1\times10^4$ N/m$^3$ or more. The interposed layer 40 has a holding degree of preferably $5\times10^8$ N/m$^3$ or less, more preferably $2\times10^8$ N/m$^3$ or less, and even more preferably $1\times10^5$ to $5\times10^7$ N/m$^3$. The holding degree (N/m$^3$) of the interposed layer 40 is a value obtained by dividing a product of the elastic modulus (N/m$^2$) of the interposed layer 40 and the surface filling area ratio of the interposed layer 40 by the thickness (m) of the interposed layer 40, as represented by the following equation. The surface filling area ratio of the interposed layer 40 is the filling area ratio (a value obtained by subtracting the porosity from 1) of the principal surface on the piezoelectric film 35 side of the interposed layer 40. In the case where pores of the interposed layer 40 are evenly distributed, the surface filling area ratio can be regarded as equal to a three-dimensionally determined filling area ratio of the interposed layer 40.

$$\text{Holding degree (N/m}^3\text{)}=\text{Elastic modulus (N/m}^2\text{)}\times\text{Surface filling area ratio}\div\text{Thickness (m)}$$

The holding degree can be considered to be a parameter representing the degree of holding the piezoelectric film 35 by means of the interposed layer 40. The above equation indicates that the greater the elastic modulus of the interposed layer 40 is, the greater the degree of holding becomes. The above equation indicates that the greater the surface filling area ratio of the interposed layer 40 is, the greater the degree of holding becomes. The above equation indicates that the smaller the thickness of the interposed layer 40 is, the greater the degree of holding becomes. Although the relationship between the holding degree of the interposed layer 40 and sound generated from the piezoelectric film 35 needs to be studied in the future, it is likely that an excessively great holding degree prevents the piezoelectric film 35 from deforming, which is necessary to emit lower-frequency sound. On the other hand, in the case where the holding degree is excessively small, it is likely that the piezoelectric film 35 does not sufficiently deform in its thickness direction and extends and contracts only in its in-plane direction (the direction perpendicular to the thickness direction) and thus generation of lower-frequency sound is prevented. It is thought that since the holding degree of the interposed layer 40 is set within an adequate range, extension and contraction of the piezoelectric film 35 in the in-plane direction is adequately converted into deformation thereof in the thickness direction and that results in appropriate bending of the piezoelectric film 35 as a whole and makes it easy to generate lower-frequency sound.

As can be understood from the above description, there may be a layer other than the interposed layer 40 between the piezoelectric film 35 and the fixing surface 17. The other layer is, for example, the second pressure-adhesive layer 52.

The structure 80 may have a greater holding degree than that of the interposed layer 40. In this case as well, lower-frequency sound can be generated from the piezoelectric film 35 because of the contribution by the interposed layer 40. The structure 80 may have the same holding degree as that of the interposed layer 40, or may have a smaller holding degree than that of the interposed layer 40. The holding degree (N/m$^3$) of the structure 80 is a value obtained by dividing a product of the elastic modulus (N/m$^2$) of the structure 80 and the surface filling area ratio of the structure 80 by the thickness (m) of the structure 80. The surface filling area ratio of the structure 80 is the filling area ratio (a value obtained by subtracting the porosity from 1) of the principal surface on the piezoelectric film 35 side of the structure 80.

The structure 80 typically has a high stiffness (the product of Young's modulus and the second moment of area), a high Young's modulus, and/or a great thickness, compared to the interposed layer 40. The structure 80 may have the same stiffness, Young's modulus, and/or thickness as that of the interposed layer 40, or may have a lower stiffness, a lower Young's modulus, and/or a smaller thickness than that of the interposed layer 40. The Young's modulus of the structure 80 is, for example, 1 GPa or more, and may be 10 GPa or more, or 50 GPa or more. The upper limit of the Young's modulus of the structure 80 is not particularly limited, and is for example 1000 GPa.

In the illustrated example, the piezoelectric film 35 is not completely surrounded by the interposed layer 40. In the illustrated example, a virtual straight line passes through the interposed layer 40 and the piezoelectric film 35 in this order, and then reaches the outside of the speaker 10 without passing through the interposed layer 40. Here, the phrase "virtual straight line passes" means that such a straight line can be drawn. In the illustrated example, the interposed layer 40 extends only toward the fixing surface 17 when viewed from the piezoelectric film 35.

In the illustrated example, the principal surface 38, which is opposite to the fixing surface 17, of the piezoelectric film 35, forms the radiation surface 15. That is, the principal surface 38 is one of principal surfaces of the piezoelectric film 35 which is more distant from the interposed layer 40 than the other is, and forms the radiation surface 15. In this structure, since the principal surface of the piezoelectric film 35 on the interposed layer 40 side is held by the interposed layer 40, extension and contraction of the piezoelectric film 35 in the in-plane direction can be adequately converted into deformation thereof in the thickness direction. Other embodiment may be employed.

Specifically, a first layer may be provided on the opposite side of the piezoelectric film 35 from the interposed layer 40. For example, the first layer is used for protecting the piezoelectric film 35. In this case, a principal surface of the first layer can form the radiation surface 15. Alternatively, a second layer other than the first layer can form the radiation surface 15.

The thickness of the first layer is, for example, 0.05 mm to 5 mm. The material of the first layer is, for example, a polyester-based material. Here, the polyester-based material refers to a material containing polyester, and refers to a material that may contain 30% or more polyester, 45% or more polyester, 60% or more polyester, and 80% or more polyester. In an example, the material of the interposed layer 40 is different from the material of the first layer. In the case where the material of the interposed layer 40 is different from the material of the first layer, it is possible to make a difference between the degree to which the principal surface on the interposed layer 40 side of the piezoelectric film 35 is held and the degree to which the principal surface on the first layer side of the piezoelectric film 35. This can allow to adequately convert extension and contraction of the piezoelectric film 35 in the in-plane direction into deformation thereof in the thickness direction. The holding degree of the interposed layer 40 may be different from the holding degree of the first layer. Here, the holding degree (N/m$^3$) of the first layer is a value obtained by dividing the product of the elastic modulus (N/m$^2$) of the first layer and the surface filling area ratio of the first layer by the thickness (m) of the first layer. The surface filling area ratio of the first layer is the filling area ratio (a value obtained by subtracting the porosity from 1) of the principal surface on the piezoelectric film 35 side of the first layer. The interposed layer 40 and the first layer differing from each other in holding degree can allow to adequately convert extension and contraction of the piezoelectric film 35 in the in-plane direction into deformation thereof in the thickness direction. In a specific example, the interposed layer 40 has a higher holding degree than the first layer has. The first layer may have the shape of a film. The first layer may be non-woven fabric.

In the first structure example, the fixing surface 17 is disposed so that at least a portion of the piezoelectric film 35 overlaps the fixing surface 17 (the first joining layer 51 in the example in FIG. 15) when the piezoelectric film 35 is viewed in plan. In view of stably fixing the piezoelectric speaker 10 to the structure 80, the fixing surface 17 can be disposed on a region accounting for 50% or more of the area of the piezoelectric film 35 when the piezoelectric film 35 is viewed in plan. The fixing surface 17 may be disposed on a region accounting for 75% or more of the area of the piezoelectric film 35 or on the entire region of the piezoelectric film 35 when the piezoelectric film 35 is viewed in plan.

In the first structure example, adjacent layers between the piezoelectric film 35 and the fixing surface 17 are joined to each other. Here, the phrase "between the piezoelectric film 35 and the fixing surface 17" includes the piezoelectric film 35 and the fixing surface 17. Specifically, the first joining layer 51 and the interposed layer 40 are joined to each other, the interposed layer 40 and the second joining layer 52 are joined to each other, and the second joining layer 52 and the piezoelectric film 35 are joined to each other. This allows the piezoelectric film 35 to be stably disposed regardless of the orientation in which the piezoelectric film 35 is attached to the structure 80. This also makes it easy to attach the piezoelectric film 35 to the structure 80. Moreover, because of the contribution of the interposed layer 40, sound is emitted from the piezoelectric film 35 regardless of the orientation in which the piezoelectric film 35 is attached. Thus, in the first structure example, the combination of these allows achievement of a piezoelectric speaker of high usability. The phrase "adjacent layers are joined to each other" means that the adjacent layers are entirely or partially joined to each other. In the illustrated examples, the adjacent layers are joined to each other in a predetermined region extending along the thickness direction of the piezoelectric film 35 and passing through the piezoelectric film 35, the interposed layer 40, and the fixing surface 17 in this order.

In the first structure example, the piezoelectric film 35 and the interposed layer 40 each have a substantially uniform thickness. This is often advantageous from various points of view, for example, in view of storage of the piezoelectric speaker 10, the usability thereof, and control of sound emitted from the piezoelectric film 35. Having a "substantially uniform thickness" refers to, for example, having the smallest thickness which is 70% or more and 100% or less of the largest thickness. The smallest thickness of each of the piezoelectric film 35 and the interposed layer 40 may be 85% or more and 100% or less of the largest thickness.

Resin is a material less likely to be cracked than, for example, ceramics. In a specific example, the piezoelectric body 30 of the piezoelectric film 35 is a resin film and the interposed layer 40 is a resin layer not functioning as a piezoelectric film. This specific example is advantageous in view of cutting the piezoelectric speaker 10 with for example with scissors or by hand without cracking the piezoelectric body 30 or the interposed layer 40 (the fact that the piezoelectric speaker 10 is cuttable with for example scissors or by hand contributes to greater design flexibility of the ANC system 500 and facilitates to configure the ANC system 500). Additionally, in this specific example, the piezoelectric body 30 or the interposed layer 40 is less likely to crack even when the piezoelectric speaker 10 is bent. Moreover, it is advantageous that the piezoelectric body 30 is a resin film and the interposed layer 40 is a resin layer, in view of fixing the piezoelectric speaker 10 onto a curved surface without cracking the piezoelectric body 30 or the interposed layer 40.

In the example in FIG. 15, the piezoelectric film 35, the interposed layer 40, the first joining layer 51, and the second joining layer 52 share the same outline when viewed in plan. Their outlines may be misaligned.

In the example in FIG. 15, the piezoelectric film 35, the interposed layer 40, the first joining layer 51, and the second joining layer 52 are each a rectangle having a short side and a long side when viewed in plan. The piezoelectric film 35, the interposed layer 40, the joining layer 51, and the second joining layer 52 each may be, for example, a square, a circle, or an oval.

The piezoelectric speaker 10 may also include a layer other than the layers shown in FIG. 15. The layer other than the layer layers shown in FIG. 15 is for example the first layer and the second layer described above.

[Second structure example of speaker 10]

Figure 17:
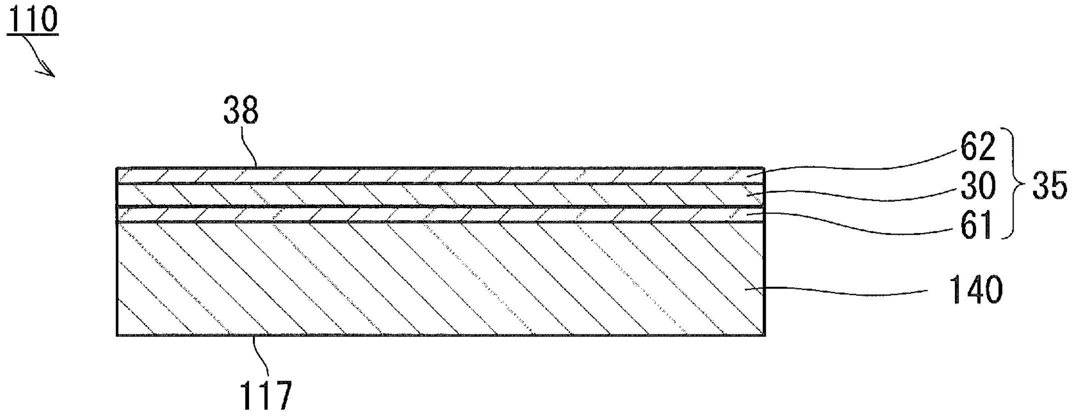
FIG. 17 shows a piezoelectric speaker according to another structure example.

A piezoelectric speaker 110 according to a second structure example will be described using FIG. 17. The features identical to those of the first structure example may not be described hereinafter.

The piezoelectric speaker 110 includes the piezoelectric film 35, a fixing surface 117, and an interposed layer 140. The fixing surface 117 can be used to fix the piezoelectric film 35 to the structure 80.

The interposed layer 140 is disposed between the piezoelectric film 35 and the fixing surface 117 (the phrase "between the piezoelectric film 35 and the fixing surface 117" includes the fixing surface 117. The same applies to the first structure example.). The fixing surface 117 is formed of a surface (principal surface) of the interposed layer 140.

The interposed layer 140 is a porous body layer and/or a resin layer. The interposed layer 140 is a pressure-sensitive adhesive layer or an adhesive layer. A pressure-sensitive adhesive including an acrylic resin can be used as the interposed layer 140. Another pressure-sensitive adhesive, for example, a pressure-sensitive adhesive including rubber, silicone, or urethane may be used as the interposed layer 140. The interposed layer 140 may be a blended layer including two or more materials.

The elastic modulus of the interposed layer 140 is, for example, 10000 $N/m^2$ to 20000000 $N/m^2$, and may be 20000 $N/m^2$ to 100000 $N/m^2$.

The interposed layer 140 in an uncompressed state has a thickness of, for example, 0.1 mm to 30 mm, and may have a thickness of 1 mm to 30 mm, 1.5 mm to 30 mm, or 2 mm to 25 mm. The interposed layer 140 in an uncompressed state is typically thicker than the piezoelectric film 35 in an uncompressed state. The thickness of the interposed layer 140 in an uncompressed state is, for example, 3 or more times the thickness of the piezoelectric film 35 in an uncompressed state, and may be 10 or more times or 30 or more times the thickness of the piezoelectric film 35 in an uncompressed state.

In the second structure example, the interposed layer 140 has a holding degree of $5\times10^9$ $N/m^3$ or less. The interposed layer 140 has a holding degree of, for example, $1\times10^4$ $N/m^3$ or more. The interposed layer 140 has a holding degree of preferably $5\times10^8$ $N/m^3$ or less, more preferably $2\times10^8$ $N/m^3$ or less, and even more preferably $1\times10^5$ to $5\times10^7$ $N/m^3$. The definition of the holding degree is as described previously.

In the second structure example, the piezoelectric film 35 is integrated with the layer on the fixing surface 117 side by bringing an adhesive surface or a pressure-sensitive adhesive surface into contact with the piezoelectric film 35. Specifically, in the second structure example, the adhesive surface or the pressure-sensitive adhesive surface is a face formed of the interposed layer 140.

The piezoelectric speaker 110 can also be fixed to the structure 80 by the fixing surface 117. In such a manner, the ANC system 500 employing the piezoelectric speaker 110 can be configured.

EXAMPLES

The present invention will be described in detail using Examples. It should be noted that Examples given below are only illustrative of the present invention and do not limit the present invention.

(Sample E1)

Figure 18:
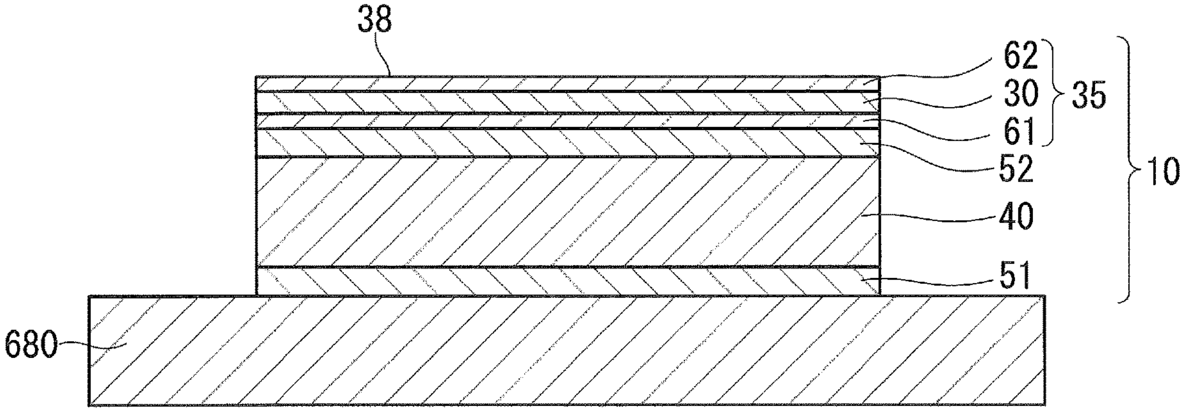
FIG. 18 is a view for illustrating structure of a produced sample.

The fixing surface 17 of the piezoelectric speaker 10 was stuck to a supporting member 680 fixed. Structure as shown in FIG. 18 was thus produced. Specifically, a 5-mm-thick stainless steel plate (SUS plate) was used as the supporting member 680. A 0.16-mm-thick pressure-sensitive adhesive sheet (double-faced tape) including non-woven fabric both sides of which were impregnated with an acrylic pressure-sensitive adhesive was used as the first joining layer 51. A 3-mm-thick closed-cell foam obtained by foaming a mixture including ethylene propylene rubber and butyl rubber by a foaming factor of about 10 was used as the interposed layer 40. A 0.15-mm-thick pressure-sensitive adhesive sheet (double-faced tape) including non-woven fabric as a substrate having both sides to which a pressure-sensitive adhesive including a solventless acrylic resin was applied was used as the second joining layer 52. A polyvinylidene fluoride film (total thickness of 33 μm) having both sides on which copper electrodes (including nickel) were vapor-deposited was used as the piezoelectric film 35. The first joining layer 51, the interposed layer 40, the second joining layer 52, and the piezoelectric film 35 of Sample E1 each have a dimension of 37.5 mm in the longitudinal direction and a dimension of 37.5 mm in the lateral direction when viewed in plan, each have the shape of a plate which is neither divided nor frame-shaped, and have outlines overlapping when viewed in plan. (The same applies to Samples E2 to E17 and R1 described later.) The supporting member 680 has a dimension of 50 mm in the longitudinal direction and a dimension of 50 mm in the lateral direction when viewed in plan and covers the entire first joining layer 51. Sample E1 having the structure as shown in FIG. 18 was produced in this manner.

(Sample E2)

A 3-mm-thick semi-open-/semi-closed-cell foam obtained by foaming a mixture including ethylene propylene rubber by a foaming factor of about 10 was used as an interposed layer 40. This foam includes sulfur. Sample E2 that is the same as Sample E1 except the above was produced.

(Sample E3)

A 5-mm-thick foam formed of the same material and having the same structure as those of the interposed layer 40 of Sample E2 was used as an interposed layer 40 in Sample E3. Sample E3 that is the same as Sample E2 except the above was produced.

(Sample E4)

A 10-mm-thick foam formed of the same material and having the same structure as those of the interposed layer 40 of Sample E2 was used as an interposed layer 40 in Sample E4. Sample E4 that is the same as Sample E2 except the above was produced.

(Sample E5)

A 20-mm-thick foam formed of the same material and having the same structure as those of the interposed layer 40 of Sample E2 was used as an interposed layer 40 in Sample E5. Sample E5 that is the same as Sample E2 except the above was produced.

(Sample E6)

A 20-mm-thick semi-open-/semi-closed-cell foam obtained by foaming a mixture including ethylene propylene rubber by a foaming factor of about 10 was used as an interposed layer 40. This foam does not include sulfur and is more flexible than the foams used as the interposed layers 40 of Samples E2 to E5. Sample E6 that is the same as Sample E1 except the above was produced.

(Sample E7)

A 20-mm-thick semi-open-/semi-closed-cell foam obtained by foaming a mixture including ethylene propylene rubber by a foaming factor of about 20 was used as an interposed layer 40. Sample E7 that is the same as Sample E1 except the above was produced.

(Sample E8)

A porous metal body was used as an interposed layer 40. This porous metal body is made of nickel and has a pore diameter of 0.9 mm and a thickness of 2.0 mm. A pressure-sensitive adhesive layer the same as a first joining layer 51 as used in Sample E1 was used as a second joining layer 52. Sample E8 that is the same as Sample E1 except the above was produced.

(Sample E9)

A first joining layer 51 and a second joining layer 52 as used in Sample E1 were omitted, and only an interposed layer 140 was interposed between a piezoelectric film 35 and a structure 80 as used in Sample E1. A 3-mm-thick substrate-less pressure-sensitive adhesive sheet formed of an acrylic pressure-sensitive adhesive was used as the interposed layer 140. Sample E9 was produced that is the same as Sample E1 except the above, which has the structure in which the laminate of FIG. 17 is attached to the supporting member 680 of FIG. 18.

(Sample E10)

An interposed layer the same as an interposed layer 140 as used in Sample E9 was used as an interposed layer 40. Sample E10 that is the same as Sample E8 except the above was produced.

(Sample E11)

A 5-mm-thick urethane foam was used as an interposed layer 40. Sample E11 that is the same as Sample E8 except the above was produced.

(Sample E12)

A 10-mm-thick urethane foam was used as an interposed layer 40. This urethane foam has a smaller pore diameter than that of the urethane foam used as the interposed layer 40 of Sample E11. Sample E12 that is the same as Sample E8 except the above was produced.

(Sample E13)

A 5-mm-thick closed-cell acrylonitrile butadiene rubber foam was used as an interposed layer 40. Sample E13 that is the same as Sample E8 except the above was produced.

(Sample E14)

A 5-mm-thick closed-cell ethylene propylene rubber foam was used as an interposed layer 40. Sample E14 that is the same as Sample E8 except the above was produced.

(Sample E15)

A 5-mm-thick closed-cell foam in which natural rubber and styrene-butadiene rubber are blended was used as an interposed layer 40. Sample E15 that is the same as Sample E8 except the above was produced.

(Sample E16)

A 5-mm-thick closed-cell silicone foam was used as an interposed layer 40. Sample E16 that is the same as Sample E8 except the above was produced.

(Sample E17)

A 10-mm-thick foam formed of the same materials and having the same structure as those of the interposed layer 40 of Sample E1 was used as an interposed layer 40. A pressure-sensitive adhesive sheet the same as that in Sample E1 was used as a second joining layer 52. A 35-μm-thick resin sheet including a corn-derived polylactic acid as a main raw material was used as a piezoelectric body 30 of a piezoelectric film 35. A first electrode 61 and a second electrode 62 of the piezoelectric film 35 are each formed of a 0.1-μm-thick aluminum film and were formed by vapor deposition. The piezoelectric film 35 having a total thickness of 35.2 μm was thus obtained. Sample E17 that is the same as Sample E1 except the above was produced.

(Sample R1)

A piezoelectric film 35 as used in Sample E1 was employed as Sample R1. In Sample R1, the sample was placed on a board parallel to the ground without being adhered to the board.

The methods for evaluation of Samples E1 to E17 and R1 are as follows.

<Thickness of Interposed Layer (Uncompressed State)>

The thickness of each of the interposed layers was measured using a thickness gauge.

<Elastic Modulus of Interposed Layer>

A small piece was cut out from each of the interposed layers. The small piece was subjected to a compression test at ordinary temperature using a tensile tester ("RSA-G2" manufactured by TA Instruments). A stress-strain curve was thus obtained. The elastic modulus was calculated from the initial slope of the stress-strain curve.

<Pore Diameter of Interposed Layer>

An enlarged image of each of the interposed layers was obtained using a microscope. The average of the pore diameters of the interposed layer was determined by image analysis of the enlarged image. The average thus determined was employed as the pore diameter of the interposed layer.

<Porosity of Interposed Layer>

A small rectangular cuboid piece was cut out from each of the interposed layers. The apparent density was determined from the volume and the mass of the small rectangular cuboid piece. The apparent density was divided by the density of a matrix (solid, or non-hollow, body) forming the interposed layer. The filling area ratio was thus calculated. Then, the filling area ratio was subtracted from 1. The porosity was thus obtained.

<Surface Filling Area Ratio of Interposed Layer>

For Samples E2 to E16, the filling area ratio calculated as above is employed as the surface filling area ratio. For Samples E1 and E17, the surface filling area ratio is 100% because the interposed layers have a surface skin layer.

<Frequency Characteristics of Sample in Terms of Sound Pressure Level>

Structure for measurement of Samples E1 to E8 and E10 to E17 is shown in

Figure 19:
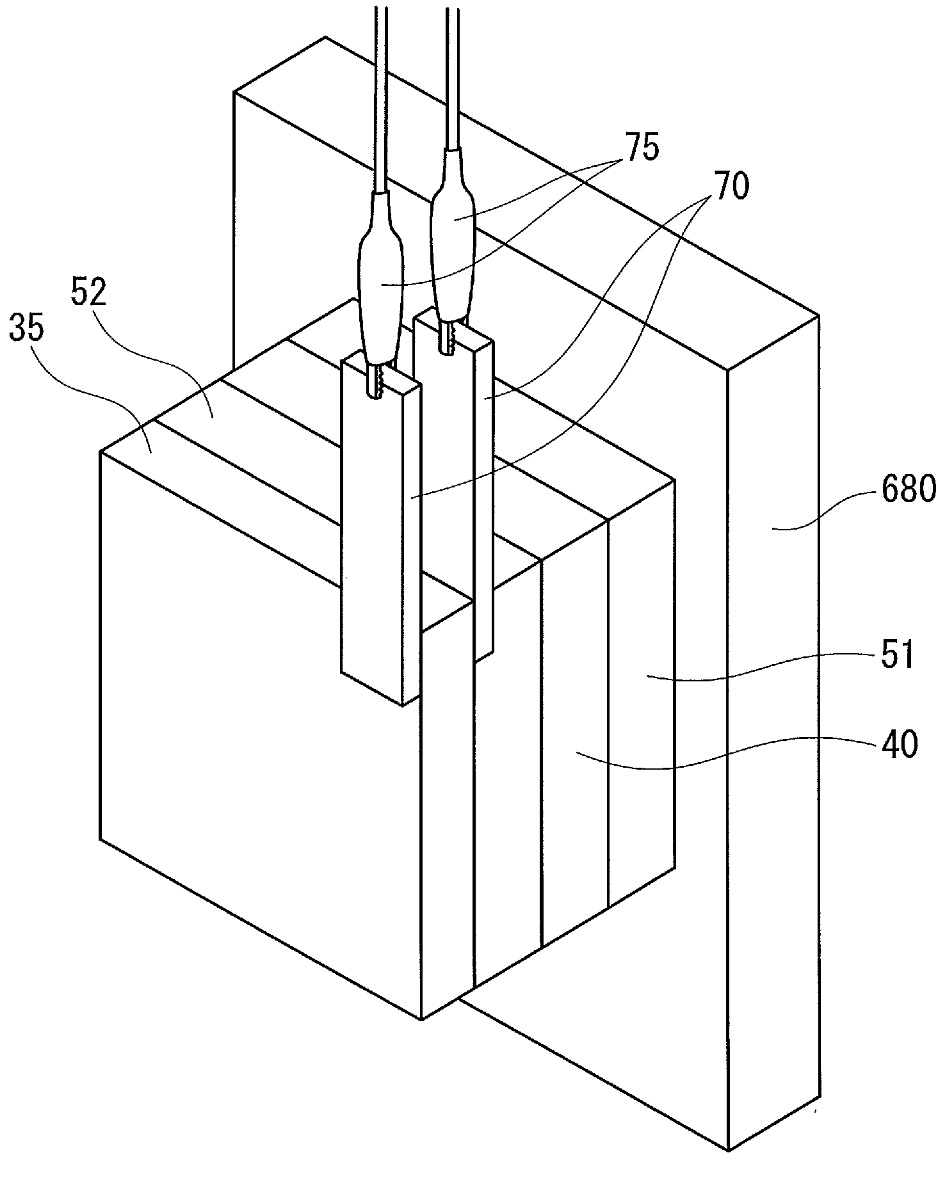
FIG. 19 is a view for illustrating structure for sample measurement.

FIG. 19. An electrically conductive copper foil tape 70 (CU-35C manufactured by 3M) having a dimension of 70 μm in the thickness direction, a dimension of 5 mm in the longitudinal direction and a dimension of 70 mm in the lateral direction was attached to a corner of each side of the piezoelectric film 35. An alligator clip 75 with a cover was attached to each of the electrically conductive copper foil tapes 70. The electrically conductive copper foil tapes 70 and the alligator clips 75 with covers compose a portion of an electrical pathway used for application of AC voltage to the piezoelectric film 35.

Figure 20:
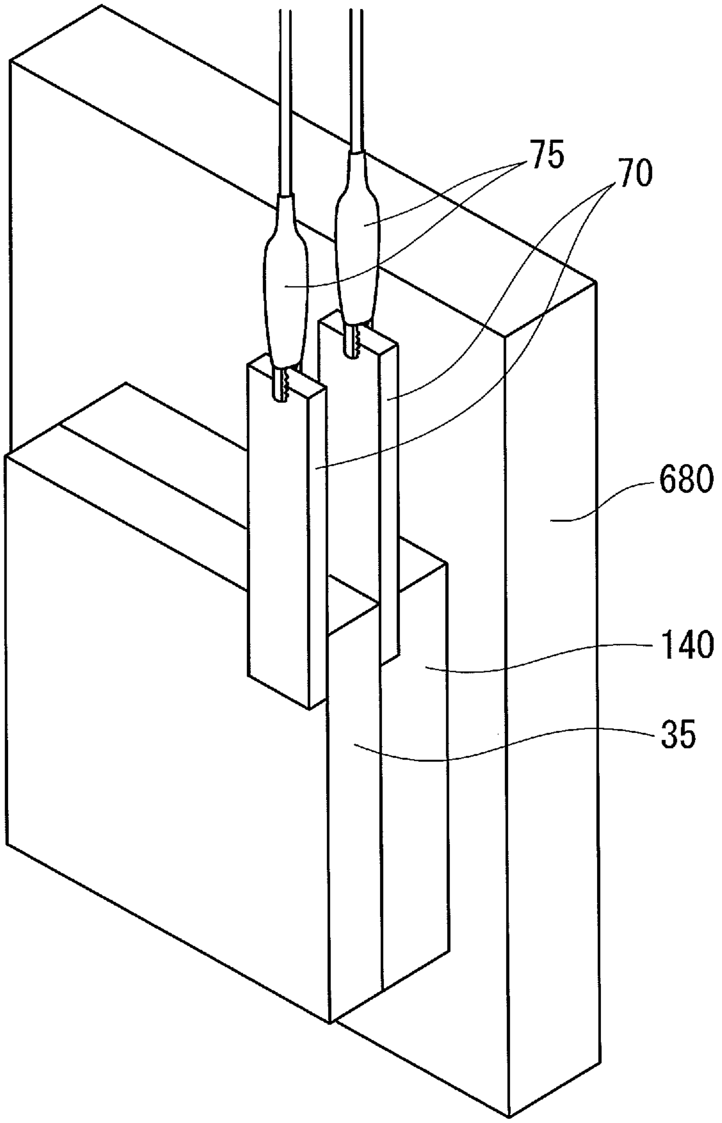
FIG. 20 is a view for illustrating structure for sample measurement.

Structure for measurement of Sample E9 is shown in FIG. 20. The structure in FIG. 20 lacks the first joining layer 51 and the second joining layer 52 of FIG. 19. The structure in FIG. 20 includes the interposed layer 140.

Structure for measurement of Sample R1 is based on the structures of FIG. 19 and FIG. 20. Specifically, as in FIG. 19 and FIG. 20, an electrically conductive copper foil tape 70 was attached to a corner of each side of the piezoelectric film 35, and an alligator clip 75 with a cover was attached to each of the tapes 70. The resulting assembly was placed on a board parallel to the ground without being adhered to the board.

Figure 21:
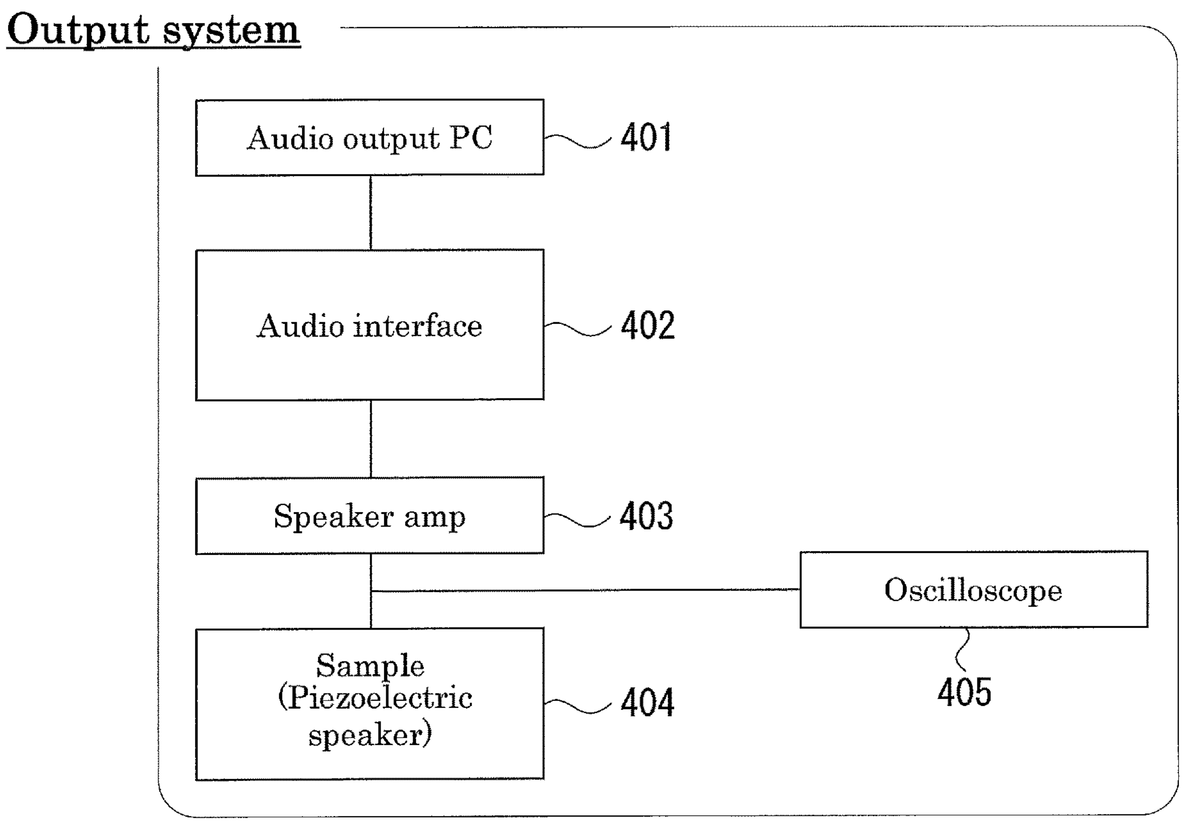
FIG. 21 is a block diagram of an output system.
Figure 22:
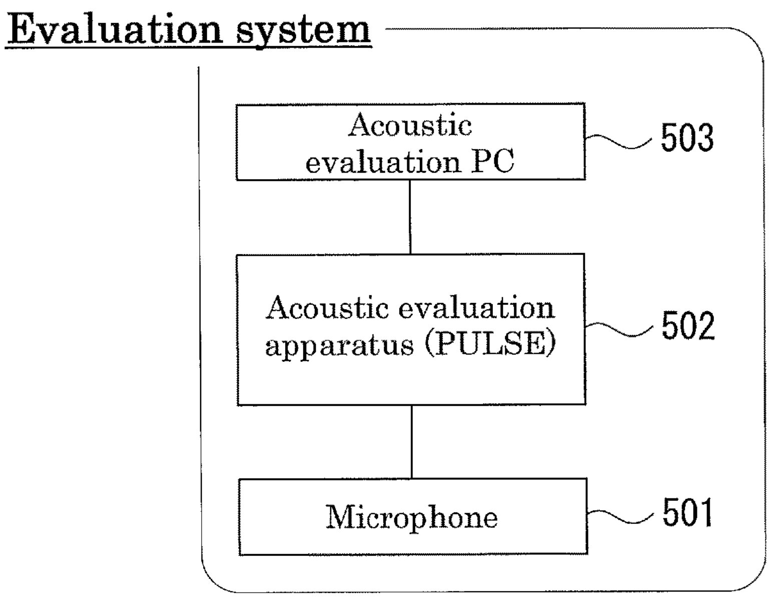
FIG. 22 is a block diagram of an evaluation system.

Block diagrams for measurement of the acoustic characteristics of the samples are shown in FIG. 21 and FIG. 22. Specifically, an output system is shown in FIG. 21, and an evaluation system is shown in FIG. 22.

In the output system shown in FIG. 21, an audio output personal computer (hereinafter, personal computer is also simplified as PC) 401, an audio interface 402, a speaker amp 403, a sample 404 (any of the piezoelectric speakers of Samples E1 to E17 and R1) were connected in this order. The speaker amp 403 was also connected to an oscilloscope 405 so that output from the speaker amp 403 to the sample 404 could be monitored.

WaveGene was installed in the audio output PC 401. WaveGene is free software for generation of a test audio signal. QUAD-CAPTURE manufactured by Roland Corporation was used as the audio interface 402. The sampling frequency of the audio interface 402 was set to 192 kHz. A-924 manufactured by Onkyo Corporation was used as the speaker amp 403. DP02024 manufactured by Tektronix, Inc. was used as the oscilloscope 405.

In the evaluation system shown in FIG. 22, a microphone 501, an acoustic evaluation apparatus (PULSE) 502, and an acoustic evaluation PC 503 were connected in this order.

Type 4939-C-002 manufactured by Bruel & Kjaer Sound & Vibration

Measurement A/S was used as the microphone 501. The microphone 501 was disposed 1 m away from the sample 404. Type 3052-A-030 manufactured by Bruel & Kjaer Sound & Vibration Measurement A/S was used as the acoustic evaluation apparatus 502.

The output system and the evaluation system were configured in the above manners. AC voltage was applied from the audio output PC 401 to the sample 404 via the audio interface 402 and the speaker amp 403. Specifically, a test audio signal whose frequency sweeps from 100 Hz to 100 kHz in 20 seconds was generated, using the audio output PC 401. During this, voltage output from the speaker amp 403 was monitored using the oscilloscope 405. Additionally, sound generated from the sample 404 was evaluated using the evaluation system. A test for measurement of the sound pressure frequency characteristics was performed in this manner.

The details of the output system and evaluation system settings are as follows.

[Output System Settings]

Frequency range: 100 Hz to 100 kHz

Sweep time: 20 seconds

Effective voltage: 10 V

Output waveform: sine curve

[Evaluation System Settings]

Measurement time: 22 seconds

Peak hold

Measurement range: 4 Hz to 102.4 kHz

Number of lines: 6400

<Determination of Frequency at which Emission of Sound Starts>

The lower end of a frequency domain (exclusive of a sharp peak portion in which a frequency range where the sound pressure level is maintained higher than that of background noise by +3 dB or more falls within ±10% of a peak frequency (a frequency at which the sound pressure level reaches a peak)) where the sound pressure level is higher than that of background noise by 3 dB or more was determined as a frequency at which emission of sound starts.

Figure 24:
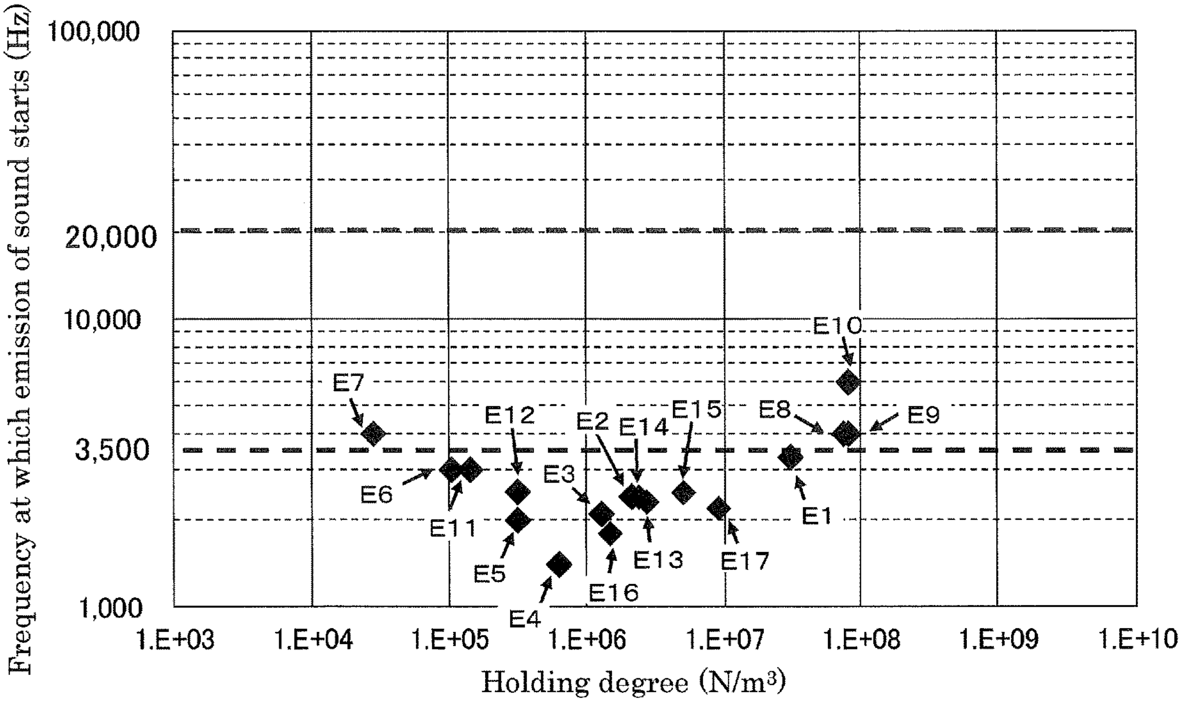
FIG. 24 is a graph showing a relationship between the holding degree of an interposed layer and a frequency at which emission of sound starts.
Figure 25:
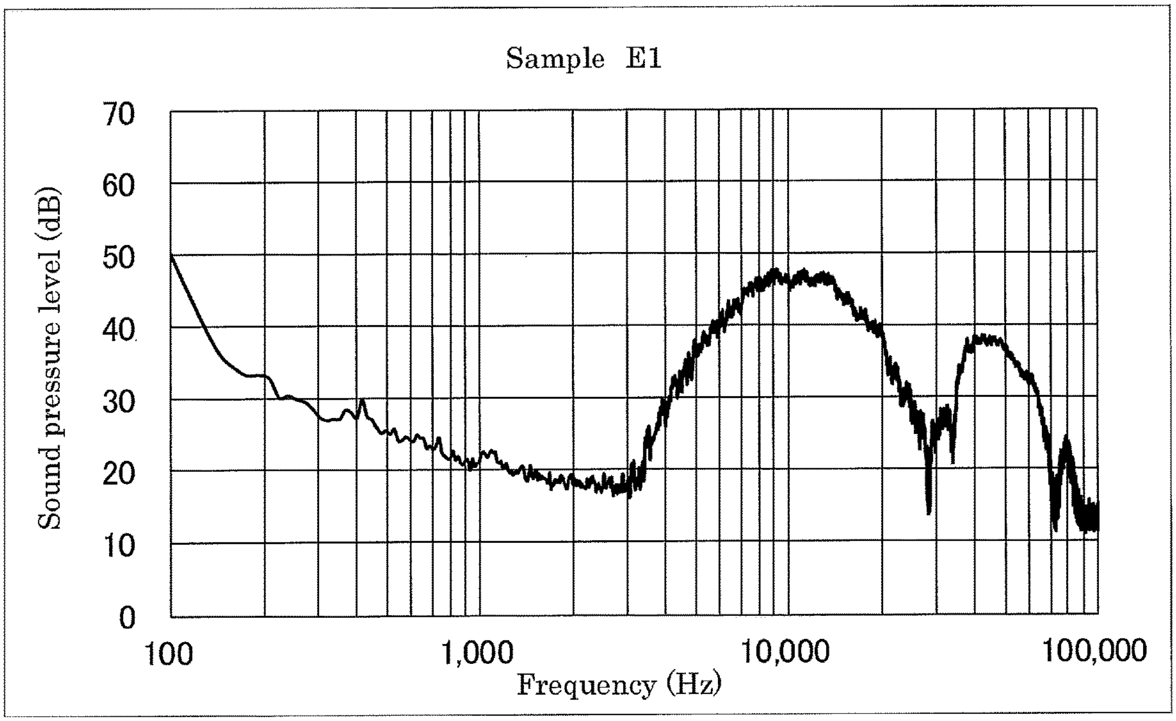
FIG. 25 is a graph showing the frequency characteristics of Sample E1 in terms of sound pressure level.
Figure 26:
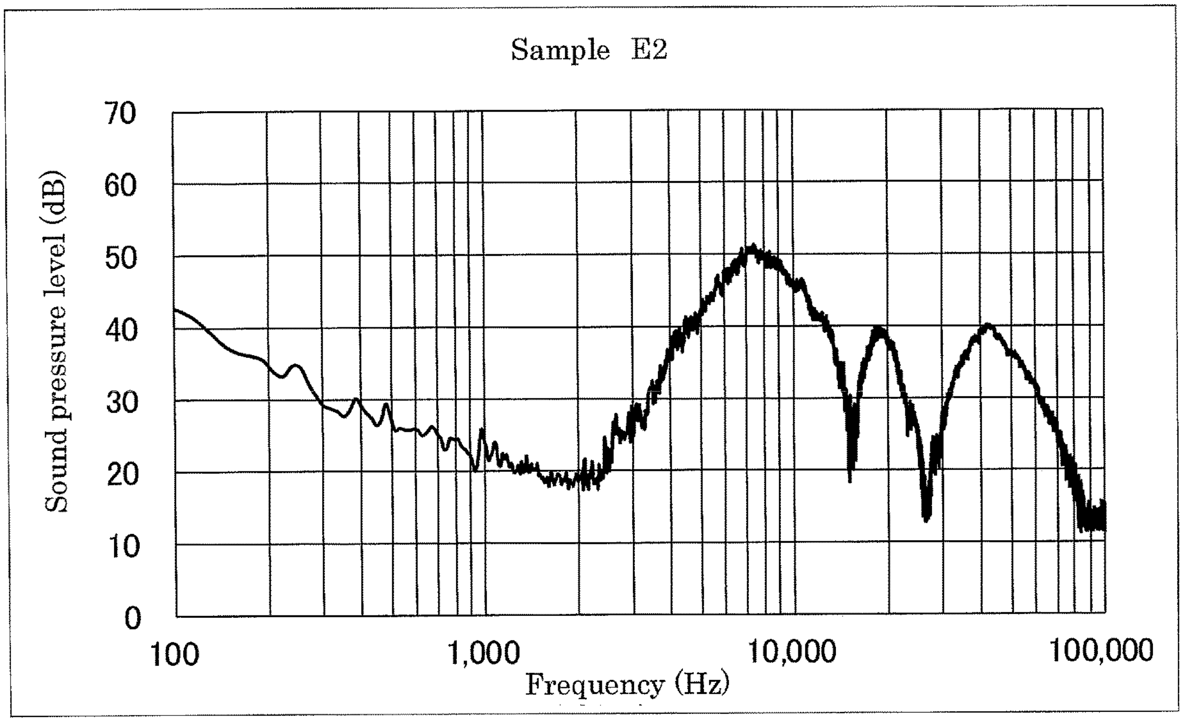
FIG. 26 is a graph showing the frequency characteristics of Sample E2 in terms of sound pressure level.
Figure 27:
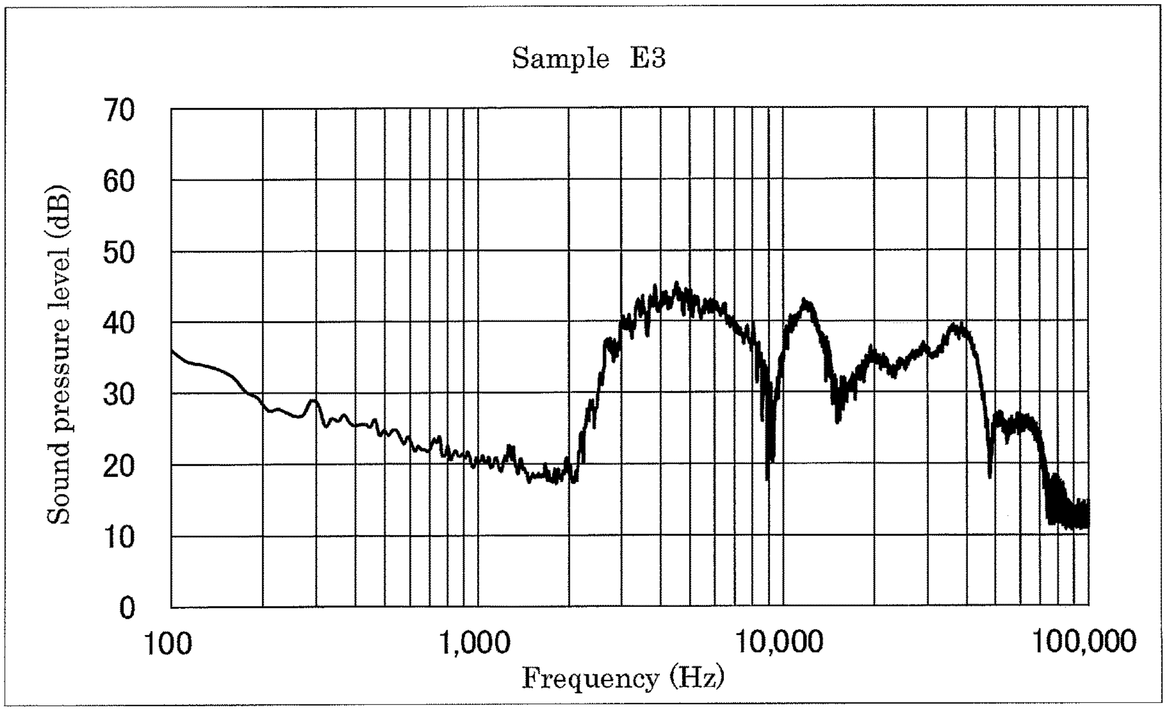
FIG. 27 is a graph showing the frequency characteristics of Sample E3 in terms of sound pressure level.
Figure 28:
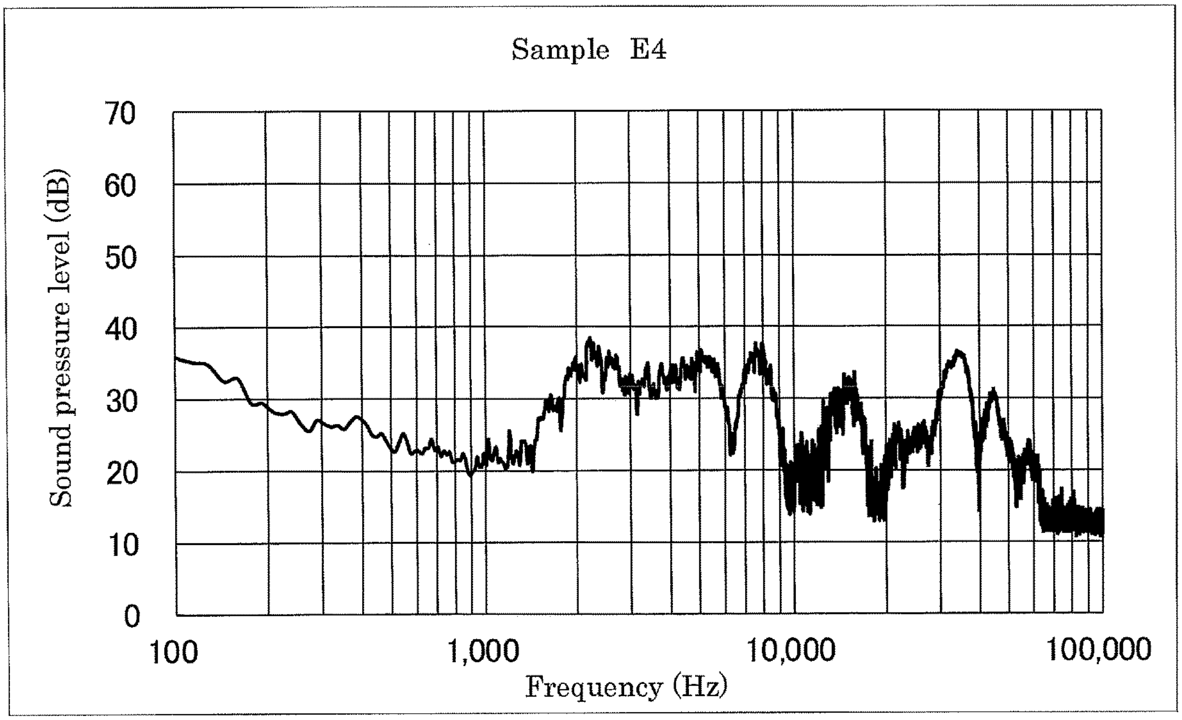
FIG. 28 is a graph showing the frequency characteristics of Sample E4 in terms of sound pressure level.
Figure 29:
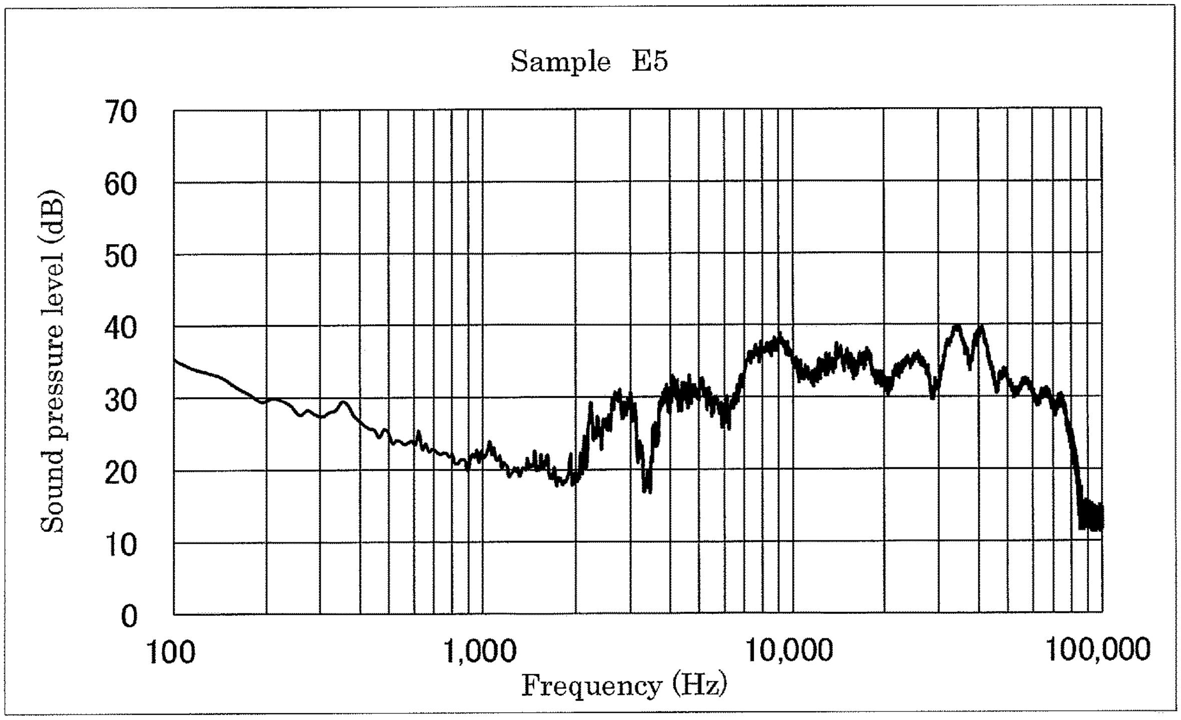
FIG. 29 is a graph showing the frequency characteristics of Sample E5 in terms of sound pressure level.
Figure 30:
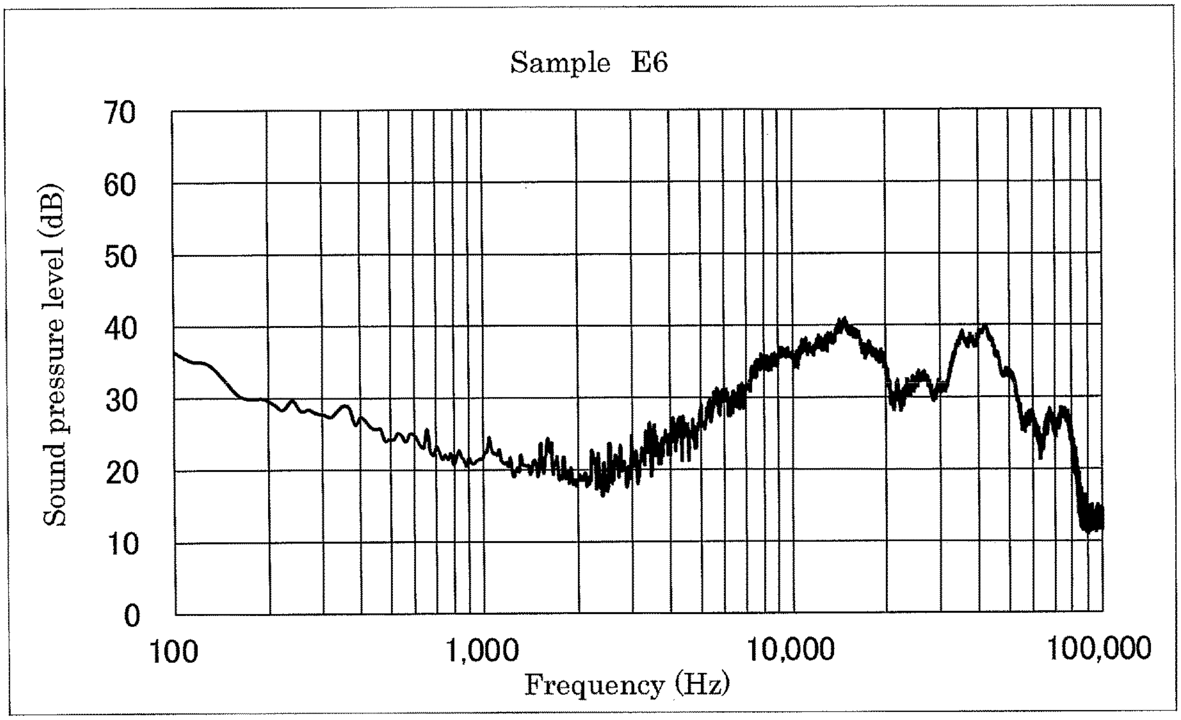
FIG. 30 is a graph showing the frequency characteristics of Sample E6 in terms of sound pressure level.
Figure 31:
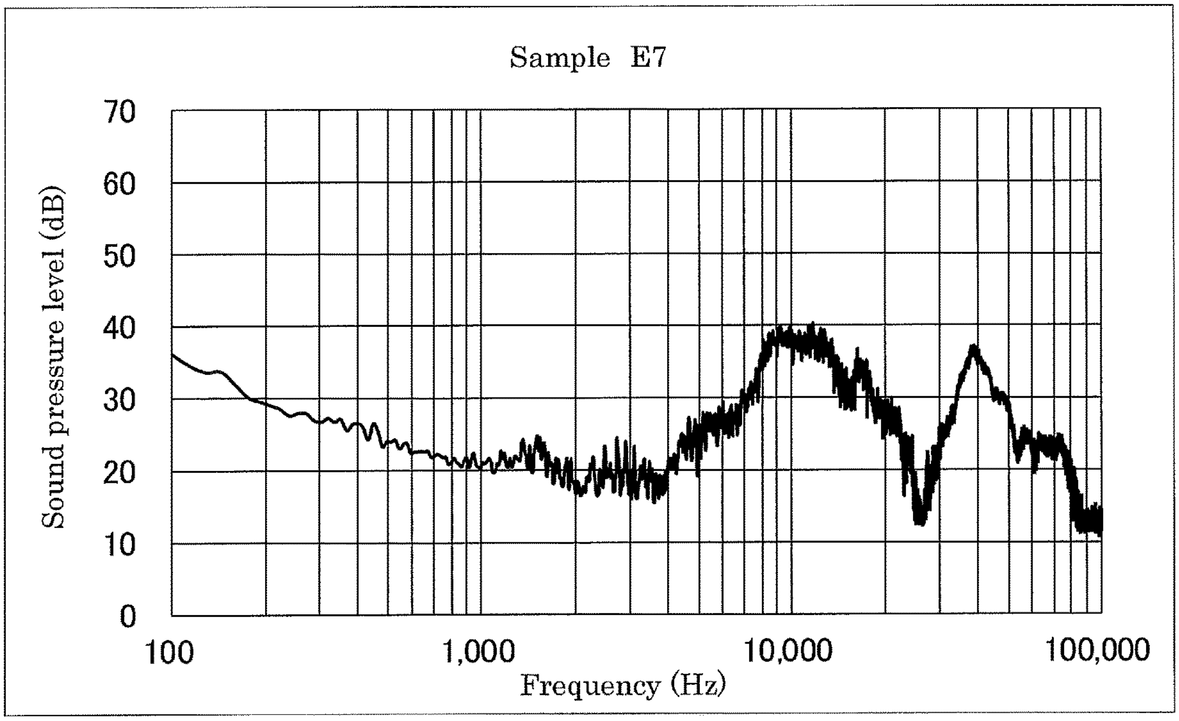
FIG. 31 is a graph showing the frequency characteristics of Sample E7 in terms of sound pressure level.
Figure 32:
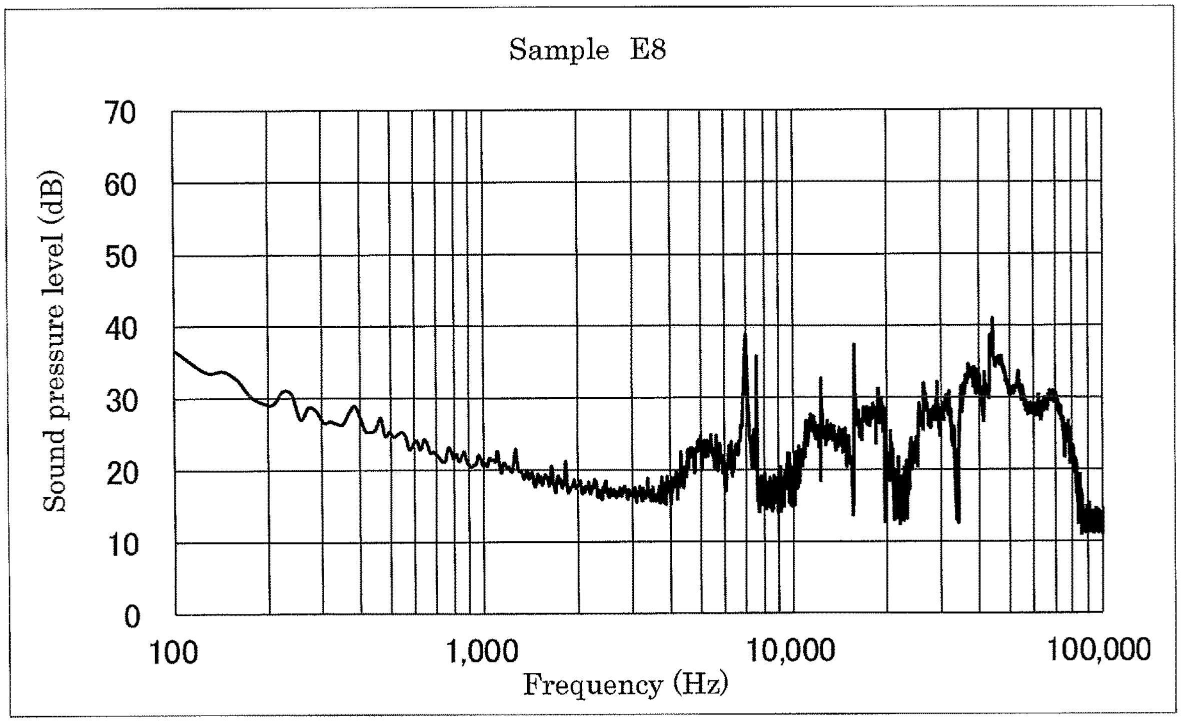
FIG. 32 is a graph showing the frequency characteristics of Sample E8 in terms of sound pressure level.
Figure 33:
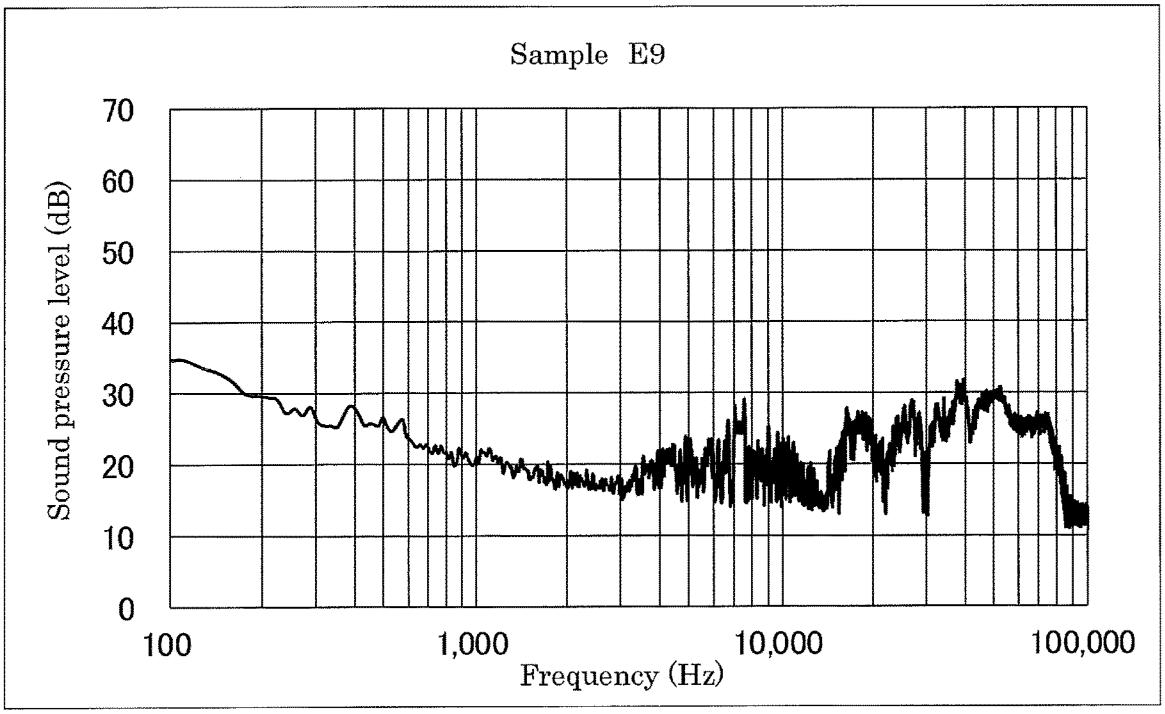
FIG. 33 is a graph showing the frequency characteristics of Sample E9 in terms of sound pressure level.
Figure 34:
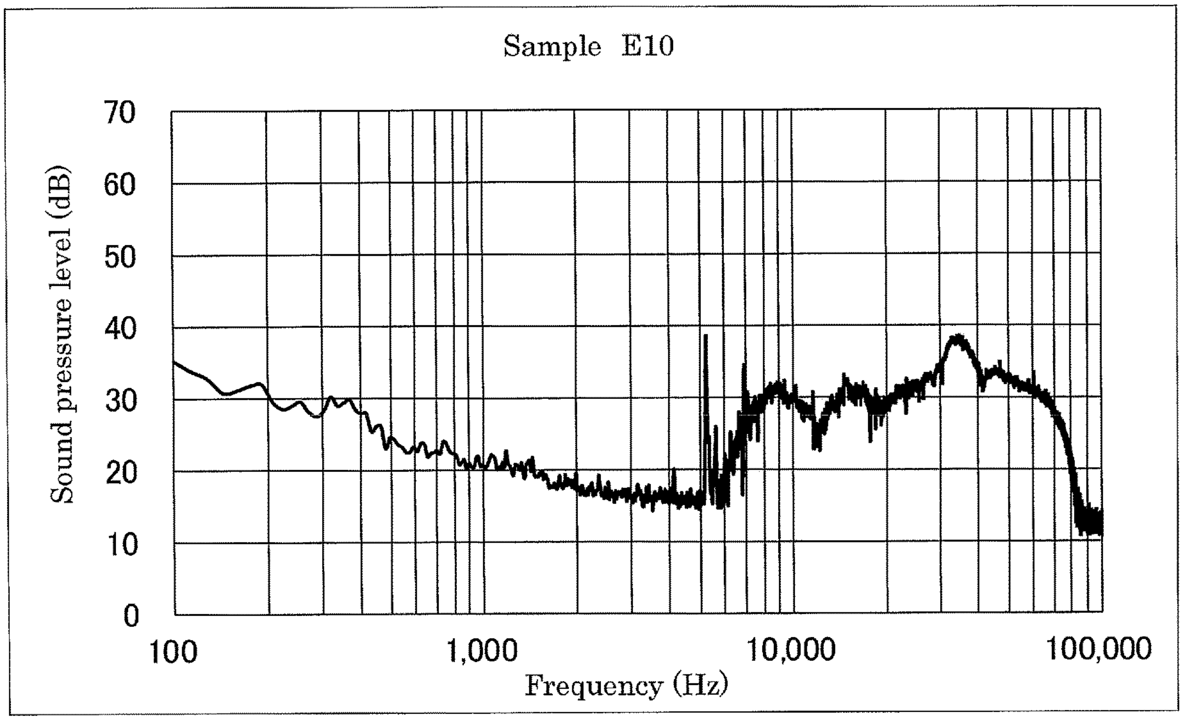
FIG. 34 is a graph showing the frequency characteristics of Sample E10 in terms of sound pressure level.
Figure 35:
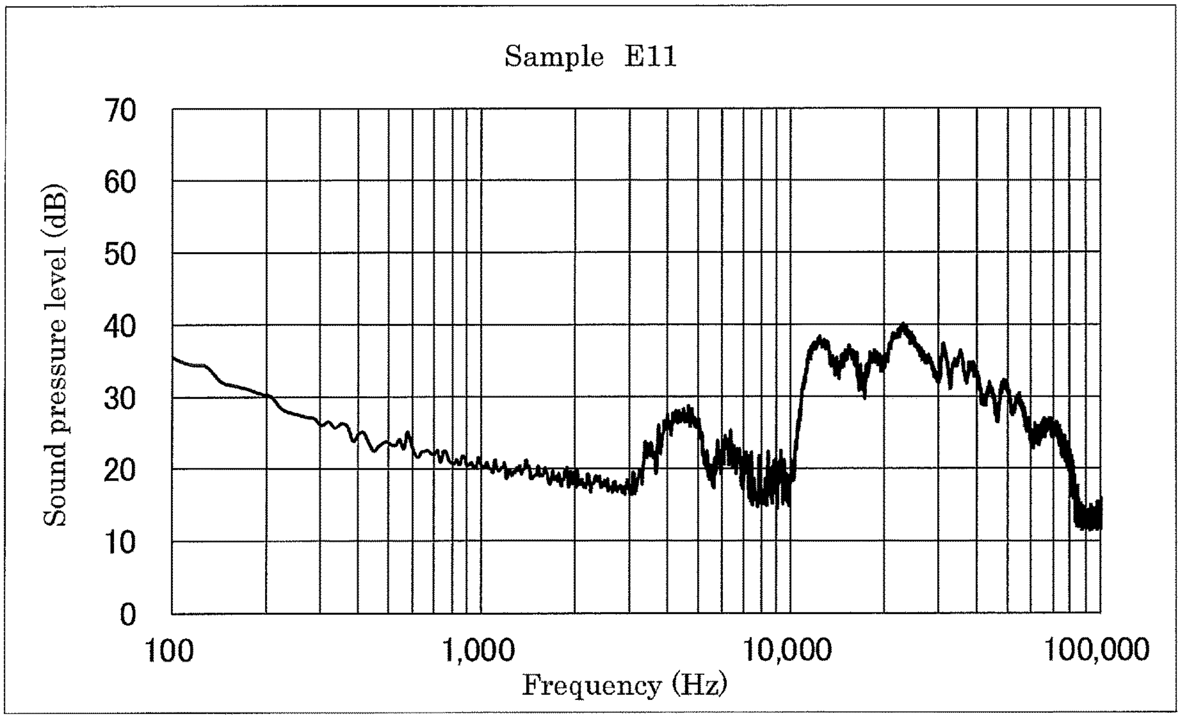
FIG. 35 is a graph showing the frequency characteristics of Sample E11 in terms of sound pressure level.
Figure 36:
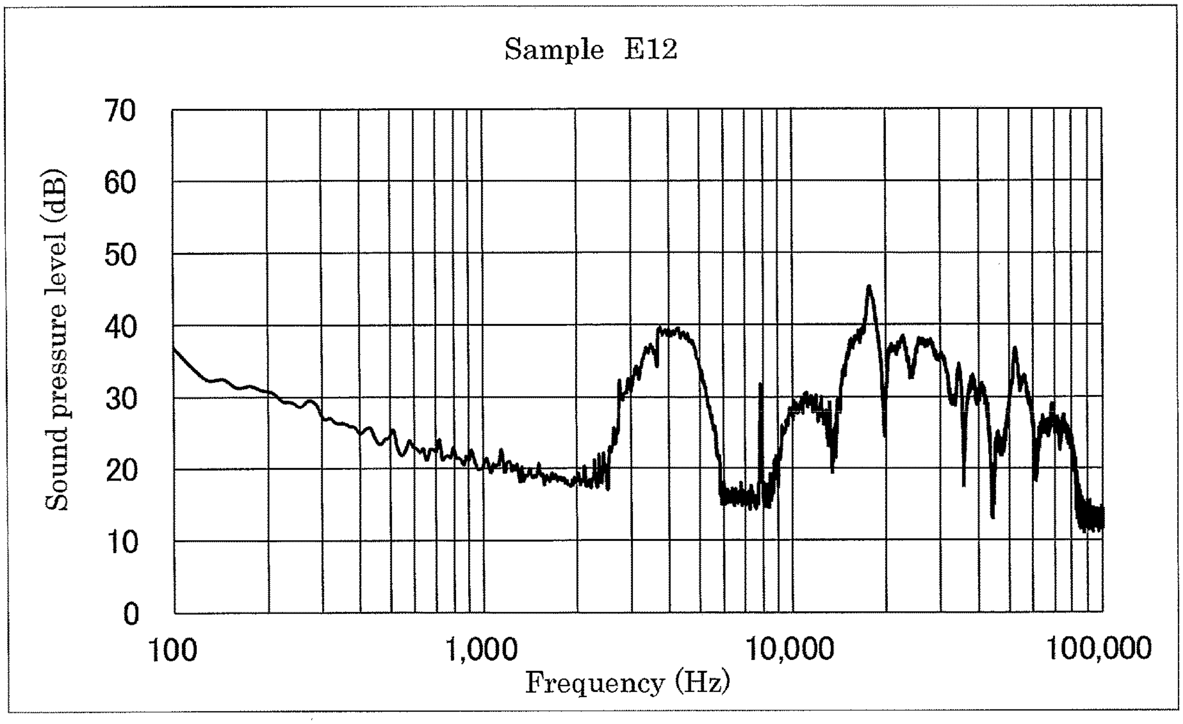
FIG. 36 is a graph showing the frequency characteristics of Sample E12 in terms of sound pressure level.
Figure 37:
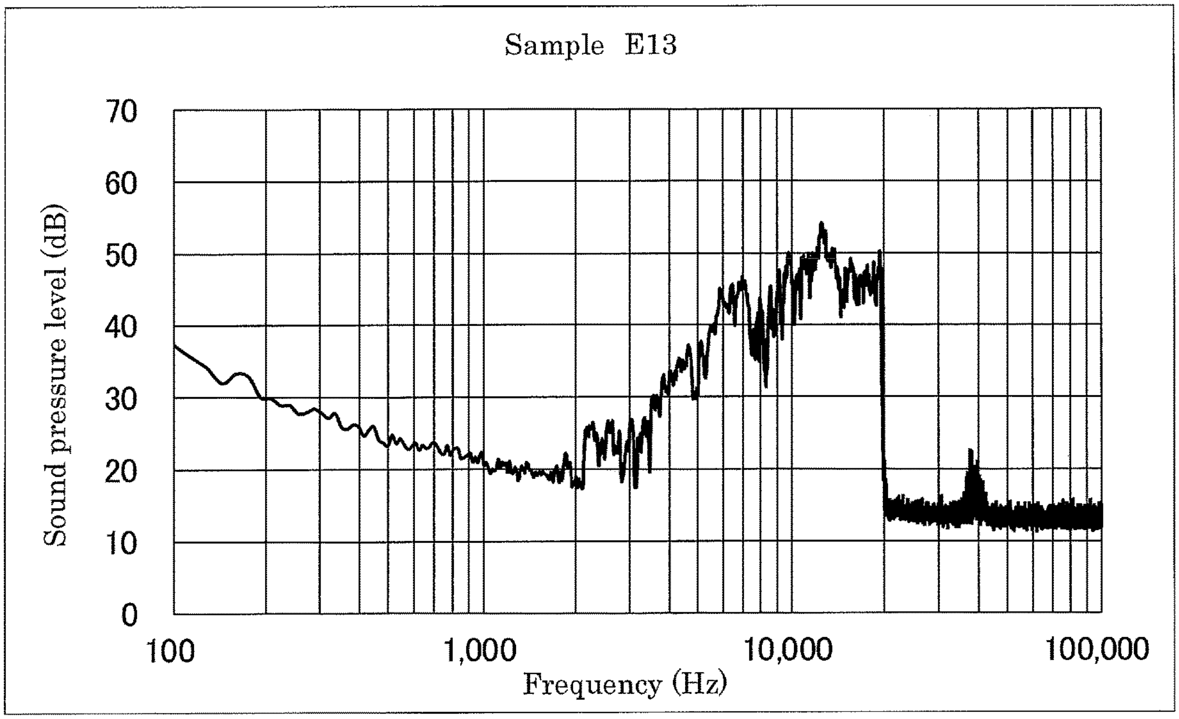
FIG. 37 is a graph showing the frequency characteristics of Sample E13 in terms of sound pressure level.
Figure 38:
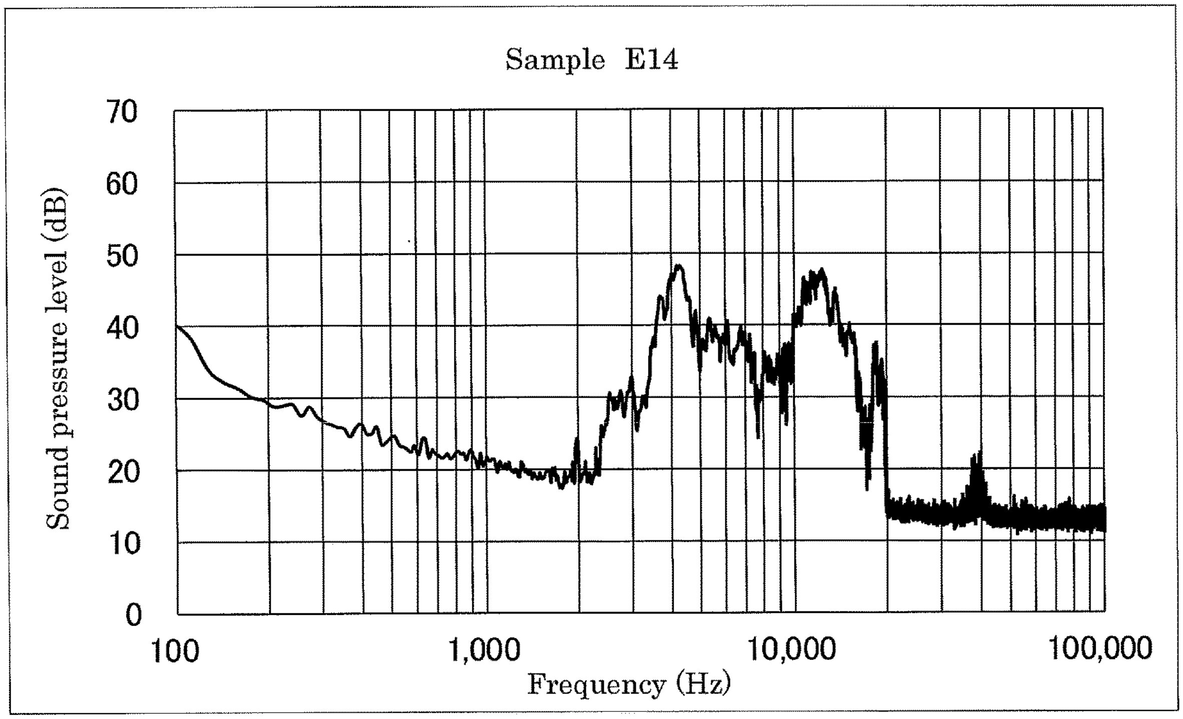
FIG. 38 is a graph showing the frequency characteristics of Sample E14 in terms of sound pressure level.
Figure 39:
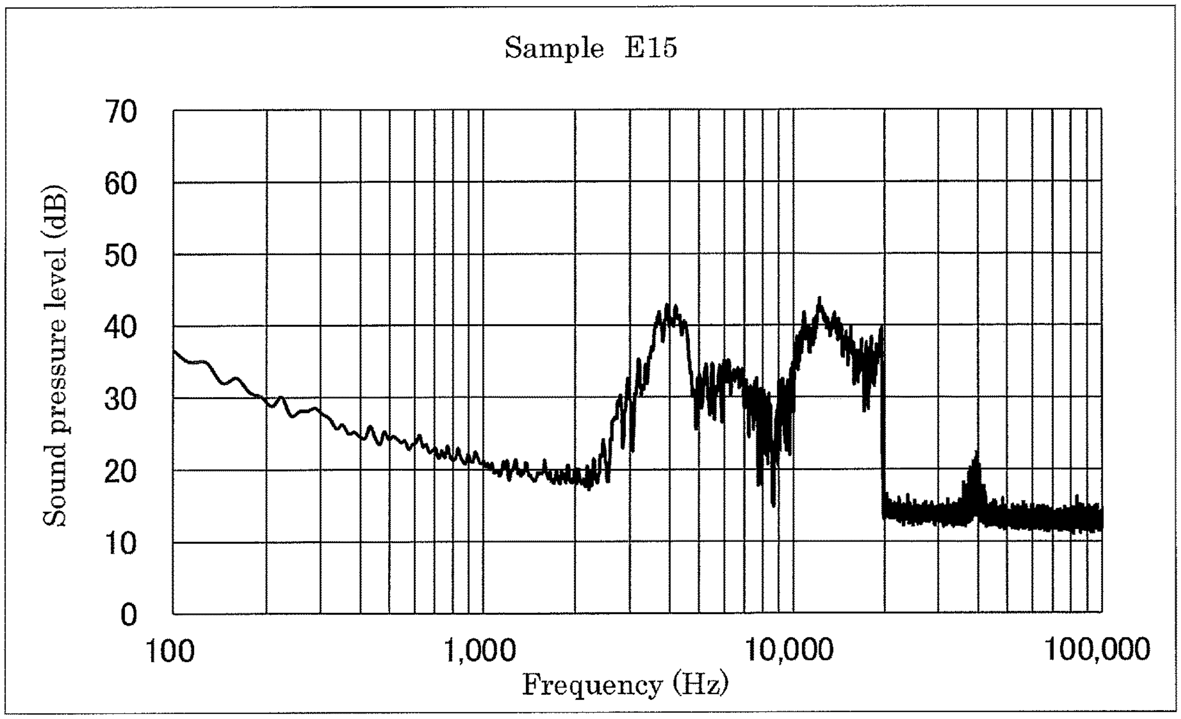
FIG. 39 is a graph showing the frequency characteristics of Sample E15 in terms of sound pressure level.
Figure 40:
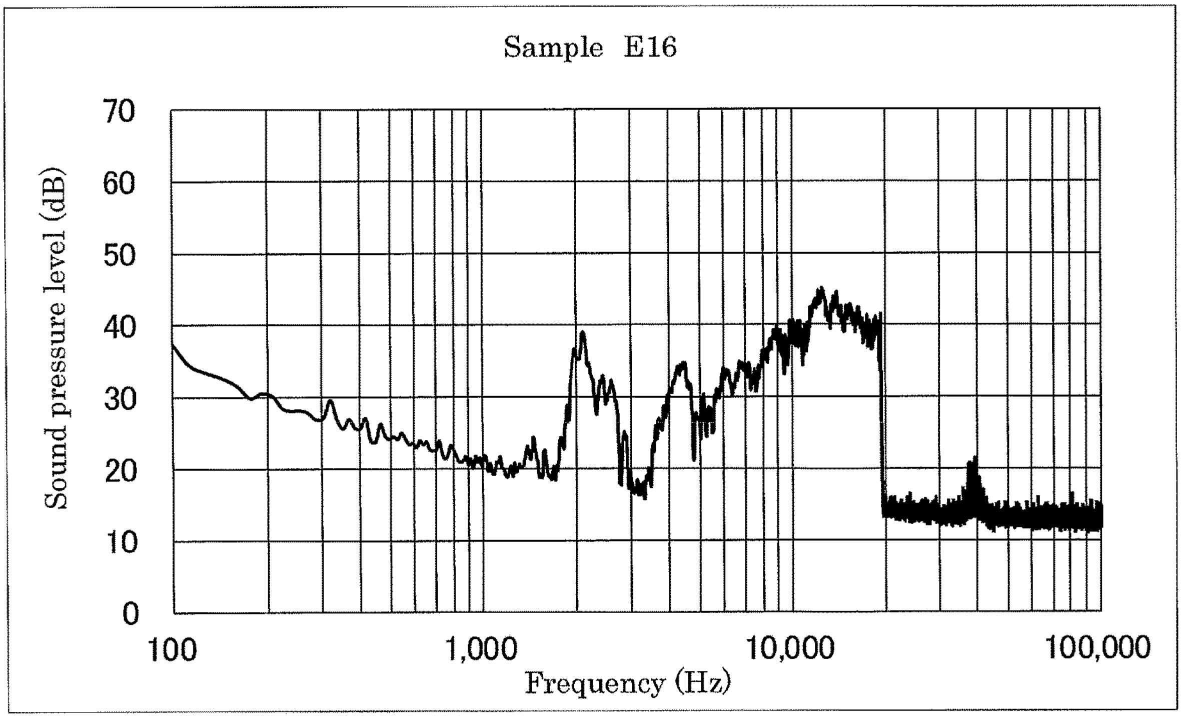
FIG. 40 is a graph showing the frequency characteristics of Sample E16 in terms of sound pressure level.
Figure 41:
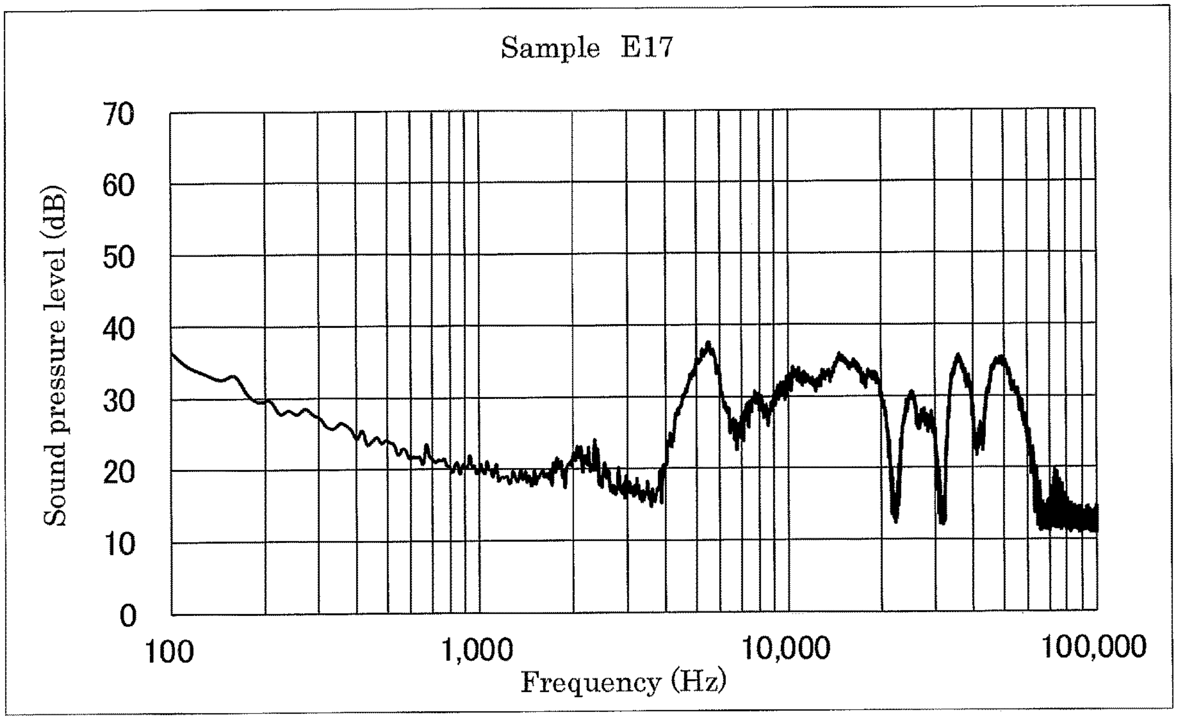
FIG. 41 is a graph showing the frequency characteristics of Sample E17 in terms of sound pressure level.
Figure 42:
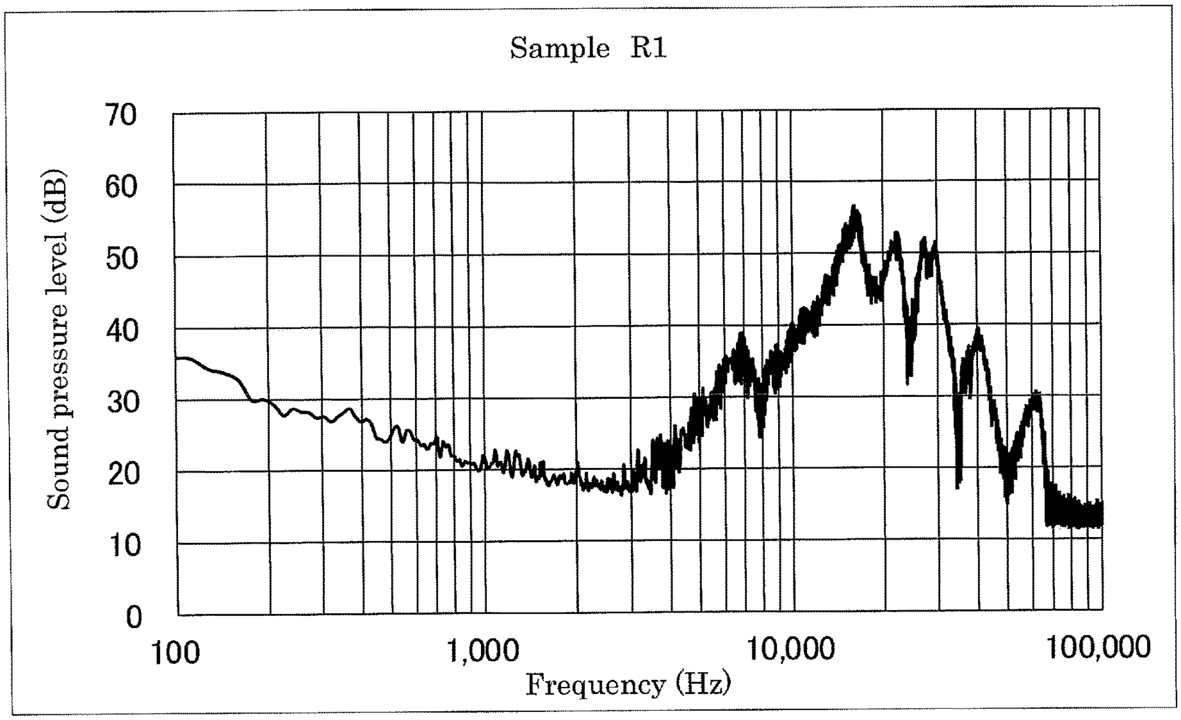
FIG. 42 is a graph showing the frequency characteristics of Sample R1 in terms of sound pressure level.
Figure 43:
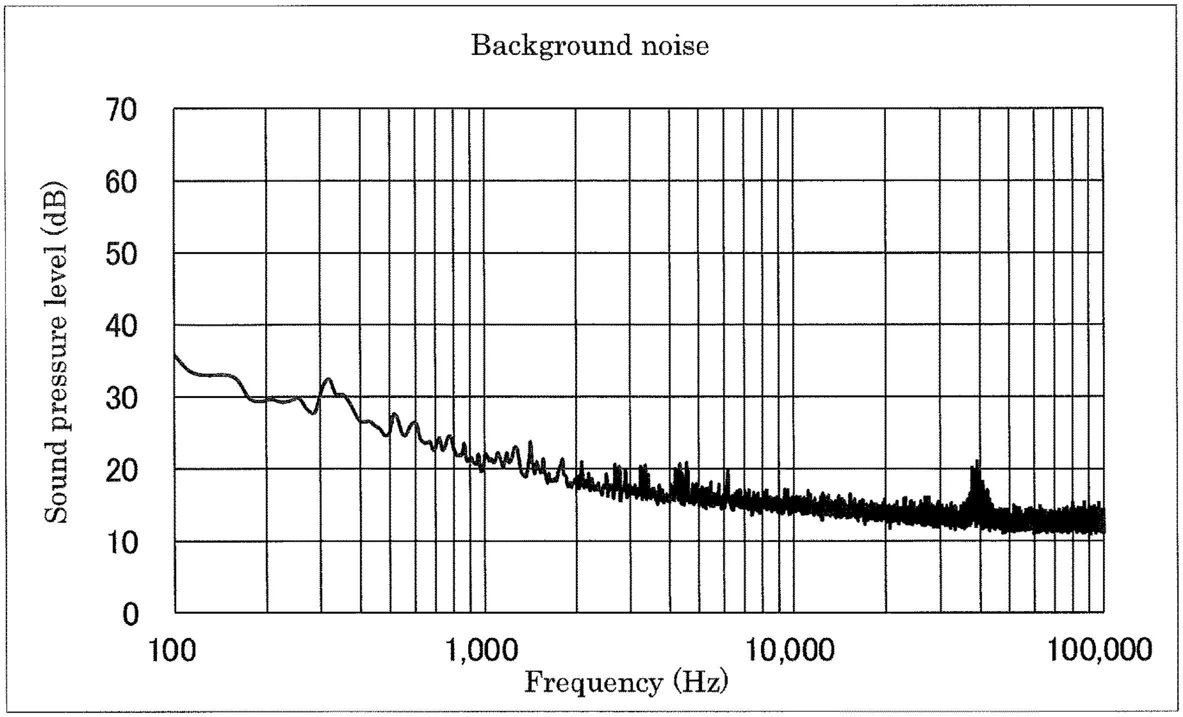
FIG. 43 is a graph showing the frequency characteristics of background noise in terms of sound pressure level.

The evaluation results for Samples E1 to E17 and R1 are shown in FIG. 23A to FIG. 42. The frequency characteristics of background noise in terms of sound pressure level are shown in FIG. 43. Reference numerals E1 to E17 in FIG. 24 correspond to Samples E1 to E17.

(Evaluation of ANC system)

Figure 44:
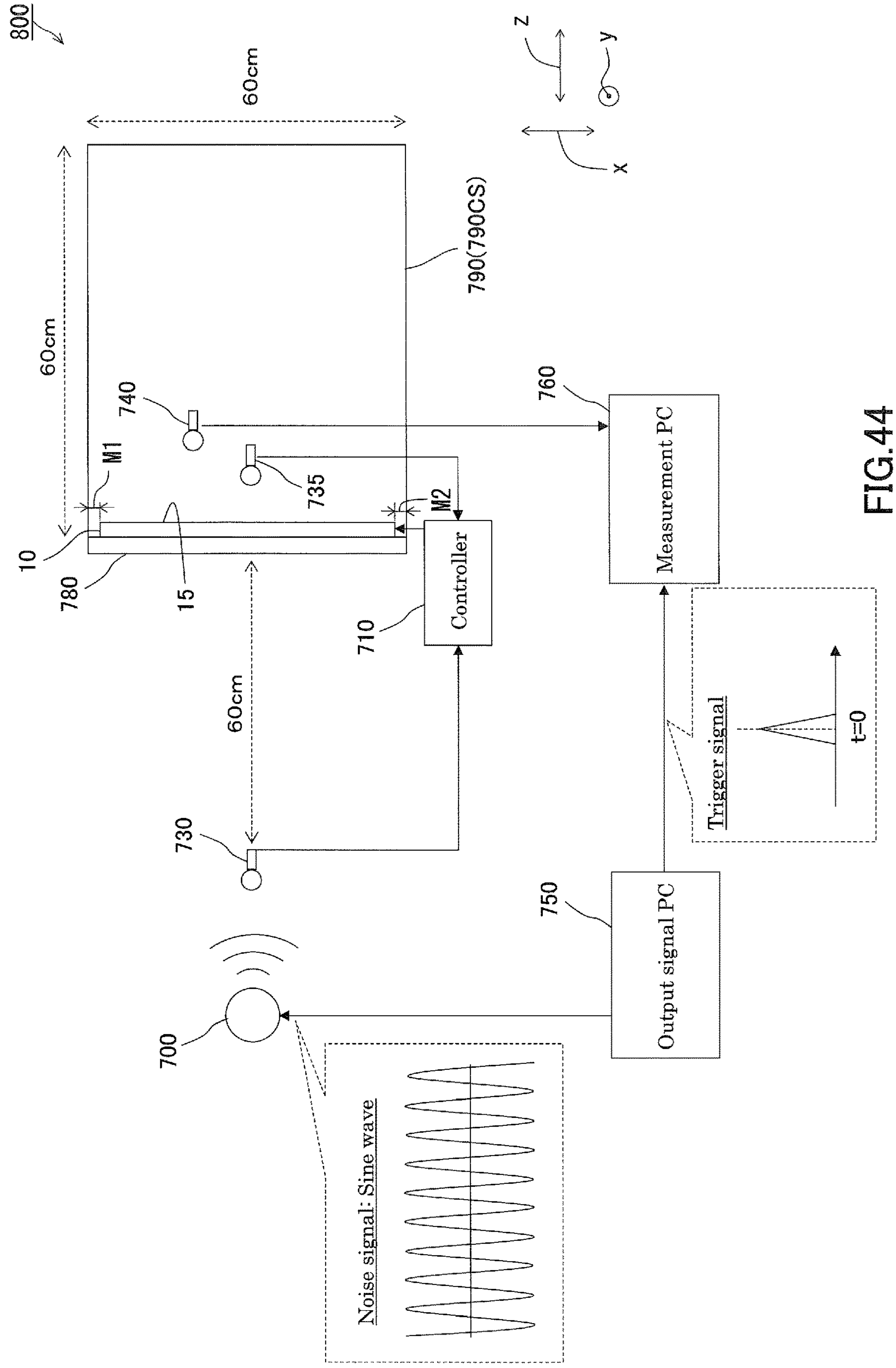
FIG. 44 is a configuration diagram of an ANC evaluation system.

An ANC evaluation system 800 shown in FIG. 44 was configured by using the same piezoelectric speaker 10 as the piezoelectric speaker 10 of Sample E1 except that the dimensions of the piezoelectric speaker 10 in plan view were set to 35 cm in the longitudinal direction and 50 cm in the lateral direction.

The piezoelectric speaker 10 was attached to a partition 780. A noise source 700, a reference microphone 730, the partition 780, the piezoelectric speaker 10, and an error microphone 735 were disposed, such that the noise source 700, the reference microphone 730, the center of the partition 780, the center of the piezoelectric speaker 10, and the error microphone 735 were arranged in this order on a straight line. A control region 790 was set on the piezoelectric speaker 10 side when viewed from the partition 780. A measurement microphone 740 was disposed in the control region 790.

In FIG. 44, the x direction is the longitudinal direction of the control region 790, the y direction is the lateral direction of the control region 790, and the z direction is the depth direction of the control region 790. The x direction, the y direction, and the z direction are perpendicular to each other.

The z direction is also a direction in which the noise source 700, the reference microphone 730, the center of the partition 780, the center of the piezoelectric speaker 10, and the error microphone 735 are arranged. The z direction is further a direction in which the radiation surface 15 of the piezoelectric speaker 10 faces.

The noise source 700 used was Eclipse TD508MK3 manufactured by Fujitsu Ten Limited. The partition 780 used was Desk side screen R manufactured by Mihashi kougei, Inc. The reference microphone 730 used was ECM-PC60 manufactured by Sony Corporation. The error microphone 735 used was ECM-PC60 manufactured by Sony Corporation. The measurement microphone 740 used was ECM-PC60 manufactured by Sony Corporation.

The distance between the noise source 700 and the reference microphone 730 is 5 cm. The distance between the reference microphone 730 and the partition 780 is 60 cm. The distance between the radiation surface 15 of the piezoelectric speaker 10 and the error microphone 735 is 17.5 cm. These distances are the dimensions in the z direction.

The partition 780 has a rectangular plate-like shape in plan view. The partition 780 has a dimension of 60 cm in the longitudinal direction, a dimension of 45 cm in the lateral direction, and a dimension of 0.5 cm in the front-back direction. The control region 790 has a dimension of 60 cm in the longitudinal direction, a dimension of 4.5 cm in the lateral direction, and a dimension of 60 cm in the depth direction. These longitudinal directions indicate the x direction. These lateral directions indicate the y direction. These front-back and depth directions indicate the z direction.

In the ANC evaluation system 800, the first margin M1 is 5 cm and the second margin M2 is 5 cm. These margins are dimensions in the x direction.

In the ANC evaluation system 800, an output signal personal computer (PC) 750, a measurement PC 760, and a controller 710 were used. The output signal PC 750 was connected to the noise source 700 and the measurement PC 760.

The output signal PC 750 transmits a noise signal to the noise source 700. The output signal PC 750 thus causes the noise source 700 to radiate a sine wave. Also, the output signal PC 750 transmits a trigger signal to the measurement PC 760. The trigger signal enables to give a common reference time to each measurement data piece. Specifically, sound pressure data pieces with the uniform time axis can be obtained for 176 measurement points described later. This enables mapping of sound pressure distributions shown in FIG. 45A to FIG. 60 described later.

The reference microphone 730 detects sound from the noise source 700. An output signal of the reference microphone 730 is transmitted to the controller 710.

The error microphone 735 detects sound in the control region 790. An output signal of the error microphone 735 is transmitted to the controller 710.

Based on the output signals of the reference microphone 730 and the error microphone 735, the controller 710 transmits a control signal to the piezoelectric speaker 10. The controller 710 thus controls a sound wave to be radiated from the piezoelectric speaker 10.

The measurement microphone 740 detects sound at a position where the measurement microphone 740 is disposed. An output signal of the measurement microphone 740 is transmitted to the measurement PC 760.

The measurement PC 760 receives the trigger signal from the output signal PC 750 and the output signal of the measurement microphone 740.

The control region 790 has a measurement cross-section 790CS extending in the x direction and the z direction. In the ANC evaluation system 800, 176 measurement points are provided on the measurement cross-section 790CS. Specifically, the measurement cross-section 790CS is divided equally into 11 pieces in the x direction and is divided equally into 16 pieces in the z direction. The number of measurement points, 176, is the product of 11, which is the number of divisions in the x direction, and 16, which is the number of divisions in the z direction. The position of the measurement cross-section 790CS in the y direction is the same as the center position of the radiation surface 15 in the y direction. The error microphone 735 is provided on the measurement cross-section 790CS.

In the ANC evaluation system 800, the measurement microphone 740 is successively moved to the 176 measurement points. Thus, in cooperation with the measurement PC 760, the microphone 740 measures the sound pressures at the 176 measurement points. Specifically, the measurement PC 760 maps the distribution of the sound pressures at the 176 measurement points. This mapping visualizes the sound field of the measurement cross-section 790CS.

Hereinafter, description will be given based on actual measurement data with reference to FIG. 45A to FIG. 62C. FIG. 45A to FIG. 62C omit a portion of the control region 790 shown in FIG. 44 that is distant from the partition 780. In FIG. 45A to FIG. 45C, FIG. 47A to FIG. 47C, FIG. 49A to FIG. 49C, FIG. 51A to FIG. 51C, FIG. 53A to FIG. 53C, FIG. 55A to FIG. 55C, FIG. 57A to FIG. 57C, and FIG. 59A to FIG. 59C, the numerical value on the color bar indicates the sound pressure level in units of pascal (Pa). While the numerical value being positive means that the sound pressure is positive, the numerical value being negative means that the sound pressure is negative.

(Reference Example 1: Measurement of diffracted sound)

In a state where the piezoelectric speaker 10 radiated no sound and the noise source 700 radiated a sine wave, sound pressures at the 176 measurement points of the measurement cross-section 790CS were measured for mapping. FIG. 45A to FIG. 48 show the sound pressure distributions obtained by the mapping. In FIG. 45A to FIG. 48, the piezoelectric speaker 10 is not shown so as to facilitate an intuitive understanding that diffracted sound is measured. However, the measurement of Reference Example 1 was performed while the piezoelectric speaker 10 was attached to the partition 780, in the same manner as in Example 1 described later.

Figure 45A:
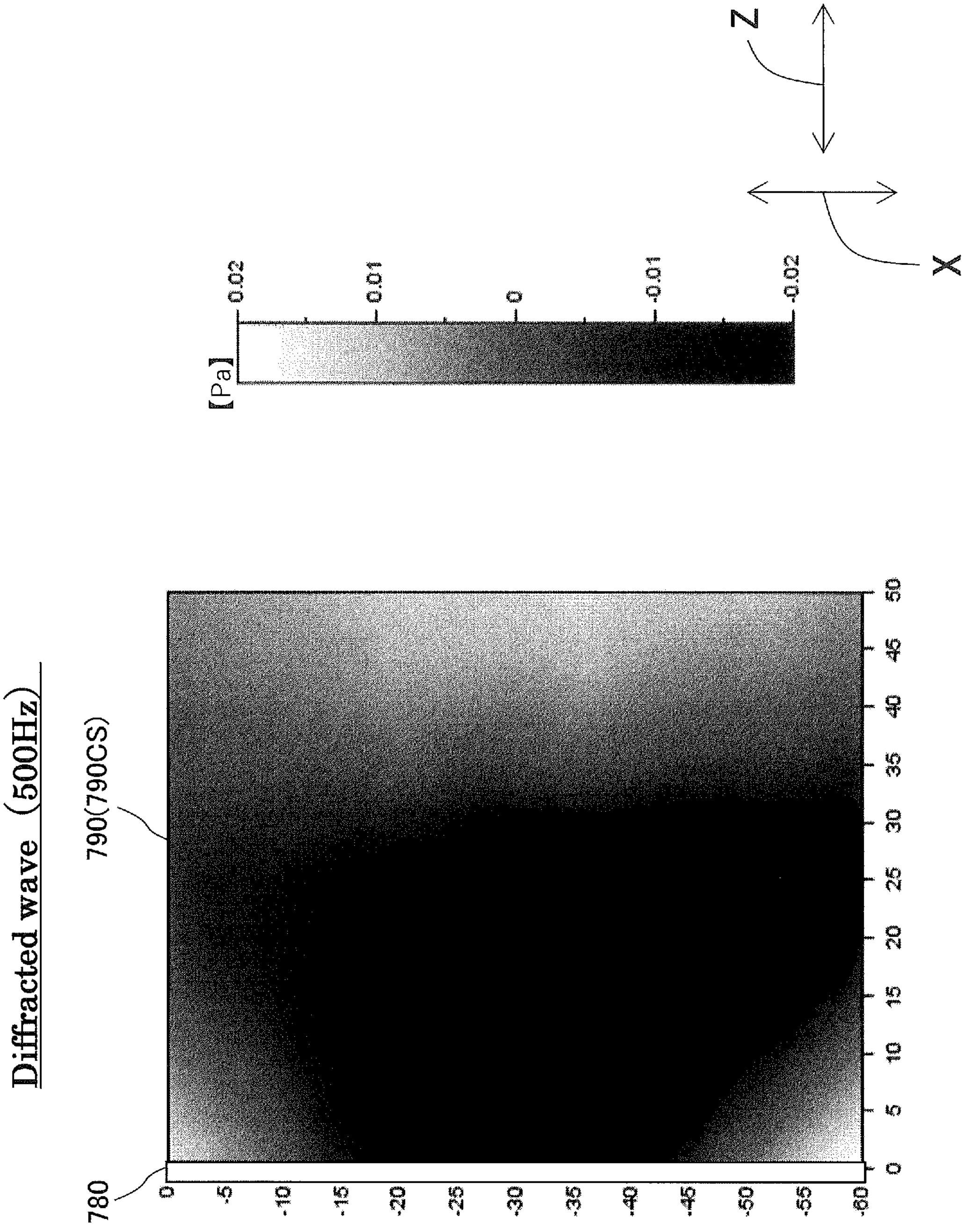
FIG. 45A is a diagram showing a sound pressure distribution at a speaker OFF time.
Figure 45B:
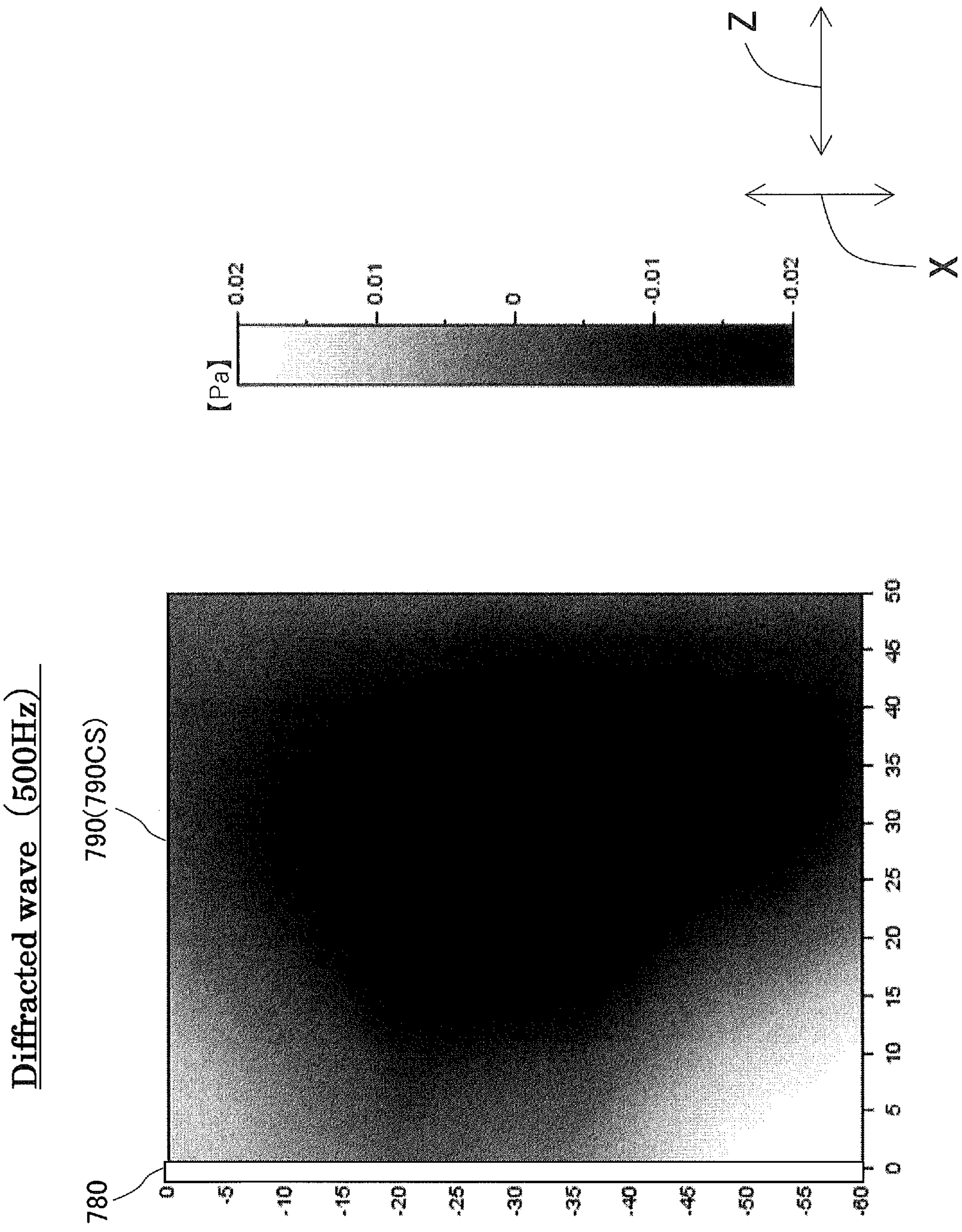
FIG. 45B is a diagram showing a sound pressure distribution at a speaker OFF time.
Figure 45C:
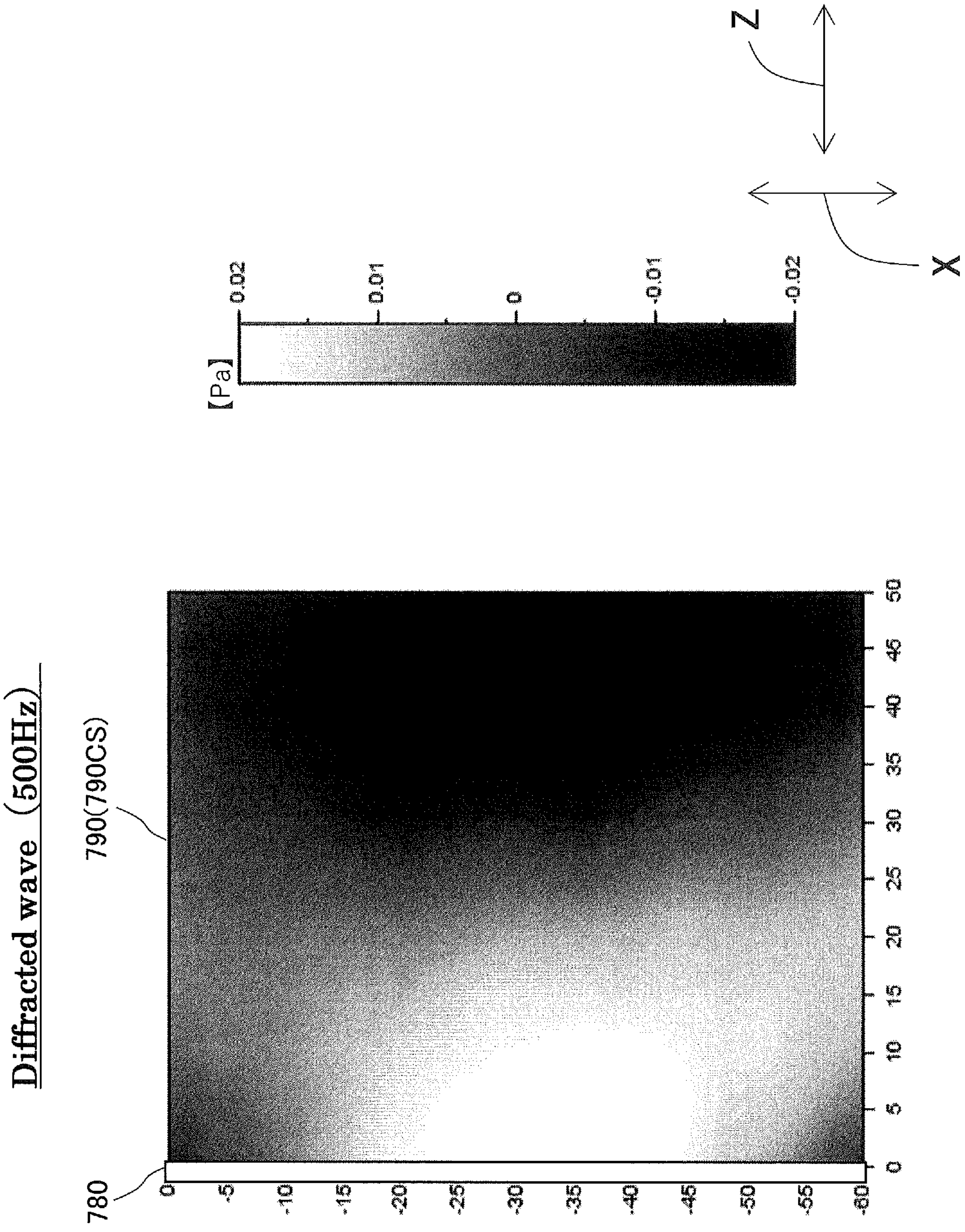
FIG. 45C is a diagram showing a sound pressure distribution at a speaker OFF time.
Figure 46:
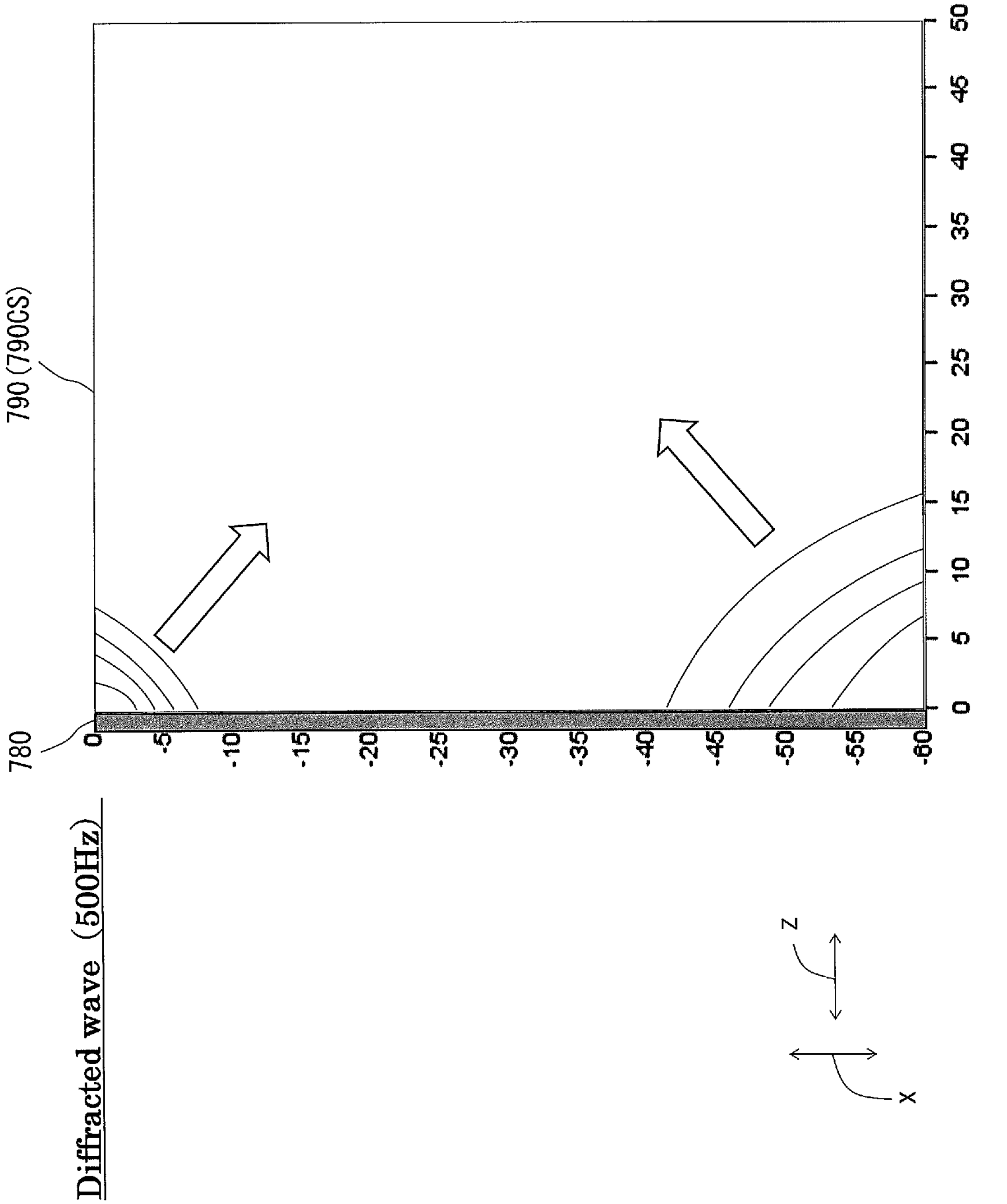
FIG. 46 is a diagram showing propagation of a wave front at the speaker OFF times.
Figure 47A:
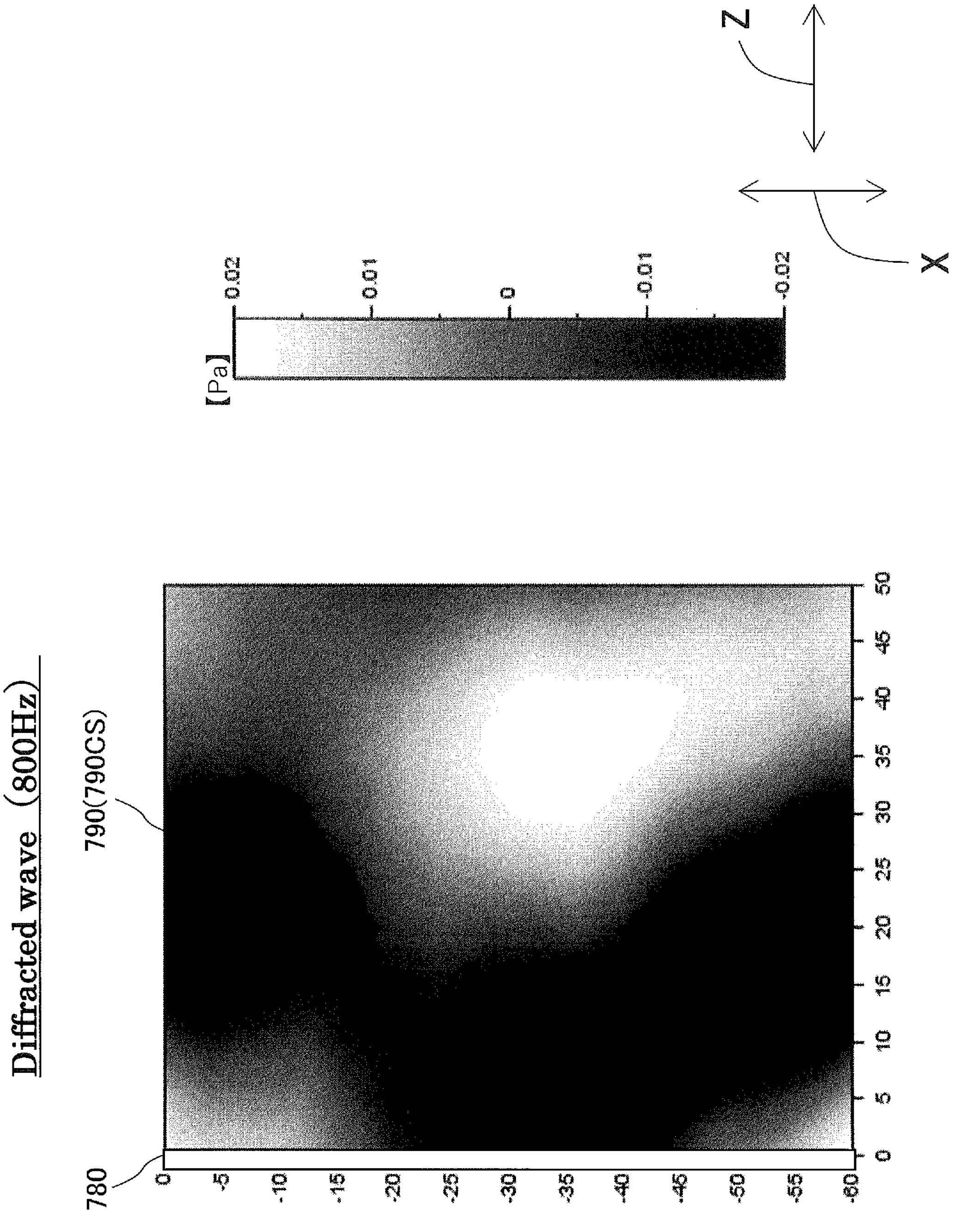
FIG. 47A is a diagram showing a sound pressure distribution at a speaker OFF time.
Figure 47B:
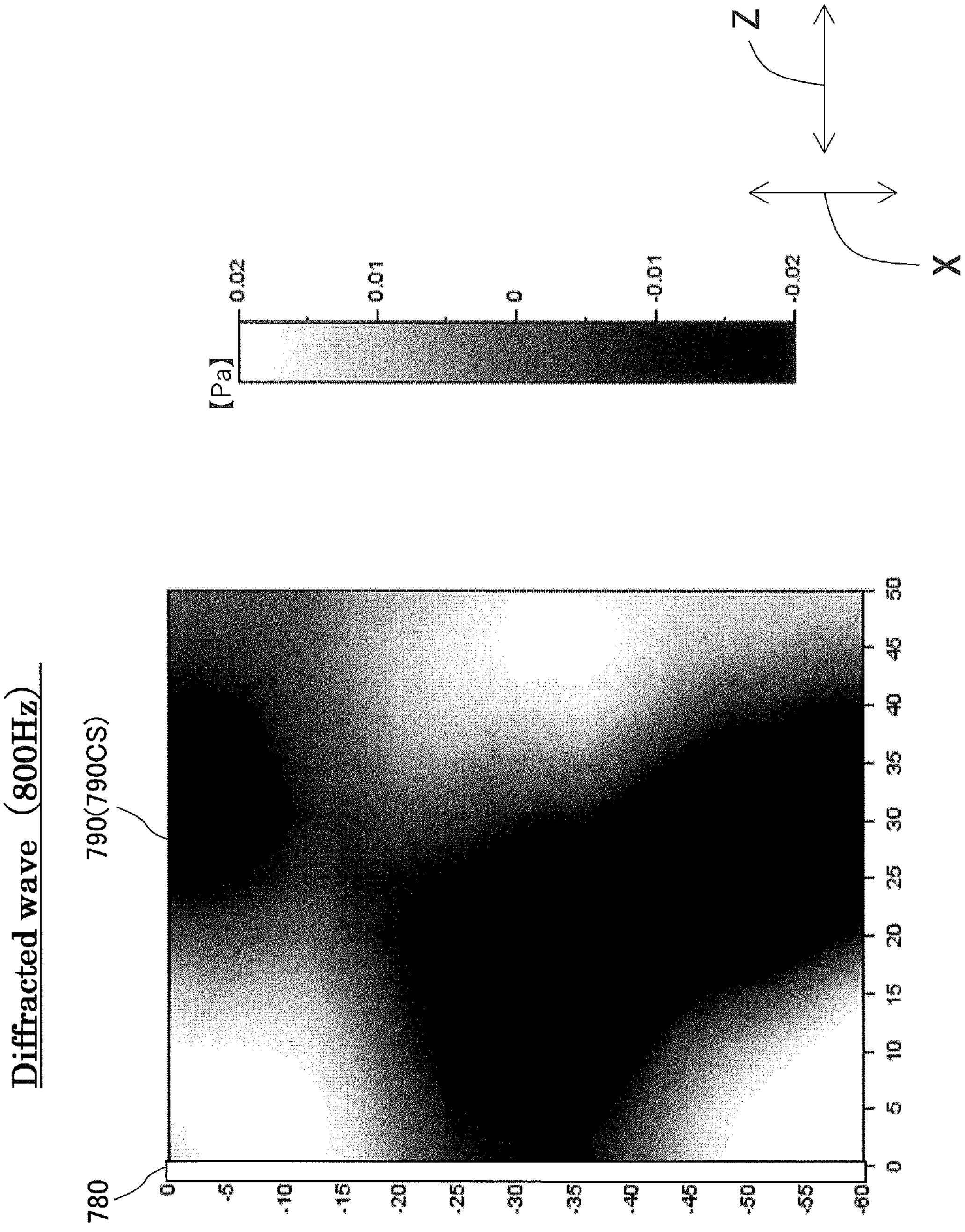
FIG. 47B is a diagram showing a sound pressure distribution at a speaker OFF time.
Figure 47C:
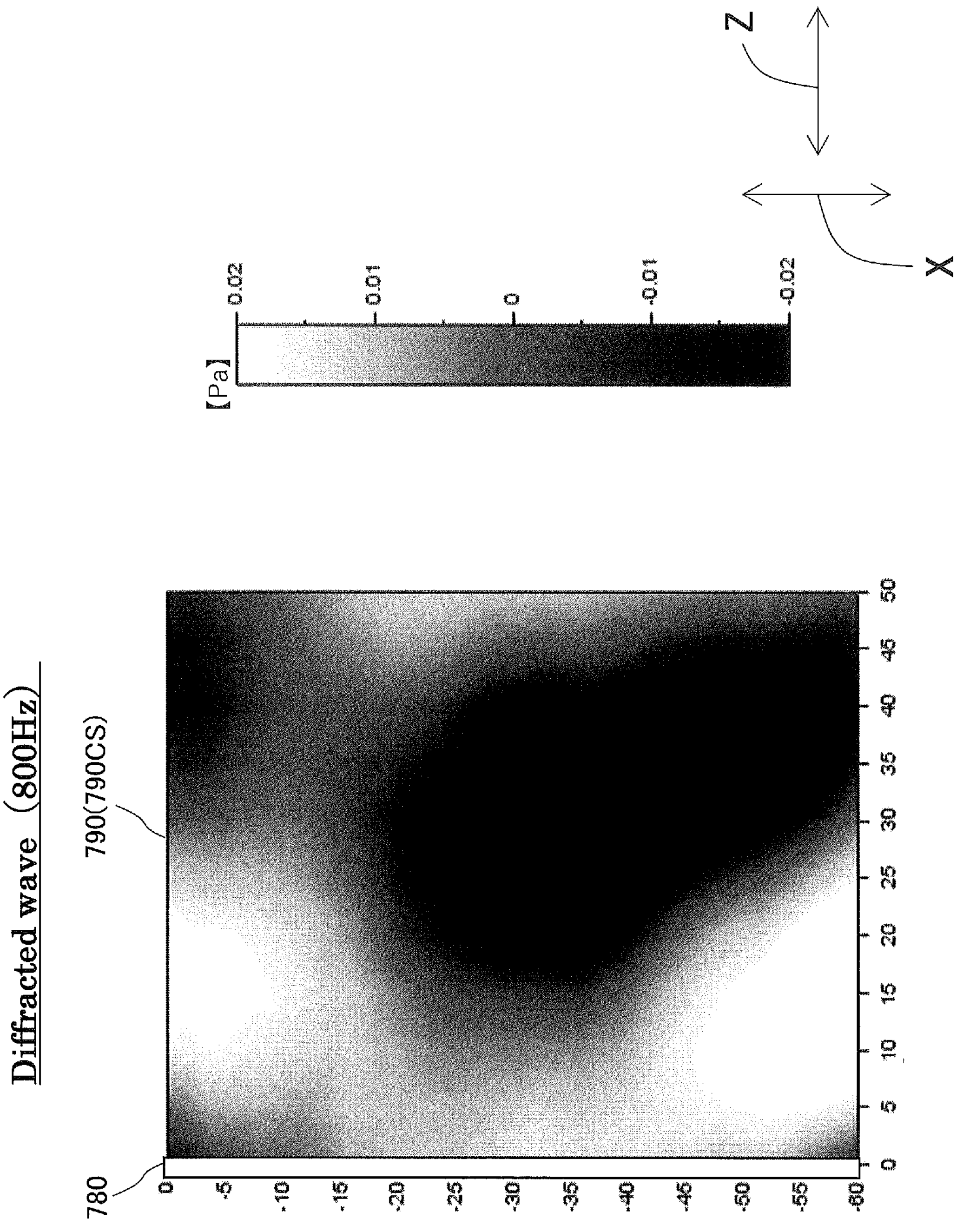
FIG. 47C is a diagram showing a sound pressure distribution at a speaker OFF time.
Figure 48:
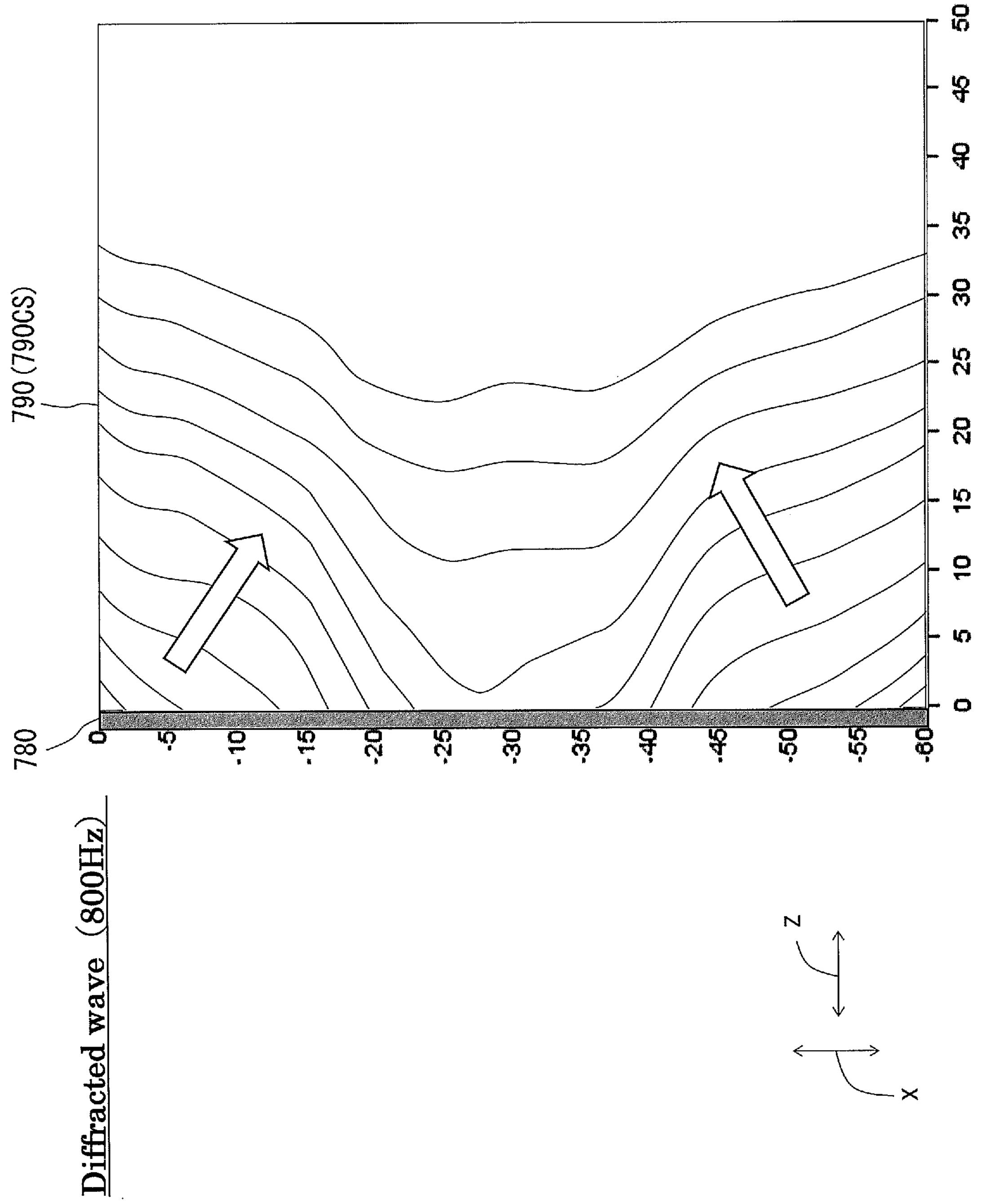
FIG. 48 is a diagram showing propagation of a wave front at the speaker OFF times.

Specifically, FIG. 45A to FIG. 45C show the sound pressure distributions derived from the noise source 700 relating to different times in the case where the frequency of the sine wave radiated from the noise source 700 is 500 Hz. FIG. 45A to FIG. 45C are arranged in chronological order. A series of lines in FIG. 46 represent propagation over time of a certain wave front generated by the noise source 700 radiating the sine wave of 500 Hz. FIG. 47A to FIG. 47C show the sound pressure distribution from the noise source 700 relating to different times in the case where the frequency of the sine wave radiated from the noise source 700 is 800 Hz. FIG. 47A to FIG. 47C are arranged in chronological order. A series of lines in FIG. 48 represent propagation over time of a certain wave front generated by the noise source 700 radiating the sine wave of 800 Hz.

In FIG. 46, the lines in the series of lines represent respective positions of the "certain wave front" at different times. In general, in FIG. 46, one of two adjacent lines that is further away from the partition 780 than the other is indicates the "certain wave front" at a more advanced time. Block arrows in FIG. 46 represent the propagation direction of the wave fronts. The same descriptions of the series of lines and the block arrows apply to FIG. 48, FIG. 50, FIG. 52, FIG. 54, FIG. 56, FIG. 58, and FIG. 60.

FIG. 46 was prepared by the following procedure. First, a plurality of sound pressure distribution maps based on actual measurements relating to different times, similar to those in FIG. 45A to FIG. 45C, were obtained. Next, in each of the plurality of sound pressure distribution maps, a line corresponding to the certain wave front was manually drawn. Then, the plurality of sound pressure distribution maps on which the lines have been drawn were overlapped each other. Thus, the diagram shown in FIG. 46 was obtained in which the series of lines representing propagation of the wave fronts were drawn. The same description of the drawing procedure applies to FIG. 48, FIG. 50, FIG. 52, FIG. 54, FIG. 56, FIG. 58, and FIG. 60.

FIG. 45A to FIG. 48 show that diffraction occurs at end portions of the partition 780 that face each other. FIG. 45A to FIG. 48 also show that wave fronts generated by diffraction at these end portions propagate so as to go around behind the partition 780. Specifically, FIG. 45A to FIG. 48 show that the wave fronts generated by diffraction at these end portions propagate so as to approach an axis passing through the center of the partition 780 and extending in the z direction. Wave front propagation shown in FIG. 45A to FIG. 48 occurs in the same manner as in FIG. 2.

Example 1

Measurement of Sound Output from Piezoelectric Speaker 10

In a state where the noise source 700 radiated a sine wave in the same manner as in Reference Example 1, the controller 710 was used to vibrate the piezoelectric speaker 10 thereby to cause the piezoelectric speaker 10 to generate a sound wave for sound reduction. At this time, a control signal to be transmitted to piezoelectric speaker 10 was stored in the controller 710. Then, in a state where the noise source 700 radiated no sound, the controller 710 was caused to transmit the stored control signal to the piezoelectric speaker 10. In this manner, vibration of the piezoelectric speaker 10 was reproduced in the state where the noise source 700 radiated no sound, and sound pressures at the 176 measurement points of the measurement cross-section 790CS were measured for mapping. FIG. 49A to FIG. 52 show the sound pressure distributions obtained by the mapping.

Figure 49A:
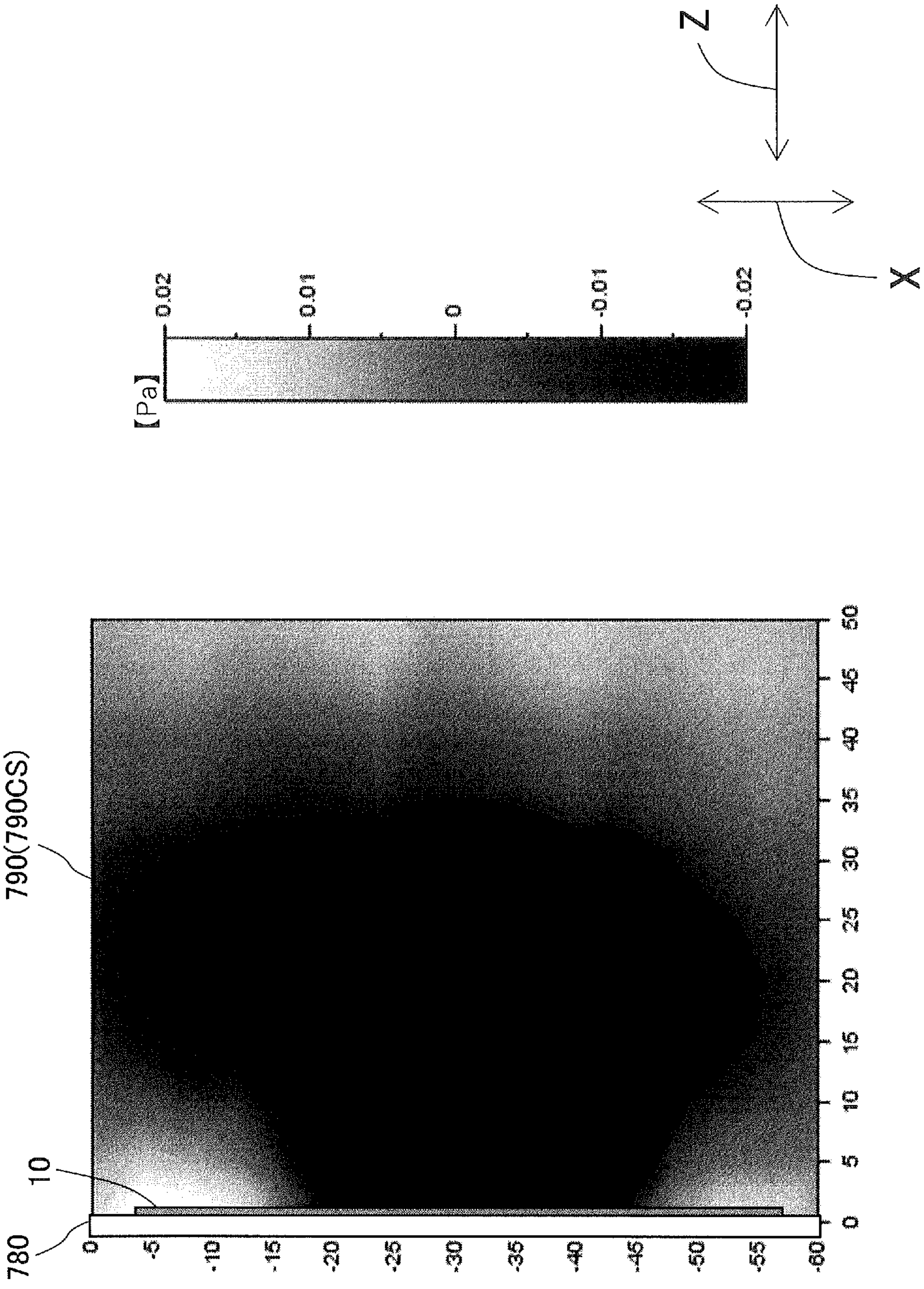
FIG. 49A is a diagram showing a sound pressure distribution derived from the piezoelectric speaker.
Figure 49B:
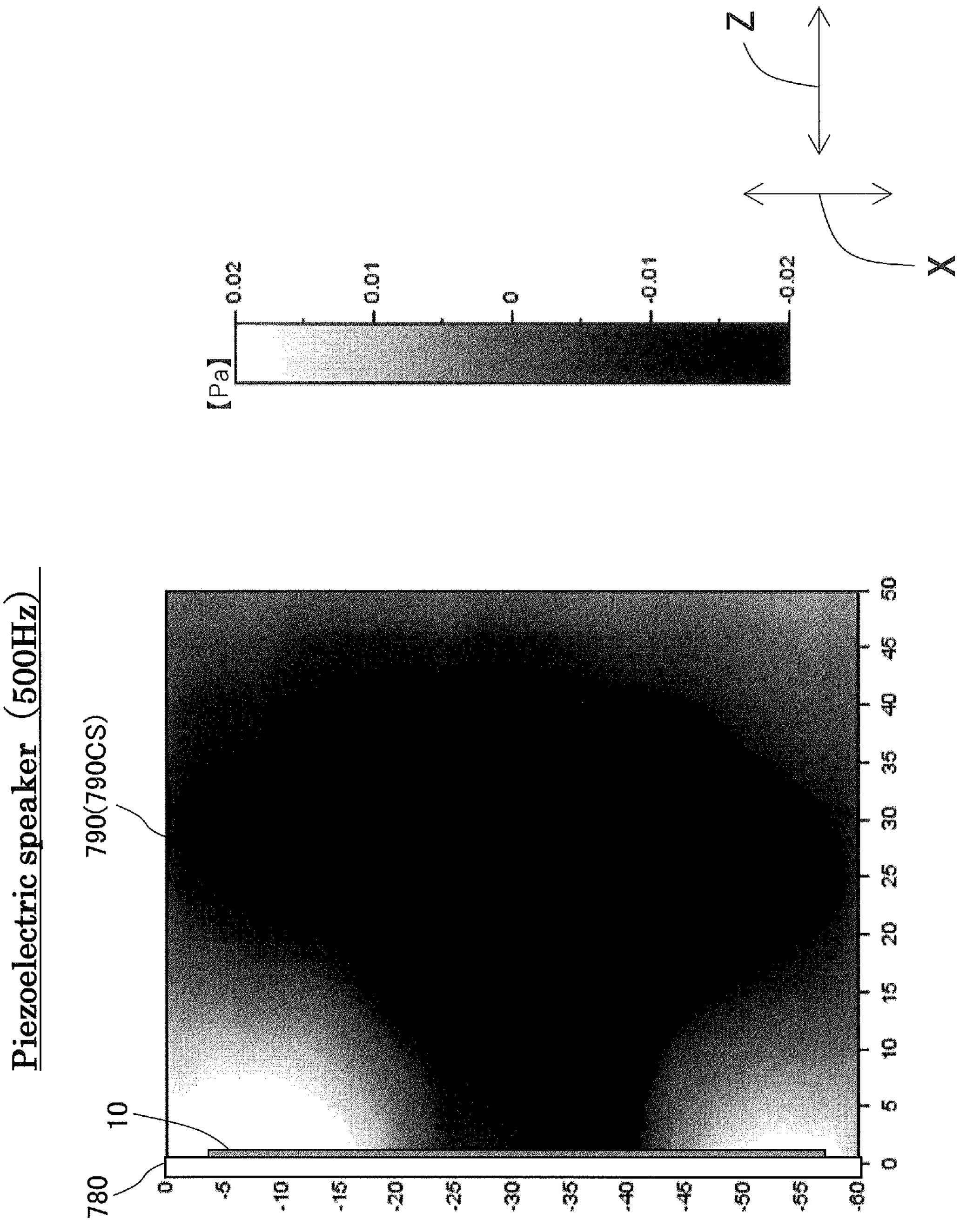
FIG. 49B is a diagram showing a sound pressure distribution derived from the piezoelectric speaker.
Figure 49C:
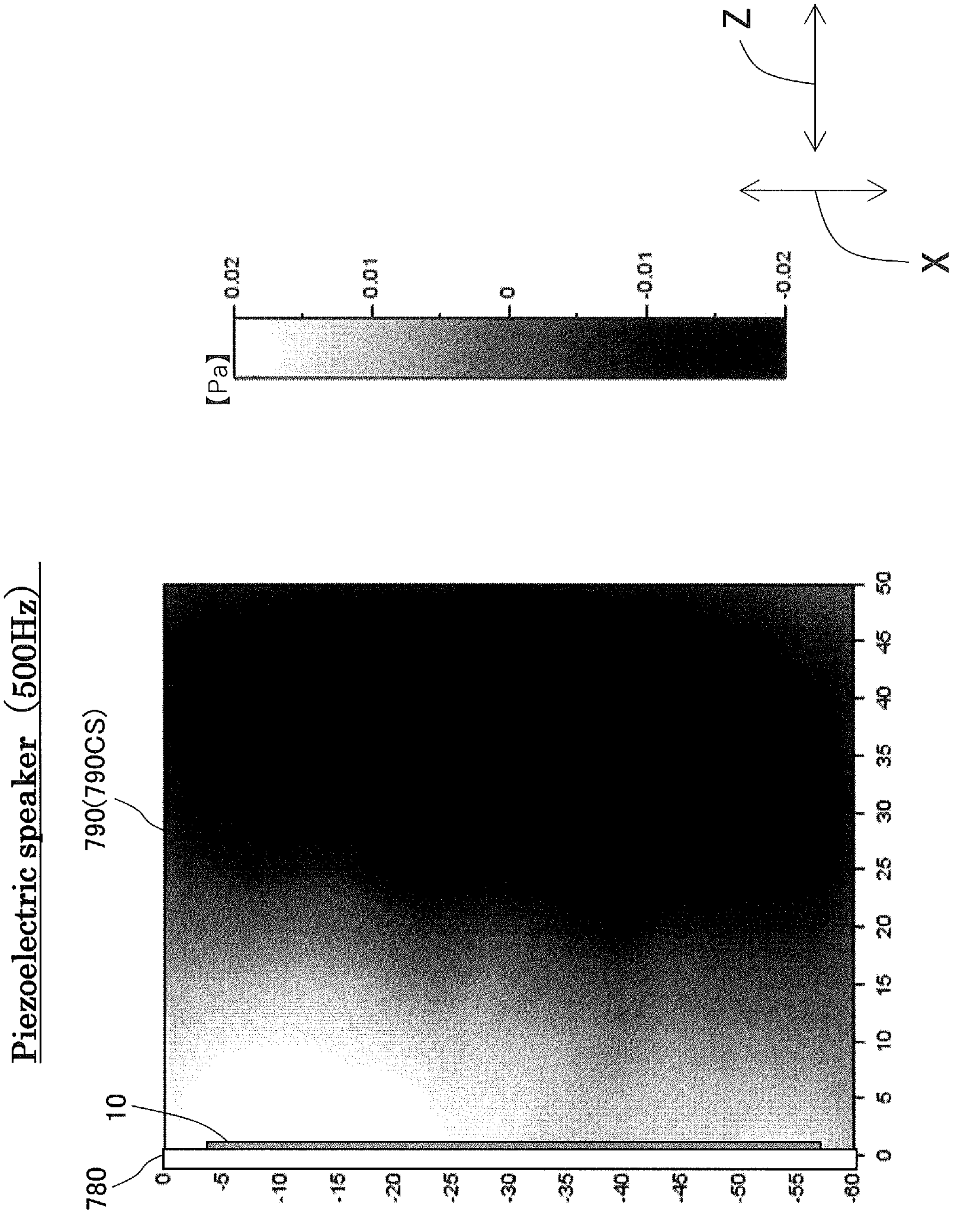
FIG. 49C is a diagram showing a sound pressure distribution derived from the piezoelectric speaker.
Figure 50:
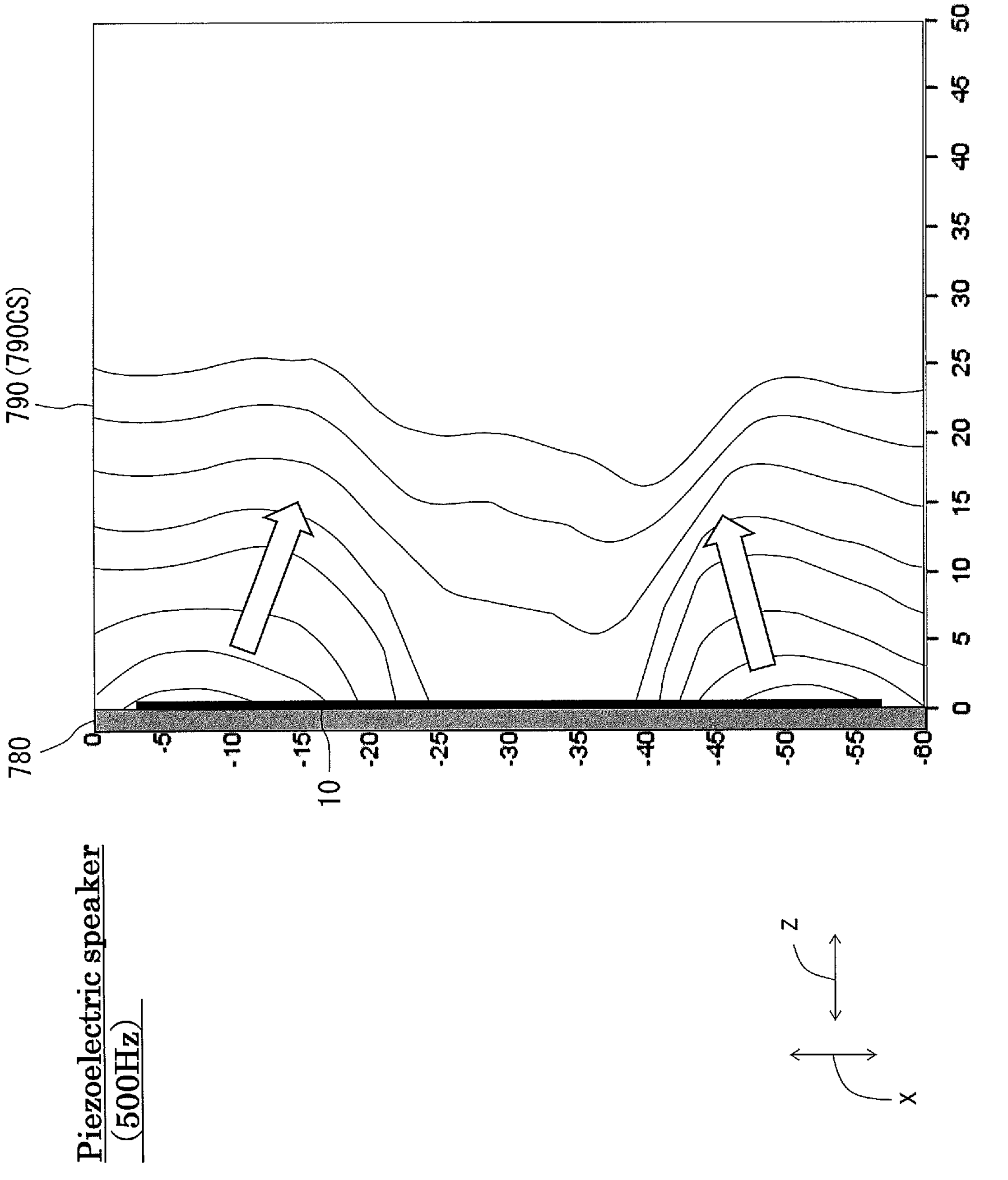
FIG. 50 is a diagram showing propagation of a wave front derived from the piezoelectric speaker.
Figure 51A:
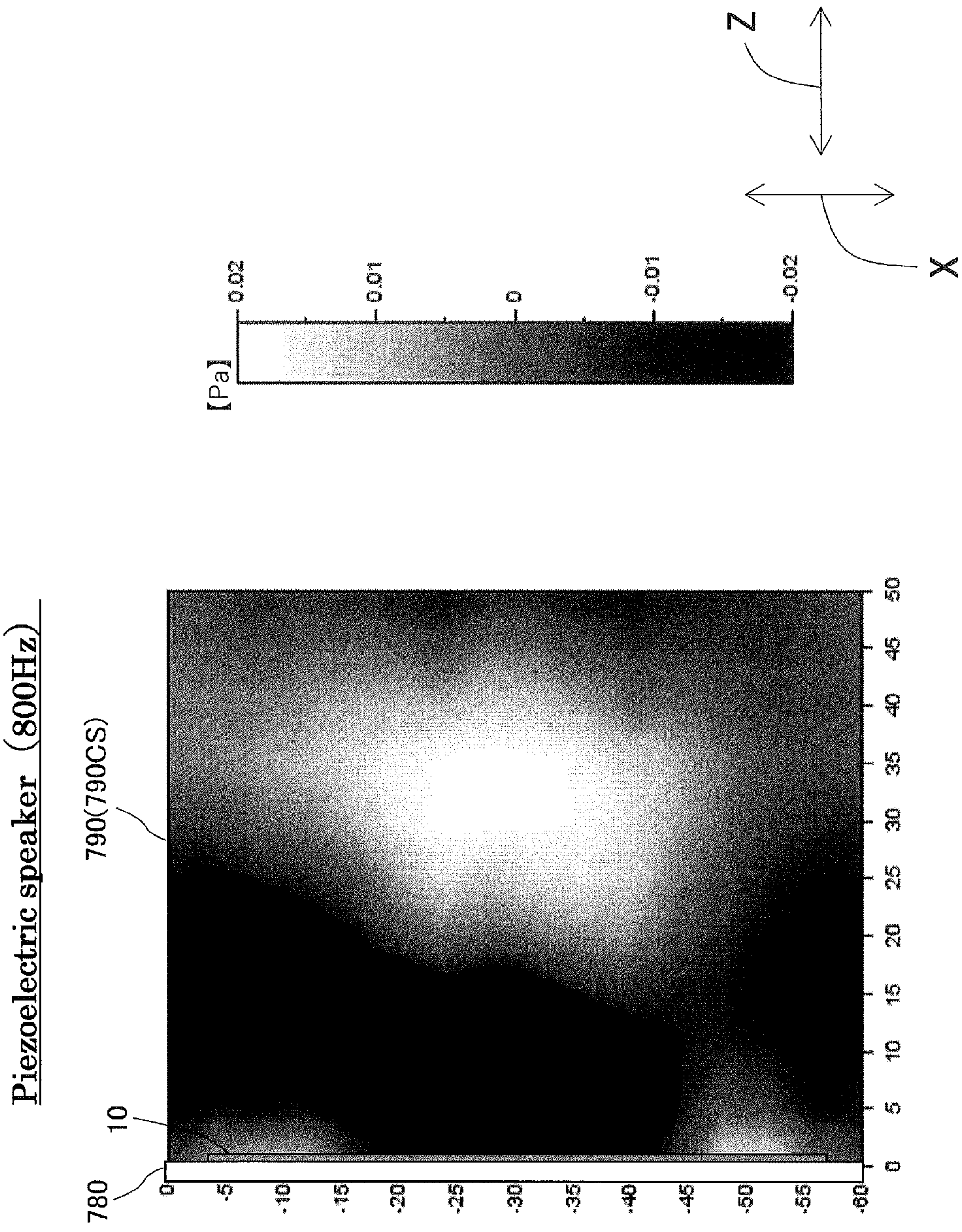
FIG. 51A is a diagram showing a sound pressure distribution derived from the piezoelectric speaker.
Figure 51B:
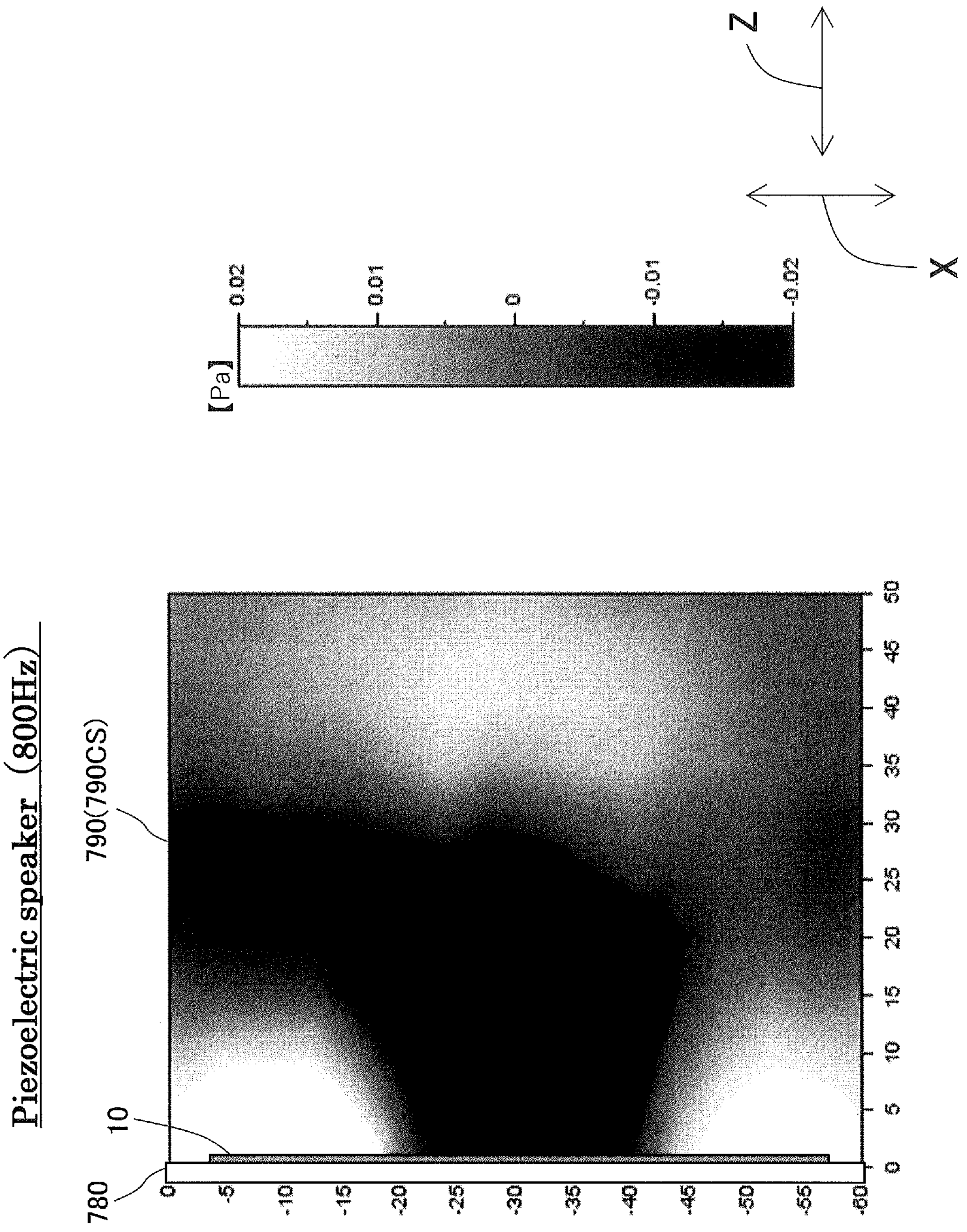
FIG. 51B is a diagram showing a sound pressure distribution derived from the piezoelectric speaker.
Figure 51C:
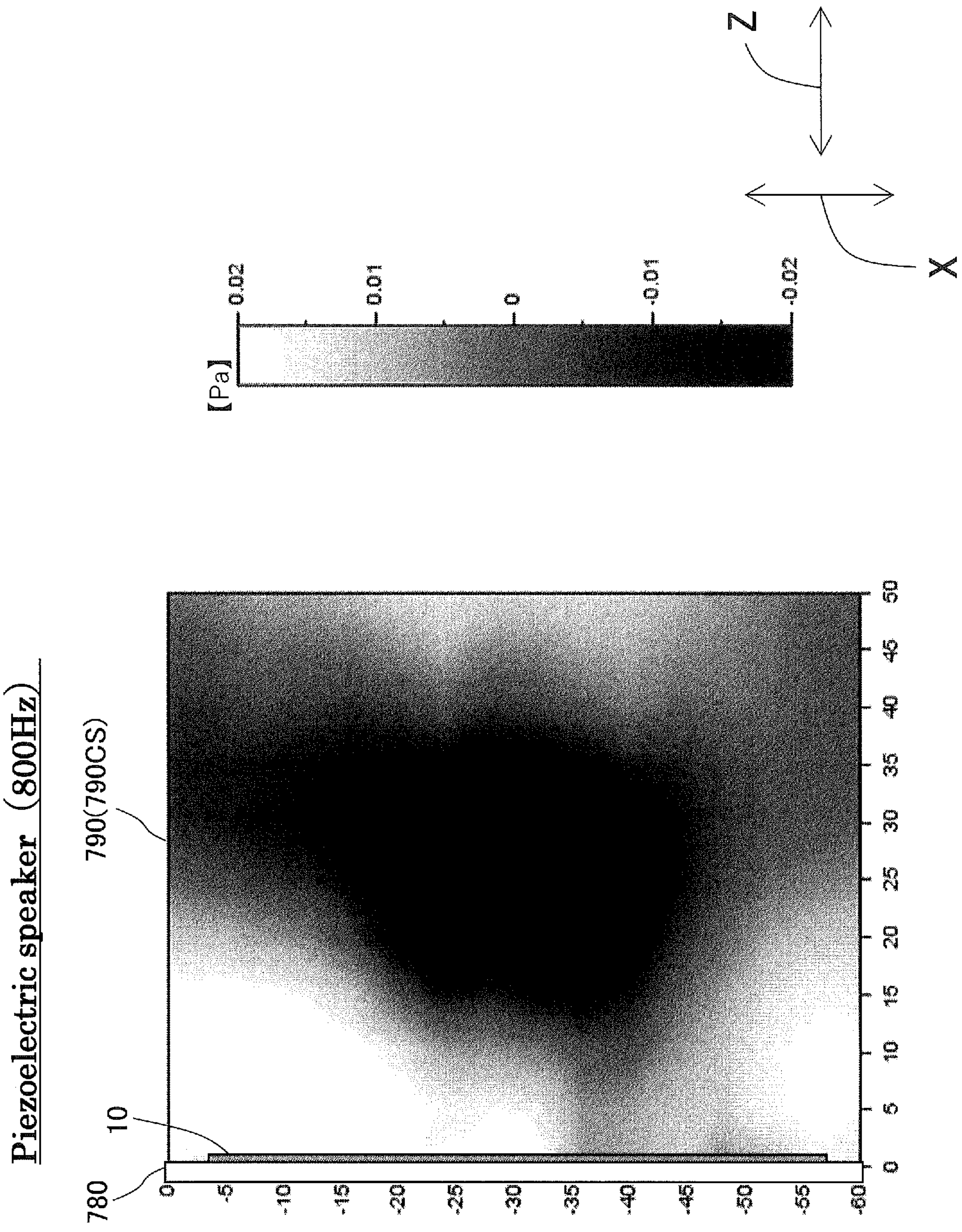
FIG. 51C is a diagram showing a sound pressure distribution derived from the piezoelectric speaker.
Figure 52:
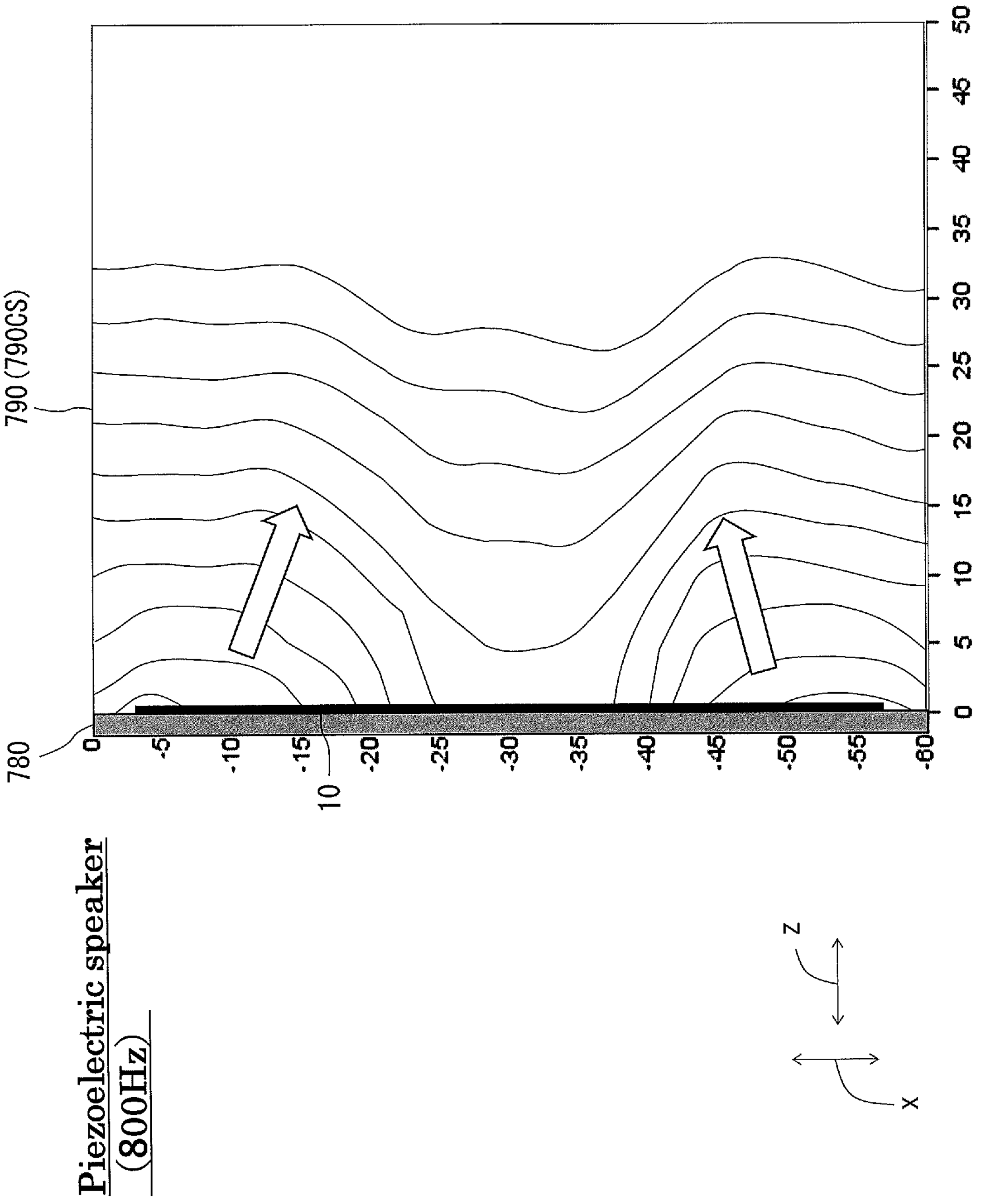
FIG. 52 is a diagram showing propagation of a wave front derived from the piezoelectric speaker.

Specifically, FIG. 49A to FIG. 49C show the sound pressure distributions derived from the piezoelectric speaker 10 relating to different times in the case where the frequency of the sine wave radiated from the noise source 700 is 500 Hz. FIG. 49A to FIG. 49C are arranged in chronological order. A series of lines in FIG. 50 represent propagation over time of a certain wave front generated by the piezoelectric speaker 10 in the case where the frequency of the sine wave radiated from the noise source 700 is 500 Hz. FIG. 51A to FIG. 51C show the sound pressure distributions derived from the piezoelectric speaker 10 relating to different times in the case where the frequency of the sine wave radiated from the noise source 700 is 800 Hz. FIG. 51A to FIG. 51C are arranged in chronological order. A series of lines in FIG. 52 represent propagation over time of a certain wave front generated by the piezoelectric speaker 10 in the case where the frequency of the sine wave radiated from the noise source 700 is 800 Hz.

FIG. 49A to FIG. 52 show that the wave front propagates so as to approach, from two outer regions of the radiation surface 15 of the piezoelectric speaker 10 with a center region sandwiched therebetween, an axis passing through the center region and extending in the z direction. Wave front propagation shown in FIG. 49A to FIG. 52 occurs in the same manner as in FIG. 3. Specifically, a wave front of a diffracted wave generated by diffraction of noise from the noise source 700 at the partition 780 and the wave front derived from the piezoelectric speaker 10 have a common point that the both wave fronts propagate while approaching the above axis.

Further, from FIG. 45A to FIG. 48, it is understood that diffraction at the partition 780 causes appearance of a period during which the phase of the sound wave in the first region 15*a* and the phase of the sound wave in the second region 15*b* are the same in terms of whether positive or negative, the phase of the sound wave in the first region 15*a* and the phase of the sound wave in the third region 15*c* are opposite to each other in terms of whether positive or negative, and the phase of the sound wave in the second region 15*b* and the phase of the sound wave in the third region 15*c* are opposite to each other in terms of whether positive or negative of the phase (see FIG. 1 to FIG. 3 and related descriptions for the regions 15*a*, 15*b* and 15*c*). From FIG. 49A to FIG. 52, it is understood that the piezoelectric speaker 10 causes appearance of a period during which the phase of the first sound wave and the phase of the second sound wave are the same in terms of whether positive or negative, the phase of the first sound wave and the phase of the third sound wave are opposite to each other in terms of whether positive or negative, and the phase of the second sound wave and the phase of the third sound wave are opposite to each other in terms of whether positive or negative (see the description given using FIG. 1 to FIG. 3 for the first sound wave, the second sound wave and the third sound wave). The phase distribution in the first region 15*a*, the second region 15*b*, and the third region 15*c* is also common to noise derived from the noise source 700 and sound derived from the piezoelectric speaker 10.

Comparative Example 1

Measurement of Sound Output from Dynamic Speaker 610

The piezoelectric speaker 10 of Example 1 was replaced with the dynamic speaker 610. This dynamic speaker 610 is Fostex P650K manufactured by Foster Electric Company, Limited. In the same manner as in Example 1 except this replacement, sound pressures derived from the dynamic speaker 610 at the 176 measurement points of the measurement cross-section 790CS were measured for mapping. FIG. 53A to FIG. 56 show the sound pressure distributions obtained by the mapping. The dynamic speaker 610 is embedded in the partition 780.

Figure 53A:
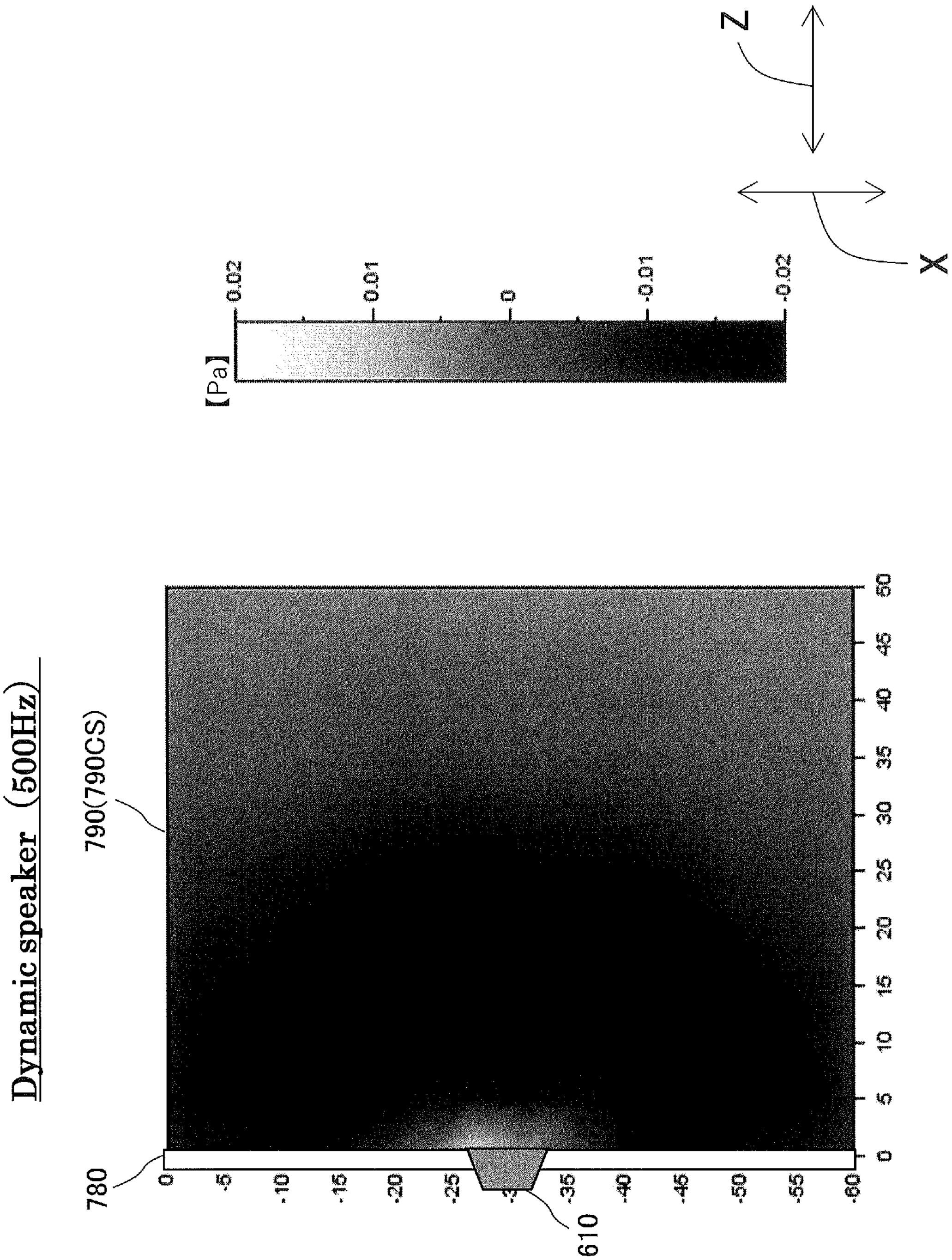
FIG. 53A is a diagram showing a sound pressure distribution derived from a dynamic speaker.
Figure 53B:
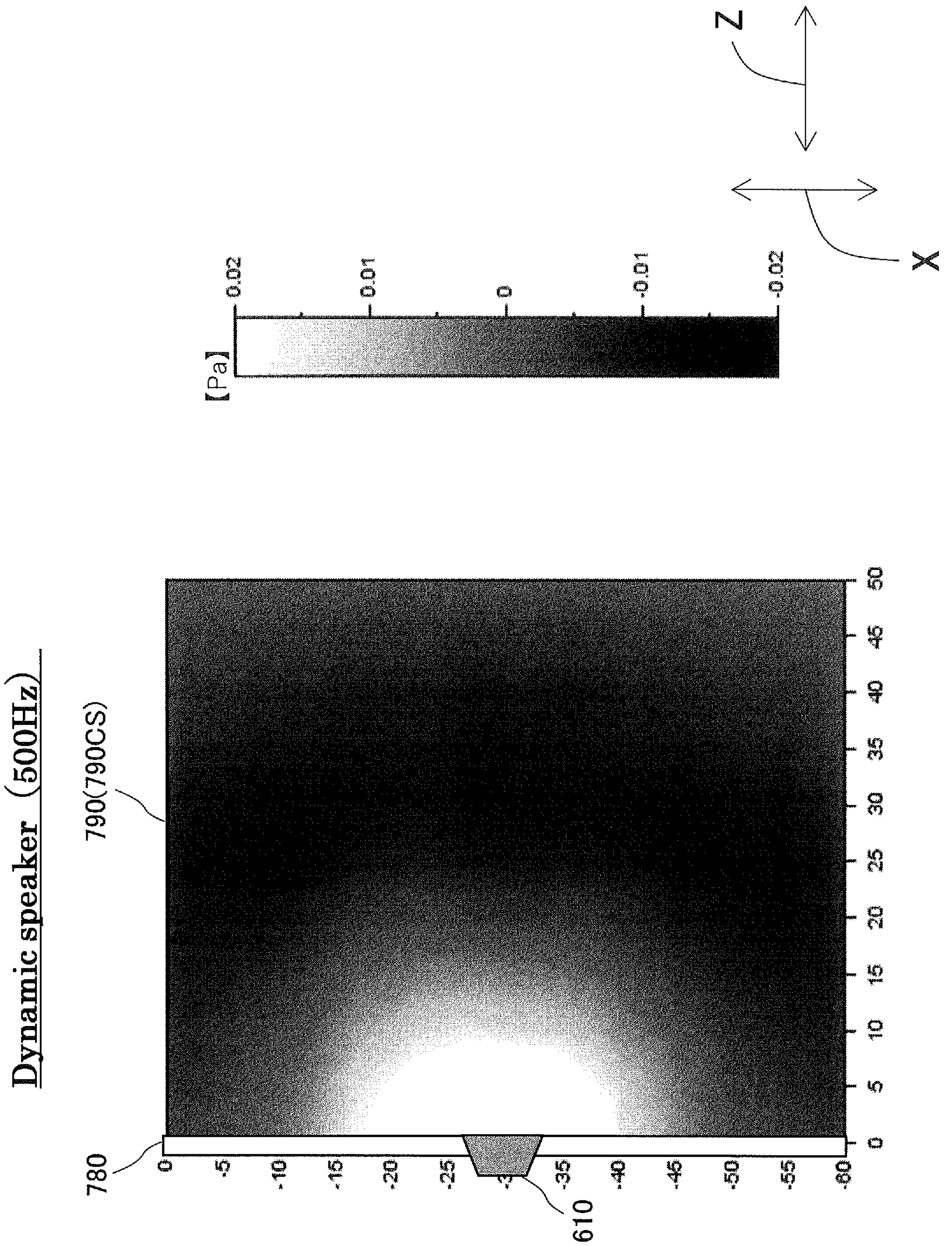
FIG. 53B is a diagram showing a sound pressure distribution derived from the dynamic speaker.
Figure 53C:
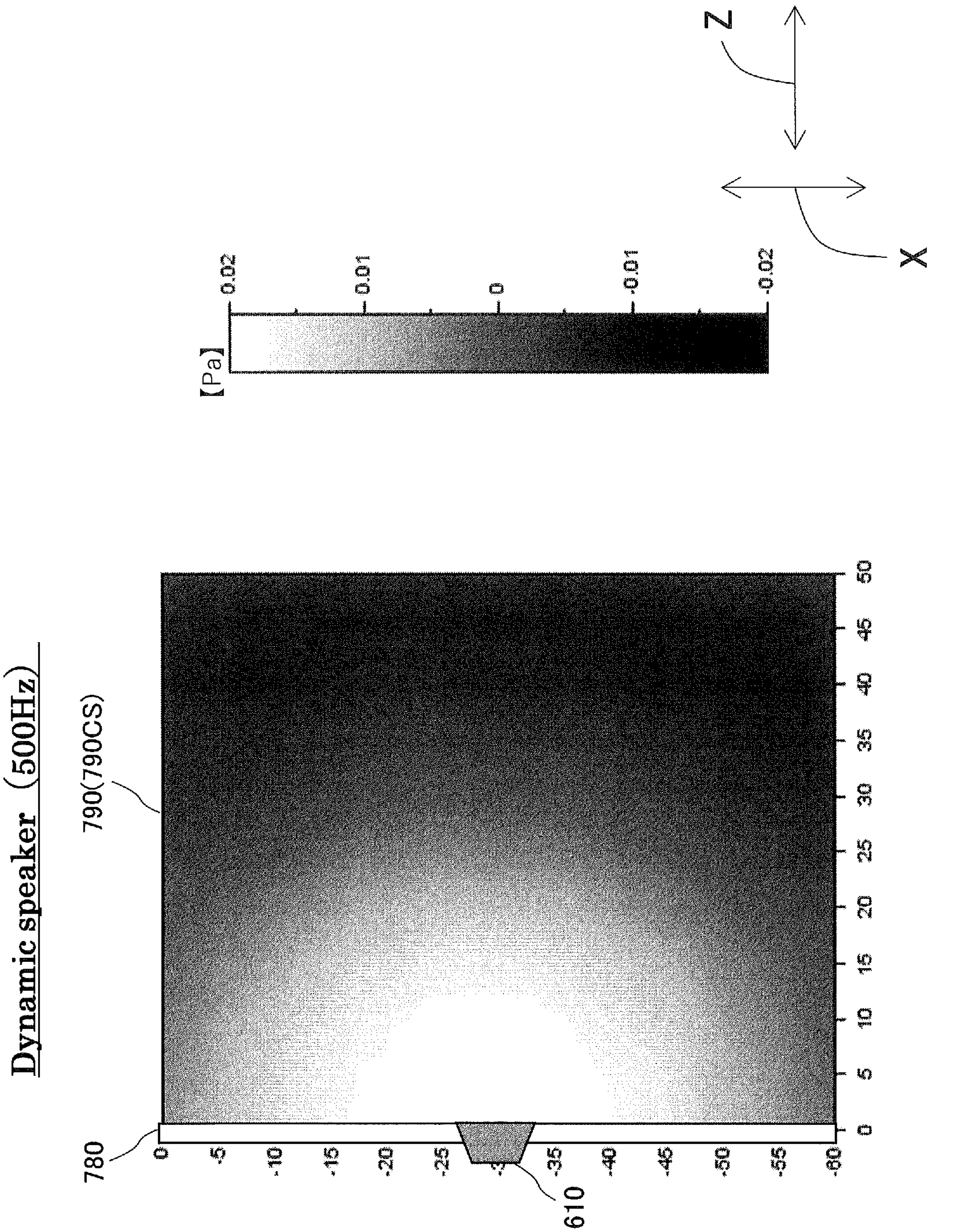
FIG. 53C is a diagram showing a sound pressure distribution derived from the dynamic speaker.
Figure 54:
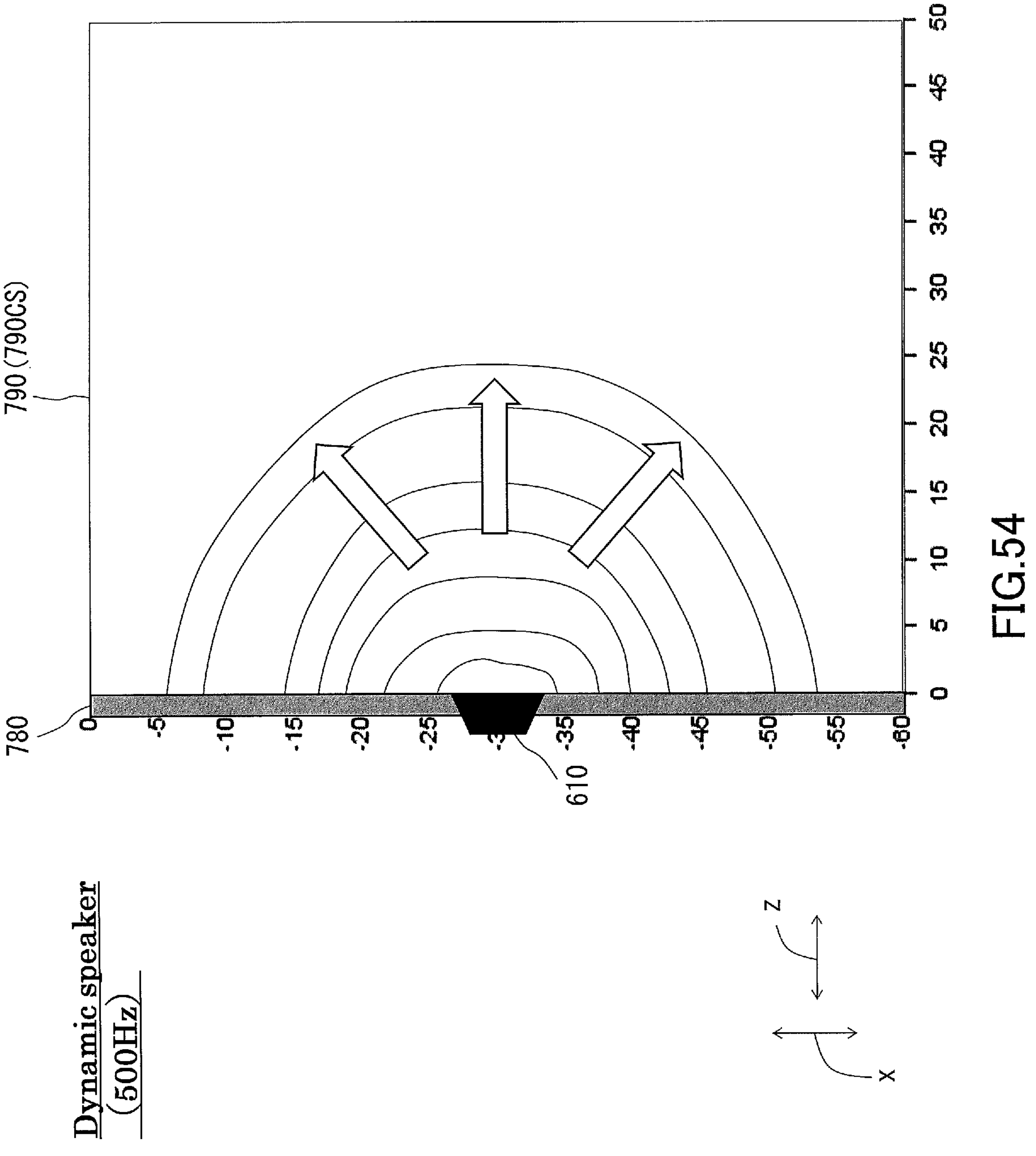
FIG. 54 is a diagram showing propagation of a wave front derived from the dynamic speaker.
Figure 55A:
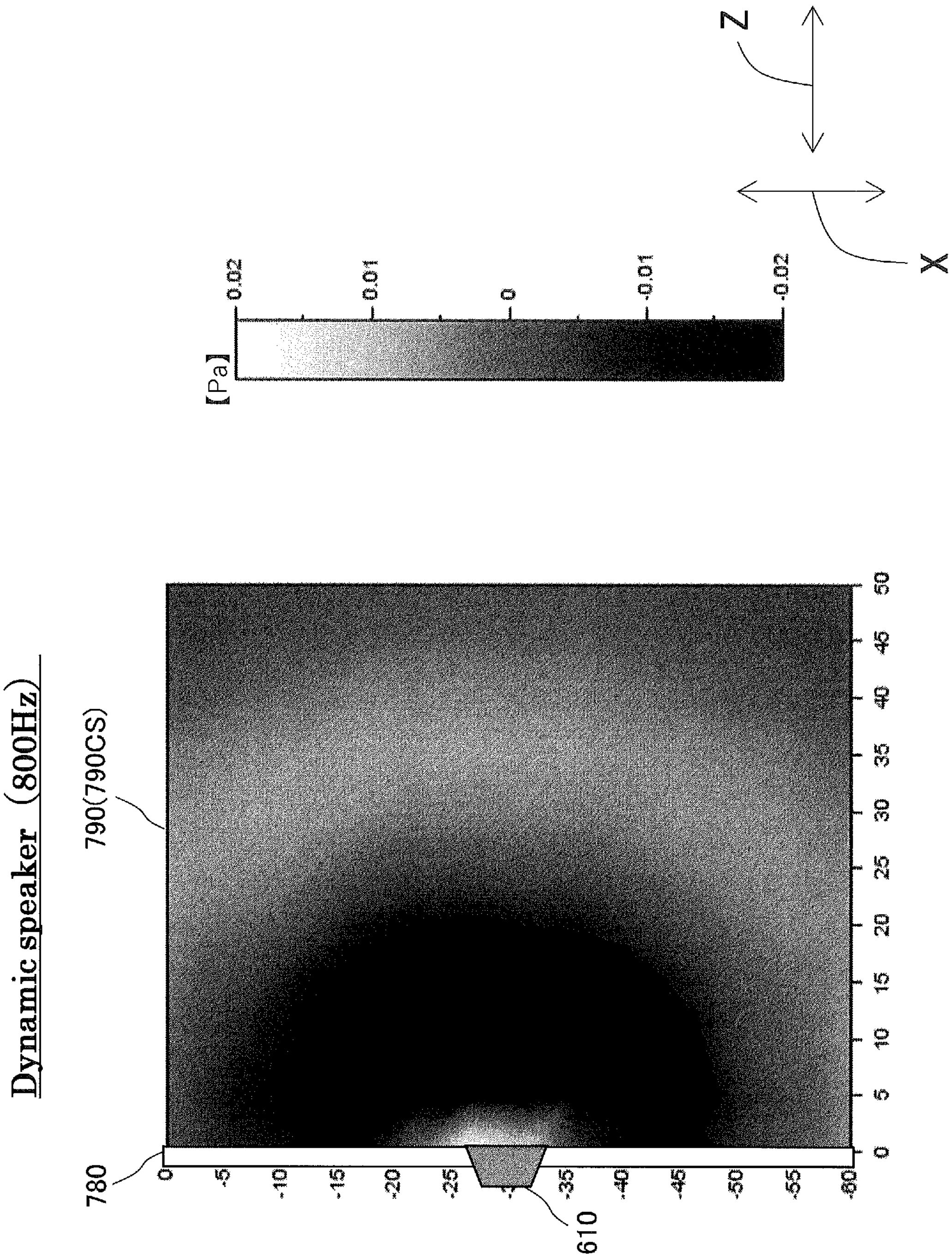
FIG. 55A is a diagram showing a sound pressure distribution derived from the dynamic speaker.
Figure 55B:
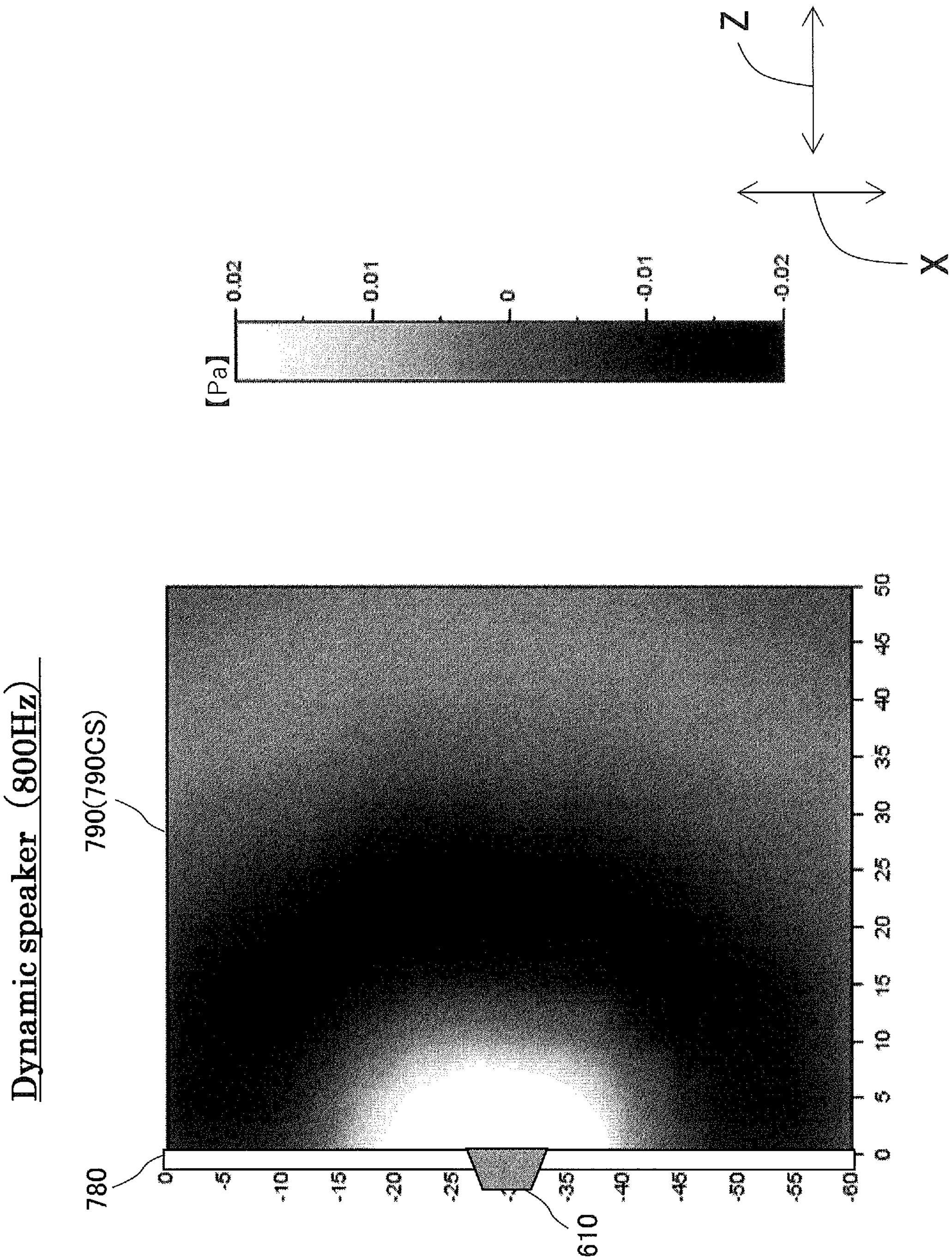
FIG. 55B is a diagram showing a sound pressure distribution derived from the dynamic speaker.
Figure 55C:
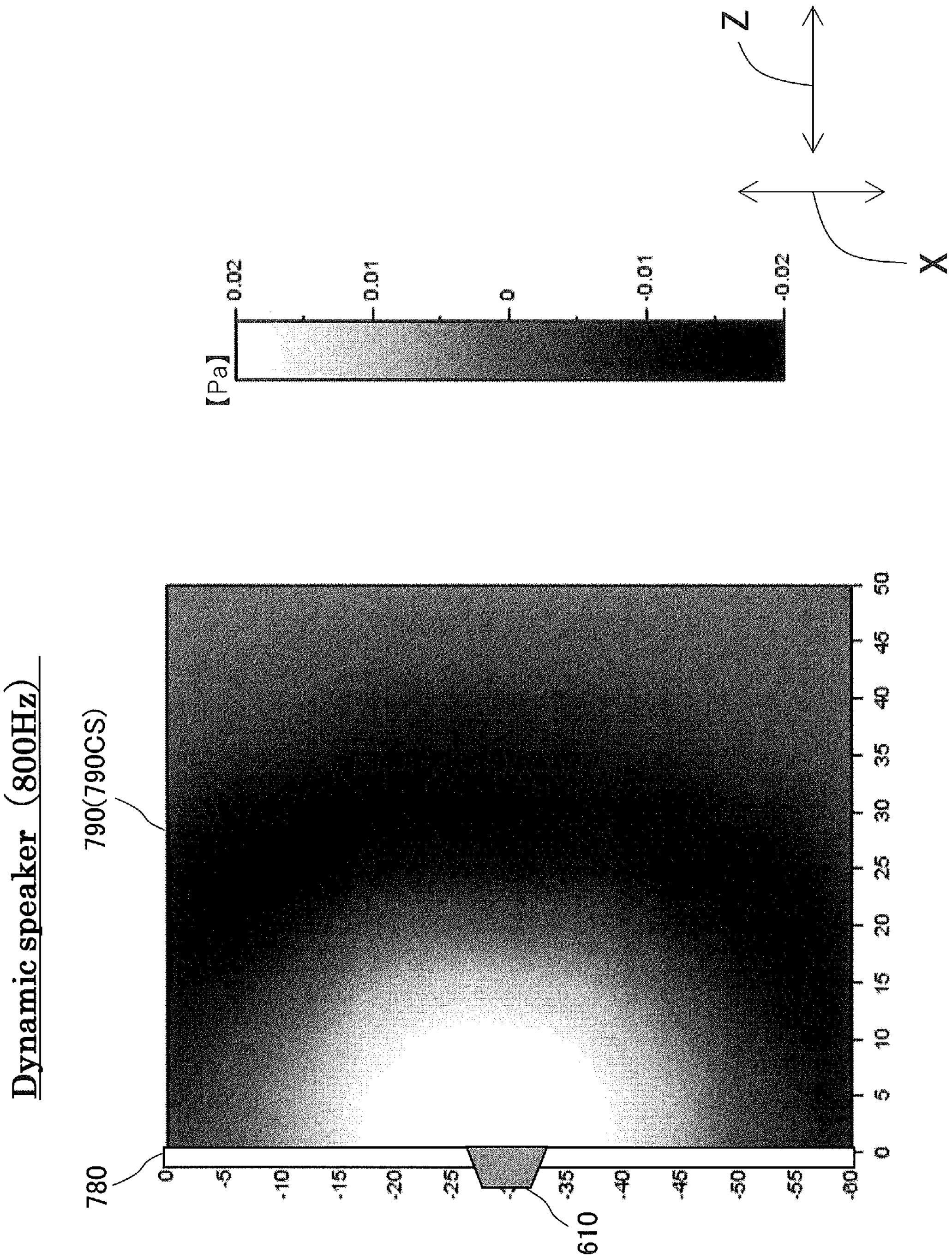
FIG. 55C is a diagram showing a sound pressure distribution derived from the dynamic speaker.
Figure 56:
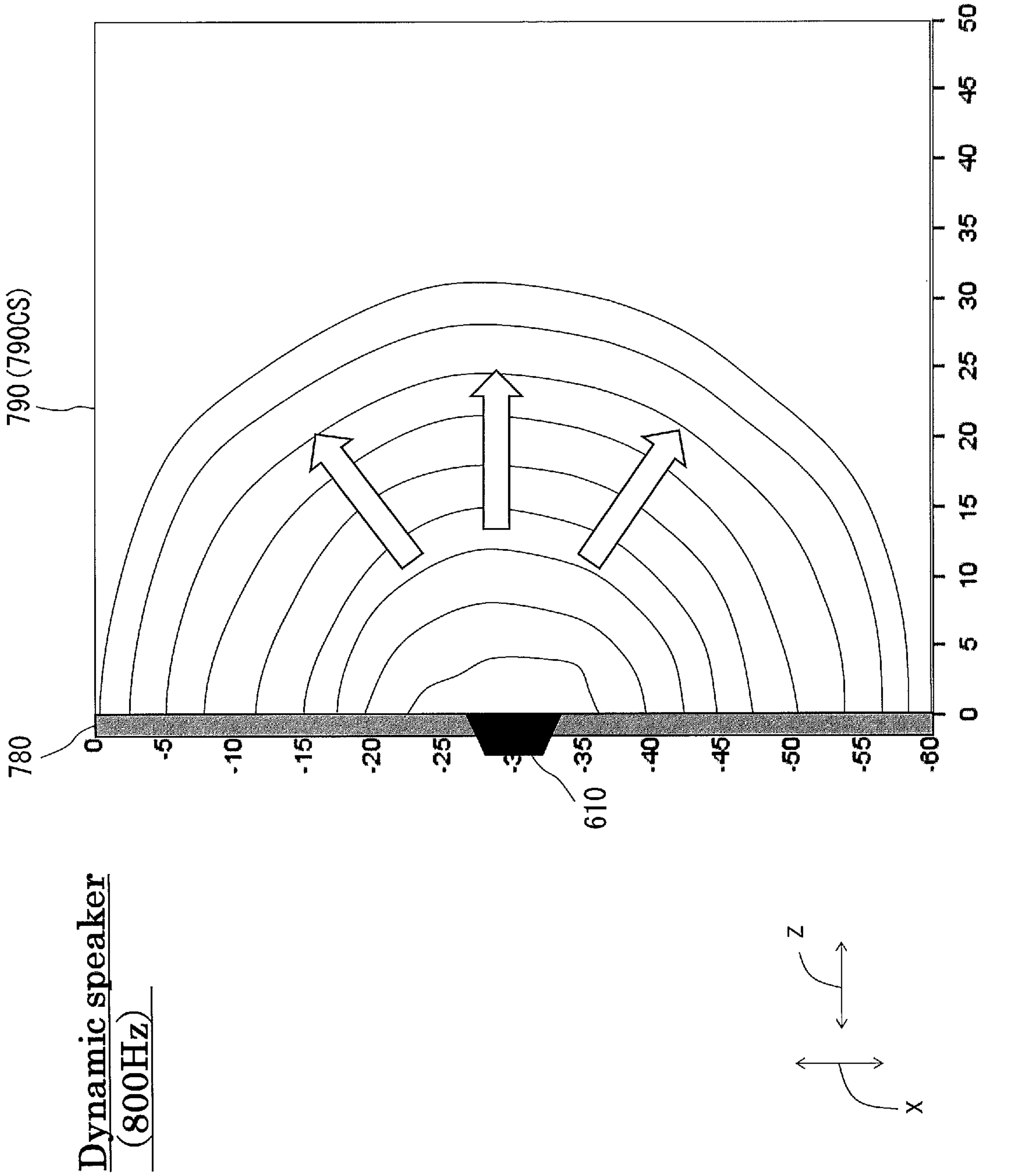
FIG. 56 is a diagram showing propagation of a wave front derived from the dynamic speaker.

Specifically, FIG. 53A to FIG. 53C show the sound pressure distributions derived from the dynamic speaker 610 relating to different times in the case where the frequency of the sine wave radiated from the noise source 700 is 500 Hz. FIG. 53A to FIG. 53C are arranged in chronological order. A series of lines in FIG. 54 represent propagation over time of a certain wave front generated by the dynamic speaker 610 in the case where the frequency of the sine wave radiated from the noise source 700 is 500 Hz. FIG. 55A to FIG. 55C show the sound pressure distributions derived from the dynamic speaker 610 relating to different times in the case where the frequency of the sine wave radiated from the noise source 700 is 800 Hz. FIG. 55A to FIG. 55C are arranged in chronological order. A series of lines in FIG. 56 represent propagation over time of a certain wave front generated by the dynamic speaker 610 in the case where the frequency of the sine wave radiated from the noise source 700 is 800 Hz.

FIG. 53A to FIG. 56 show that a substantially hemispherical wave is radiated from the radiation surface of the dynamic speaker 610, and the substantially hemispherical wave has also a substantially hemispherical wave front. Wave front propagation shown in FIG. 53A to FIG. 56 occurs in the same manner as in FIG. 4.

Comparative Example 2

Measurement of Sound Output from Plane Speaker 620

The piezoelectric speaker 10 of Example 1 was replaced with the plane speaker 620. This plane speaker 620 is FPS2030M3P1R manufactured by FPS Inc. In the same manner as in Example 1 except this replacement, sound pressures derived from the plane speaker 620 at the 176 measurement points of the measurement cross-section 790CS were measured for mapping. FIG. 57A to FIG. 60 show the sound pressure distributions obtained by the mapping.

Figure 57A:
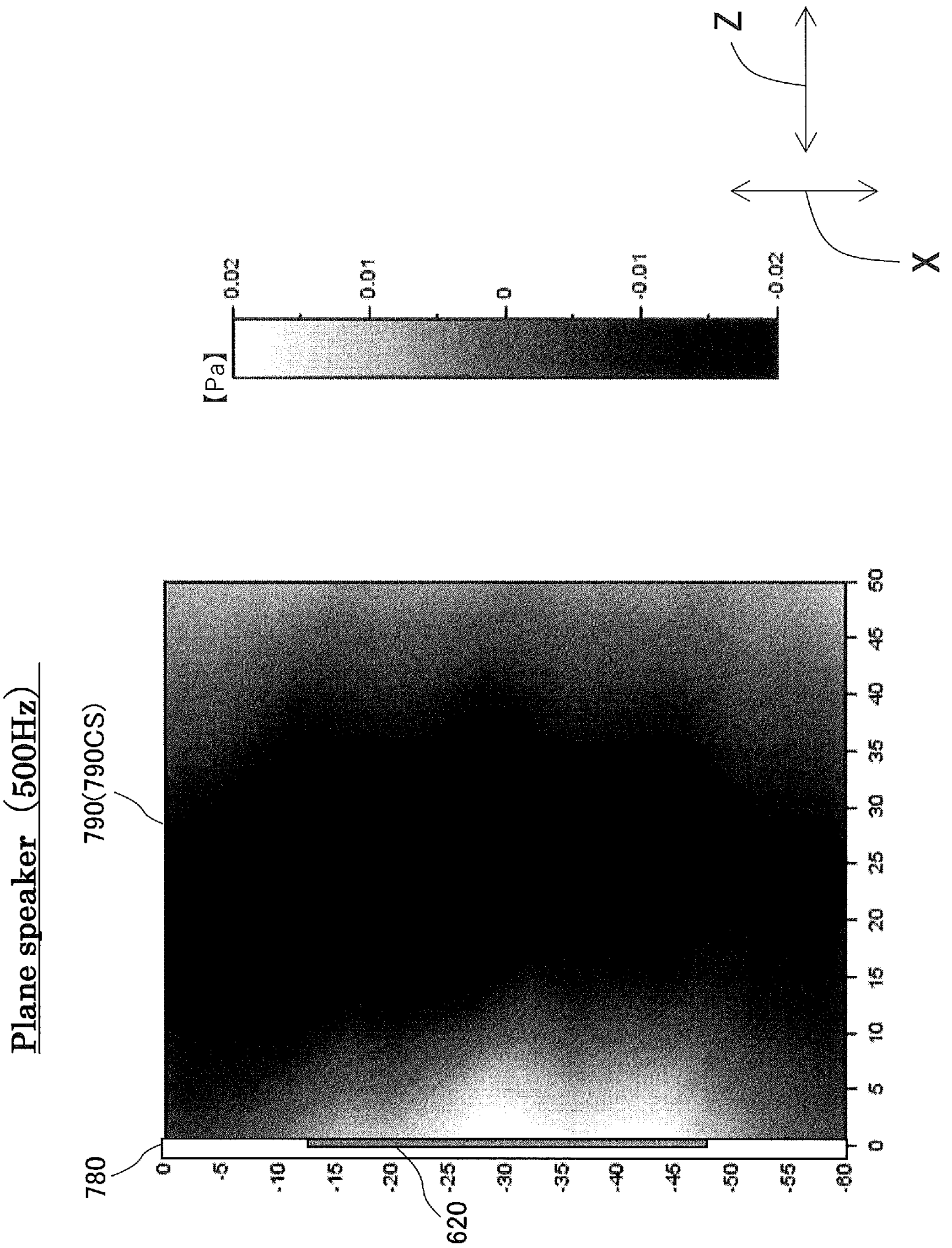
FIG. 57A is a diagram showing a sound pressure distribution derived from a plane speaker.
Figure 57B:
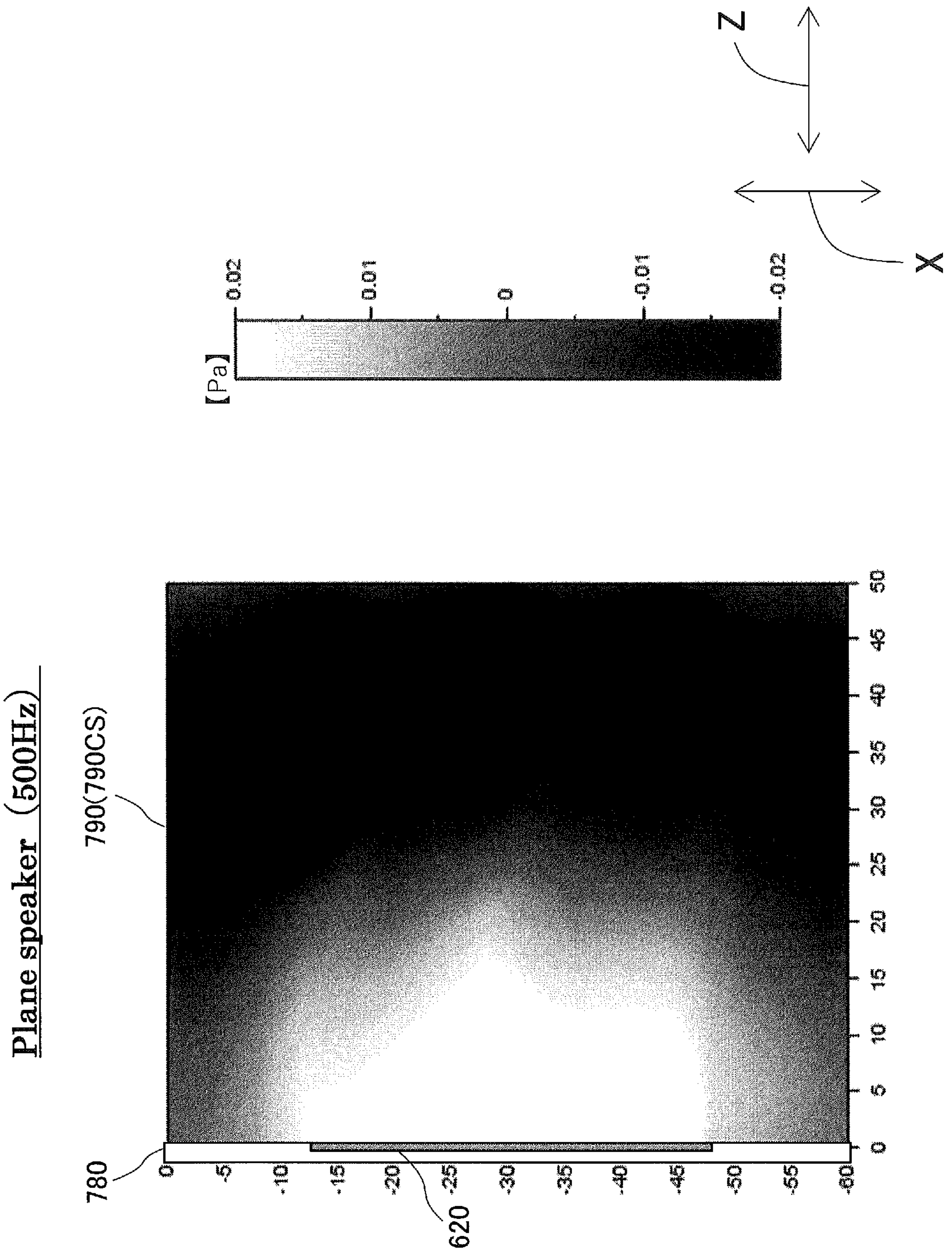
FIG. 57B is a diagram showing a sound pressure distribution derived from the plane speaker.
Figure 57C:
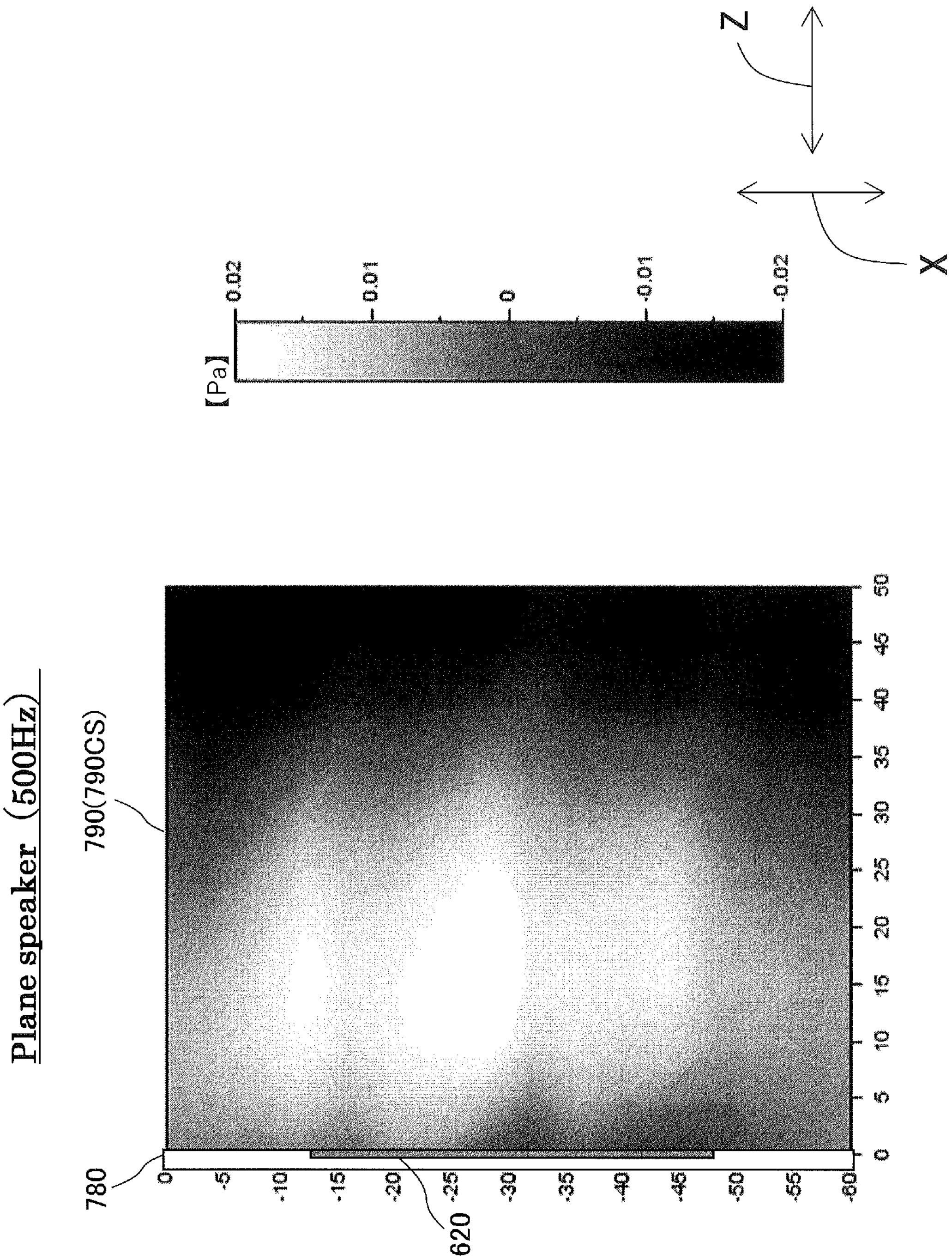
FIG. 57C is a diagram showing a sound pressure distribution derived from the plane speaker.
Figure 58:
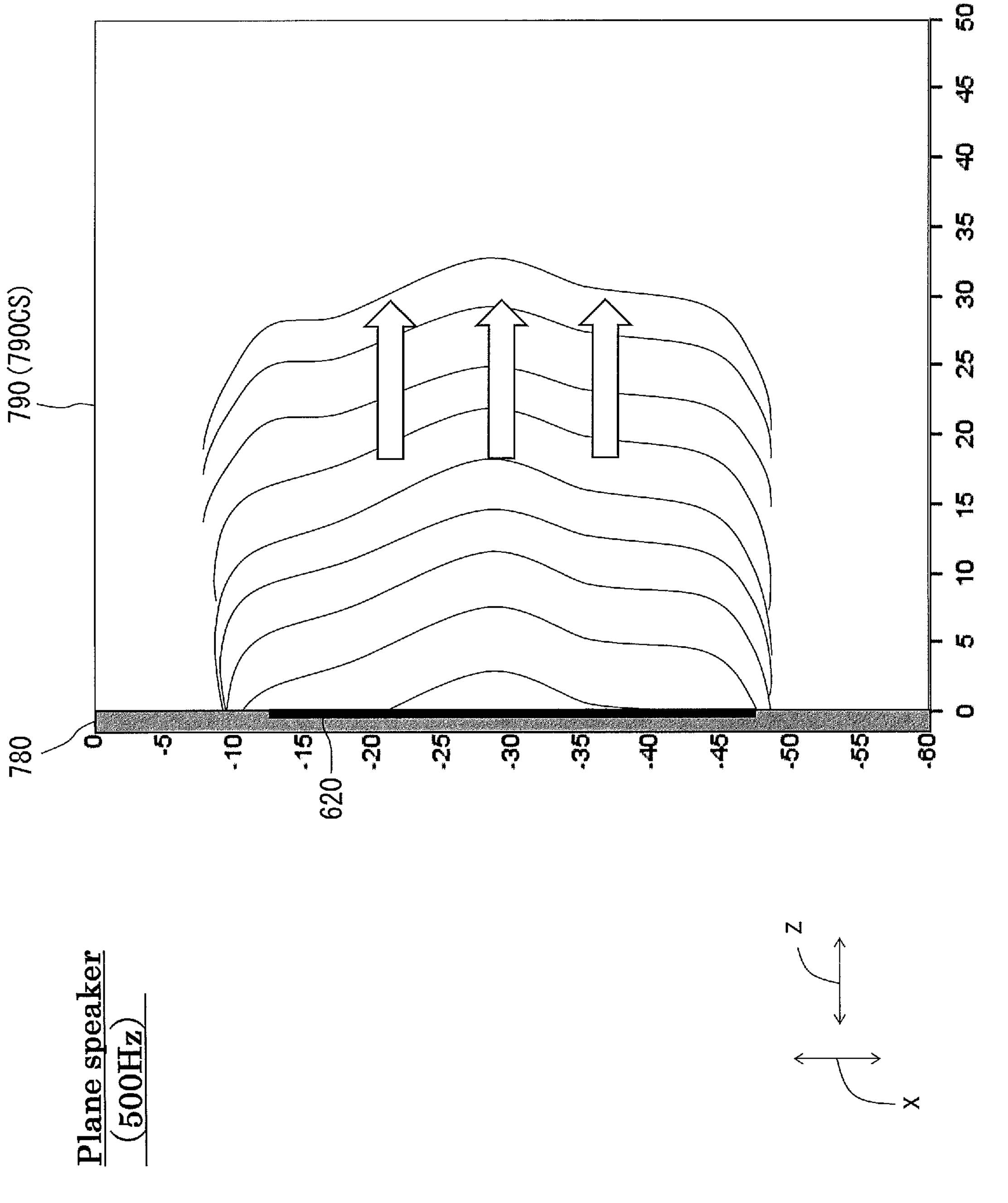
FIG. 58 is a diagram showing propagation of a wave front derived from the plane speaker.
Figure 59A:
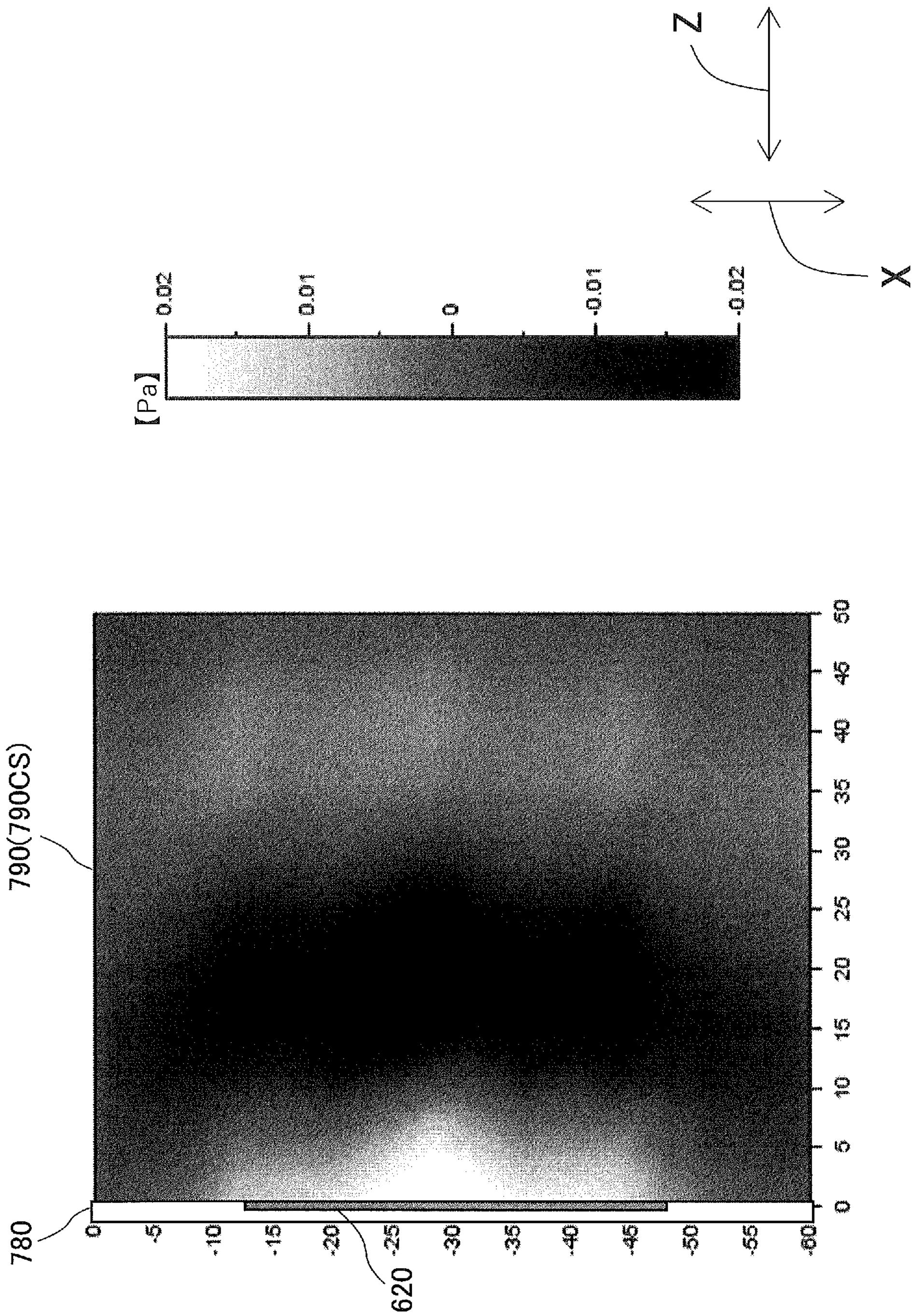
FIG. 59A is a diagram showing a sound pressure distribution derived from the plane speaker.
Figure 59B:
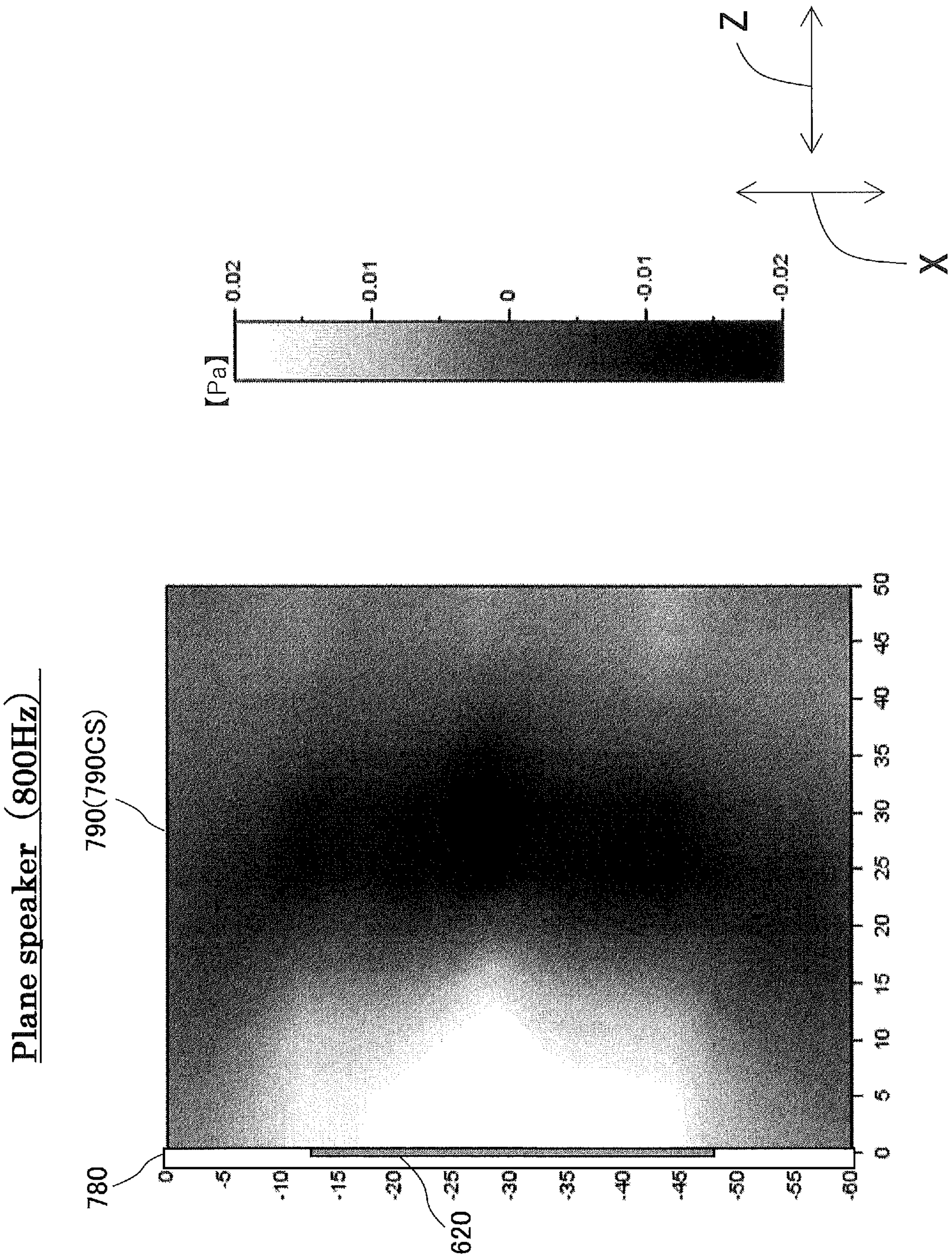
FIG. 59B is a diagram showing a sound pressure distribution derived from the plane speaker.
Figure 59C:
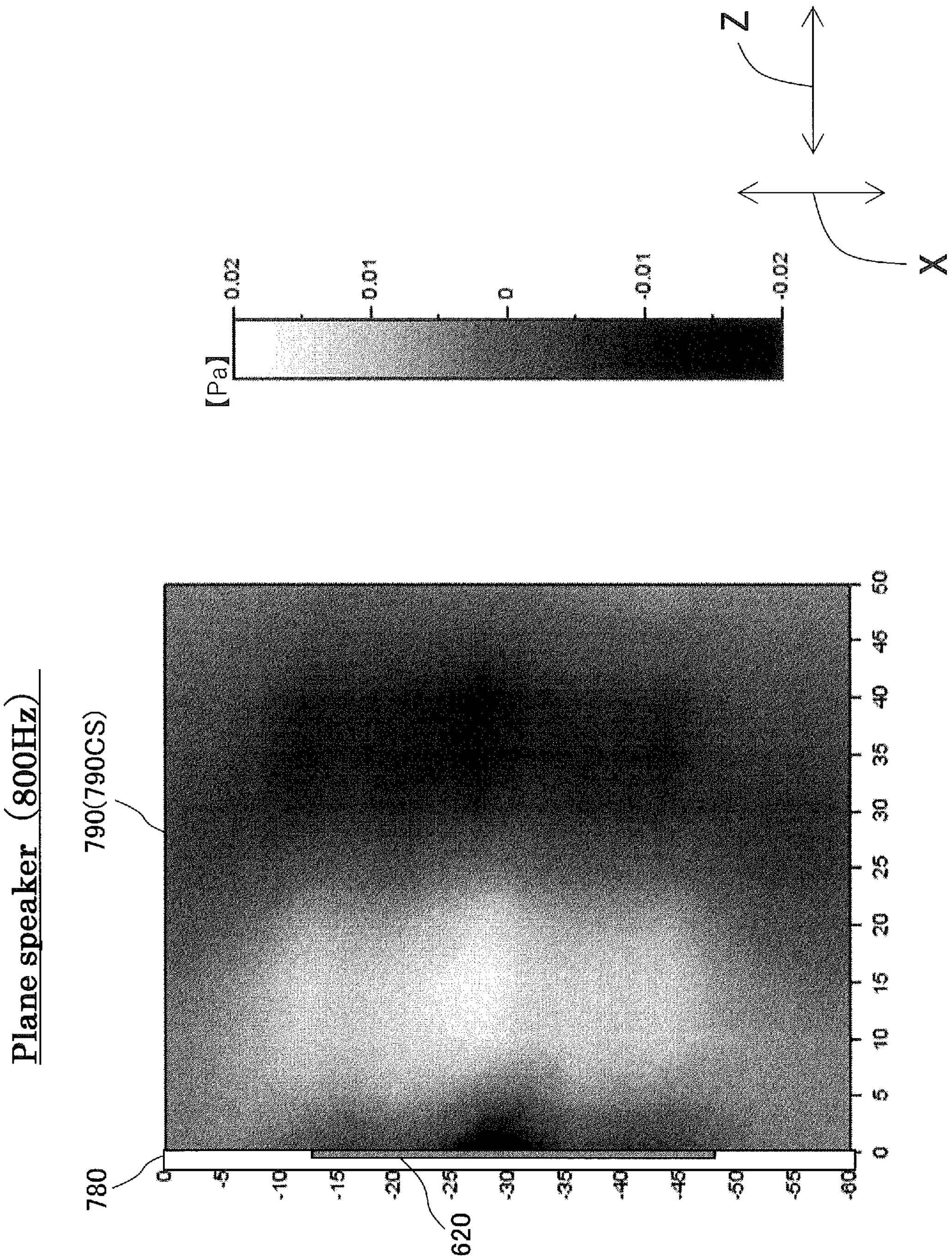
FIG. 59C is a diagram showing a sound pressure distribution derived from the plane speaker.
Figure 60:
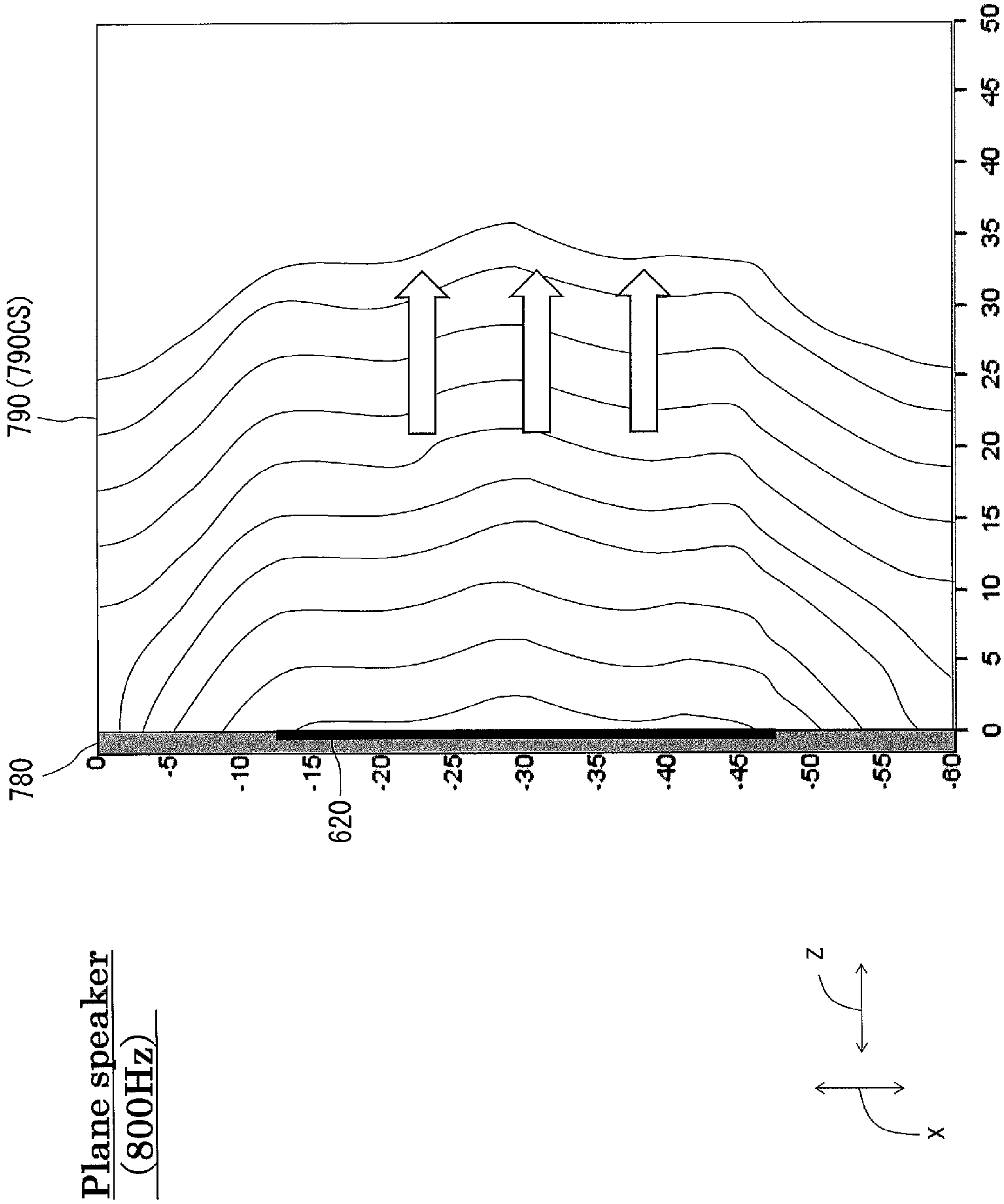
FIG. 60 is a diagram showing propagation of a wave front derived from the plane speaker.

Specifically, FIG. 57A to FIG. 57C show the sound pressure distributions derived from the plane speaker 620 relating to different times in the case where the frequency of the sine wave radiated from the noise source 700 is 500 Hz. FIG. 57A to FIG. 57C are arranged in chronological order. A series of lines in FIG. 58 represent propagation over time of a certain wave front generated by the plane speaker 620 in the case where the frequency of the sine wave radiated from the noise source 700 is 500 Hz. FIG. 59A to FIG. 59C show the sound pressure distributions derived from the plane speaker 620 relating to different times in the case where the frequency of the sine wave radiated from the noise source 700 is 800 Hz. FIG. 59A to FIG. 59C are arranged in chronological order. A series of lines in FIG. 60 represent propagation over time of a certain wave front generated by the plane speaker 620 in the case where the frequency of the sine wave radiated from the noise source 700 is 800 Hz.

FIG. 57A to FIG. 60 show that a substantially plane wave is radiated from the radiation surface of the plane speaker 620, and the substantially plane wave also has a substantially plane wave front. Wave front propagation shown in FIG. 57A to FIG. 60 occurs in the same manner as in FIG. 5.

(Sound Reducing Effect)

The difference in sound reducing effect between Example 1 and Comparative Example 2 will be described with reference to FIG. 61A to FIG. 62C. In the following description, terms "speaker ON time" and "speaker OFF time" may be used. A speaker ON time indicates a time when sound for sound reduction is radiated from the speaker. A speaker OFF time indicates a time when sound for sound reduction is not radiated from the speaker.

Figure 61A:
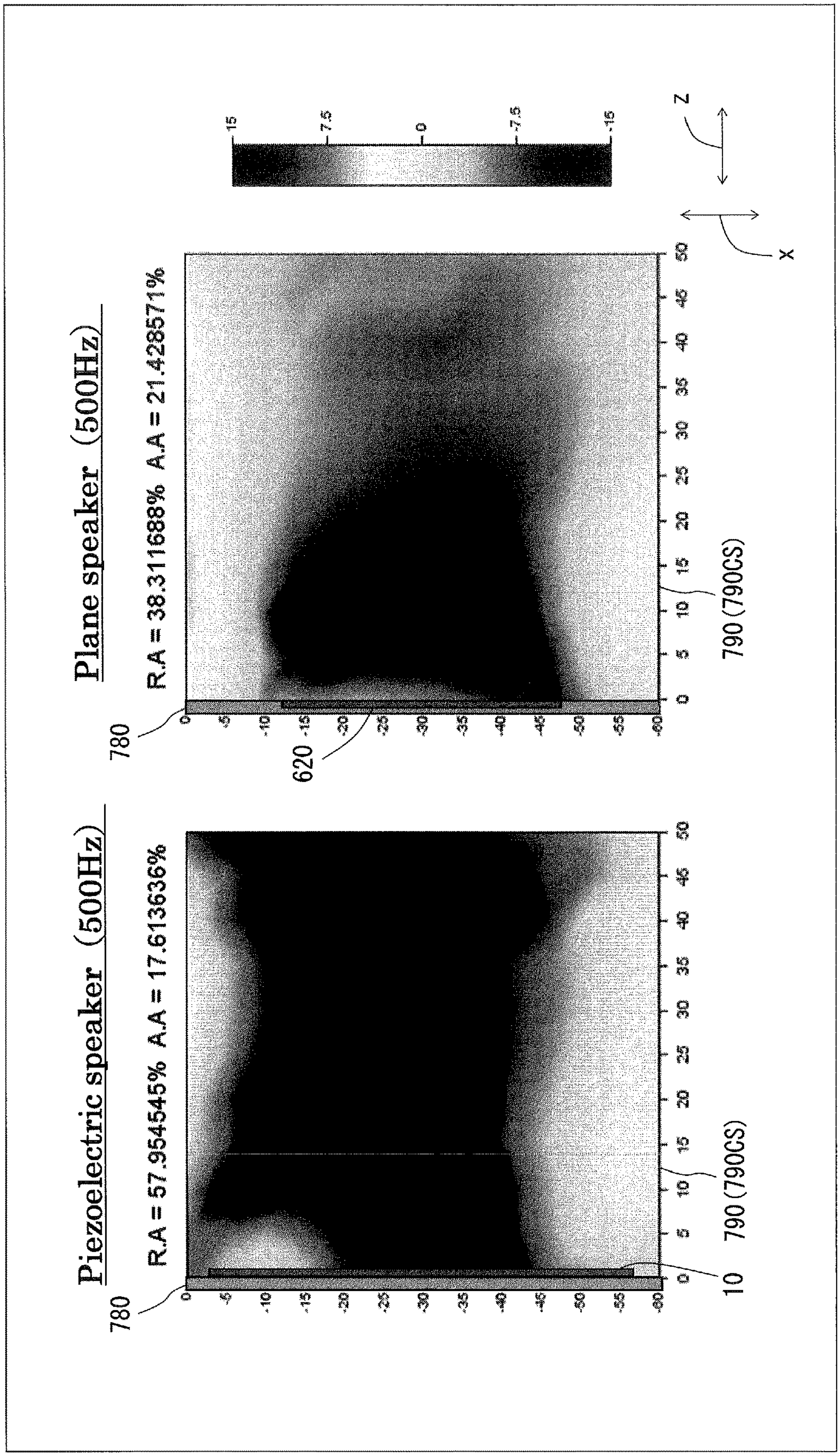
FIG. 61A is diagram illustrating a sound reducing effect.
Figure 62A:
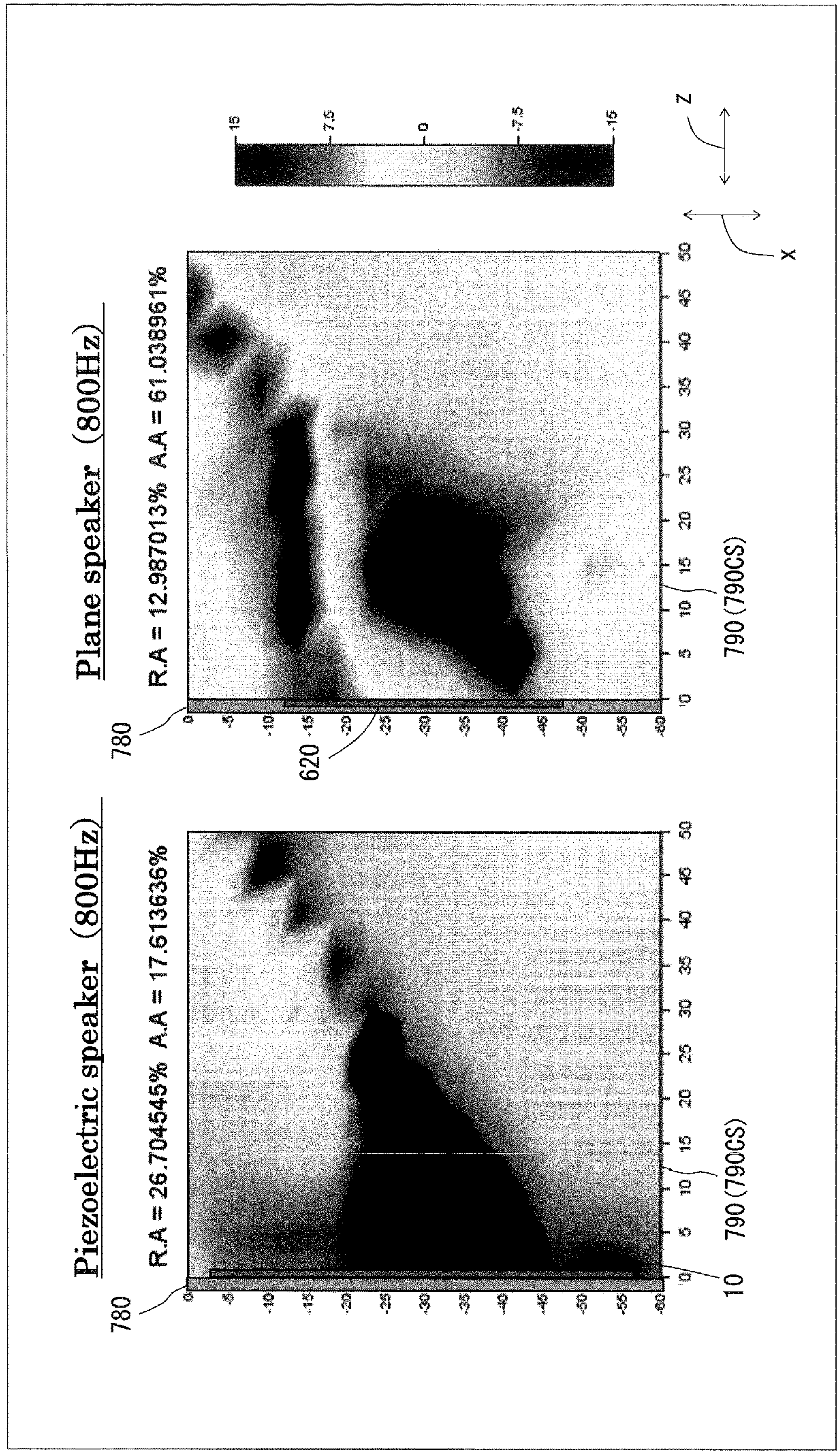
FIG. 62A is diagram illustrating the sound reducing effect.

Color maps of FIG. 61A and FIG. 62A show sound reducing states at a certain time when a sine wave is radiated from the noise source 700. In FIG. 61A and FIG. 62A, the color maps on the left show the sound reducing states by the piezoelectric speaker 10 of Example 1, and the color maps on the right show the sound reducing states by the plane speaker 620 of Comparative Example 2. FIG. 61A shows a sound pressure distribution at the certain time in the case where the frequency of the sine wave radiated from the noise source 700 is 500 Hz. FIG. 62A shows a sound pressure distribution at the certain time in the case where the frequency of the sine wave radiated from the noise source 700 is 800 Hz.

In FIG. 61A and FIG. 62A, numerical values on the right side of color bars indicate the amplification factor in units of dB. The amplification factor being X represents that a sound pressure is amplified by XdB at a speaker ON time with reference to a speaker OFF time. The amplification factor being negative indicates that a sound reducing effect is exhibited. In contrast, the amplification factor being positive indicates that noise is amplified. Reduction area (R.A) indicates the ratio of an area where the amplification factor is −6 dB or less (i.e., area where the sound reducing effect is exhibited well) on the measurement cross-section 790CS.

Amplification area (A.A) indicates the ratio of an area where the amplification factor is more than 0 dB (i.e., area where the noise is amplified) on the measurement cross-section 790CS.

Figure 61B:
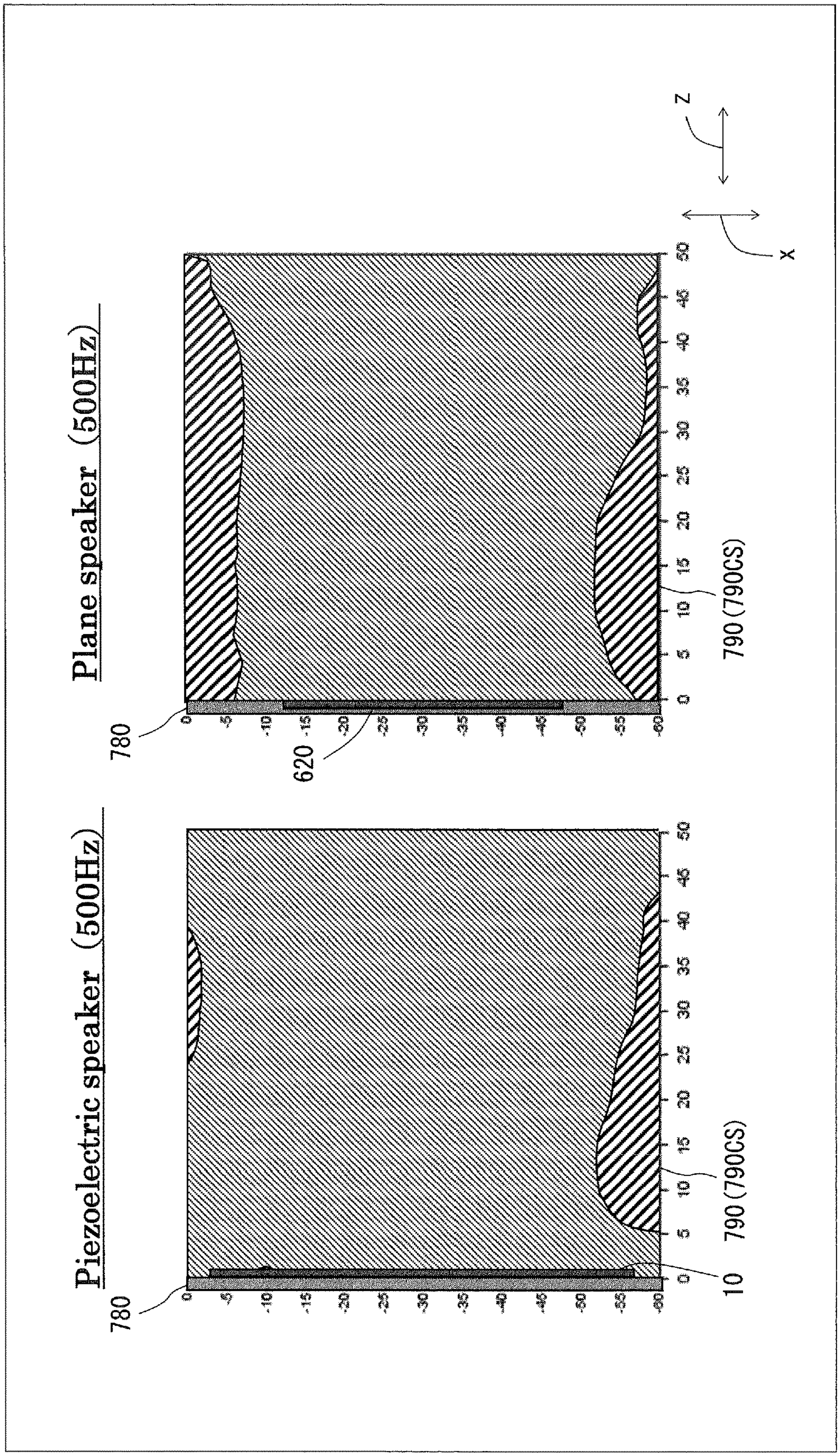
FIG. 61B is diagram illustrating the sound reducing effect.

FIG. 61B shows a finely hatched region where the amplification factor in FIG. 61A is less than 0 dB and a coarsely hatched region where the amplification factor is more than 0. FIG. 62B shows a finely hatched region where the amplification factor in FIG. 62A is less than 0 dB and a coarsely hatched region where the amplification factor is more than 0. That is, in FIG. 61B and FIG. 62B, the regions where noise is reduced are finely hatched and the amplification areas are coarsely hatched. The hatching in FIG. 61B and FIG. 62B is roughly done manually based on the visual observation of FIG. 61A and FIG. 62A. The same applies to FIG. 61C and FIG. 62C described later.

Figure 61C:
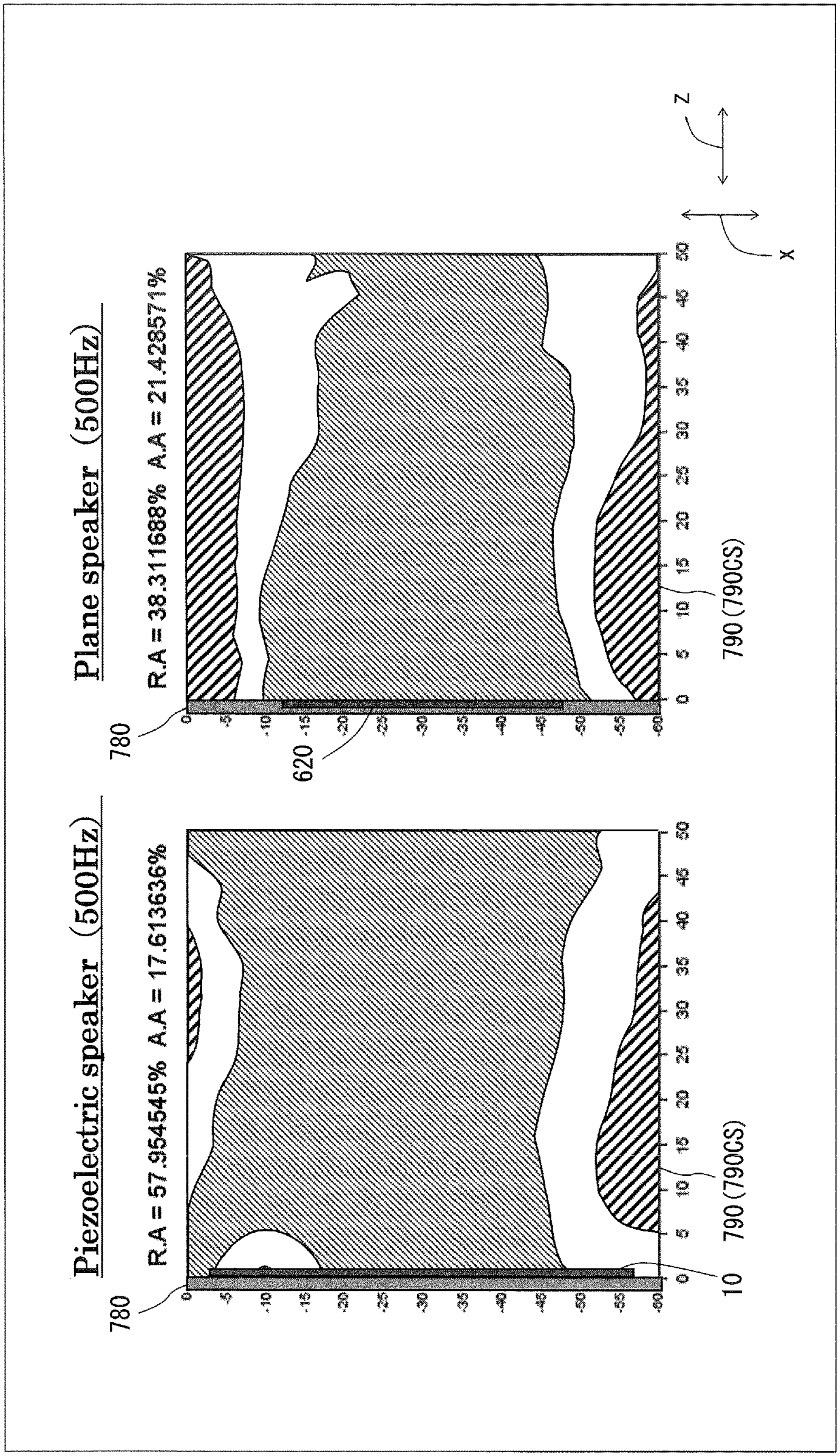
FIG. 61C is diagram illustrating the sound reducing effect.
Figure 62B:
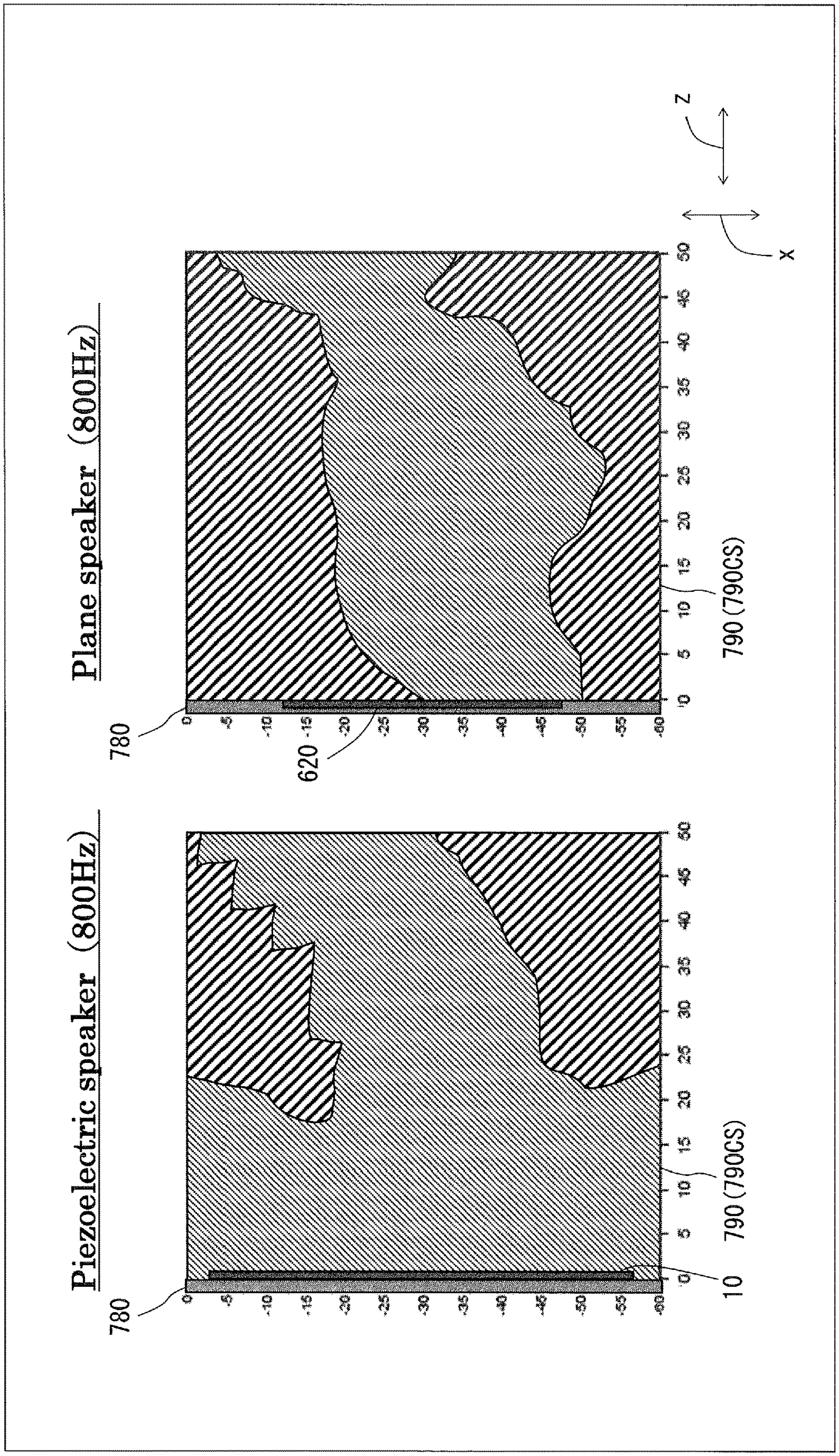
FIG. 62B is diagram illustrating the sound reducing effect.
Figure 62C:
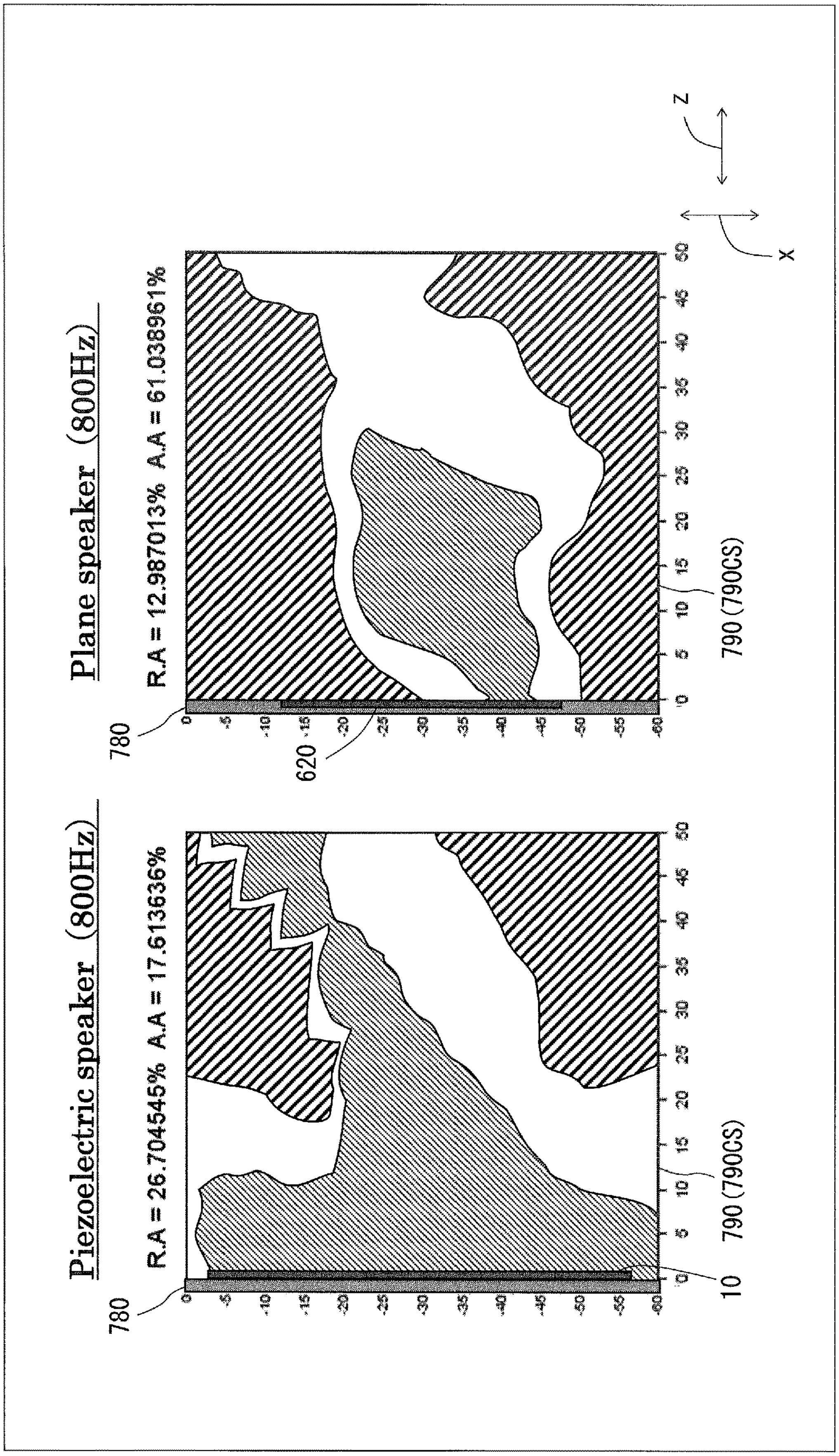
FIG. 62C is diagram illustrating the sound reducing effect.

FIG. 61C shows a finely hatched region where the amplification factor in FIG. 61A is −6 dB or less and a coarsely hatched region where the amplification factor is more than 0. FIG. 62C shows a finely hatched region where the amplification factor in FIG. 62A is −6 dB or less and a coarsely hatched region where the amplification factor is more than 0. That is, in FIG. 61C and FIG. 62C, the reduction regions are finely hatched and the amplification areas are coarsely hatched.

As shown in FIG. 61A to FIG. 62C, in the case where the piezoelectric speaker 10 of Example 1 is used, the area where the noise is reduced and the reduction area are large and the amplification area is small compared with the case where the plane speaker 620 of Comparative Example 2 is used.

Specifically, in the use case of the piezoelectric speaker 10 of Example 1, in the case where the frequency of the sine wave radiated from the noise source 700 is 500 Hz, the reduction area is about 58% and the amplification area is about 18%. In the case where the frequency of the sine wave radiated from the noise source 700 is 800 Hz, the reduction area is about 27% and the amplification area is about 18%.

Meanwhile, in the use case of the plane speaker 620 of Comparative Example 2, in the case where the frequency of the sine wave radiated from the noise source 700 is 500 Hz, the reduction area is about 38% and the amplification area is about 21%. In the case where the frequency of the sine wave radiated from the noise source 700 is 800 Hz, the reduction area is about 13% and the amplification area is about 61%.

FIG. 61A to FIG. 62C demonstrate that the advantage of the sound reducing effect of the piezoelectric speaker 10 with respect to the plane speaker 620 is exhibited more prominently when the frequency of the sine wave radiated from the noise source 700 is 800 Hz than when the frequency is 500 Hz.

It is expected that in the case where the dynamic speaker 610 of Comparative Example 1 is used, the area where the noise is reduced and the reduction area are small and the amplification is large compared with the case where the plane speaker 620 of Comparative Example 2 is used.

[Supporting Structure for Piezoelectric Film and Degree of Freedom of Vibration]

The following refers to an example of a supporting structure for the piezoelectric speaker according to the present invention. As can be understood from FIG. 6A, FIG. 15, FIG. 17, and FIG. 18 and the descriptions relating to these figures, in the piezoelectric speaker 10, the entire surface of the piezoelectric film 35 is fixed to the structure 80 with the joining layers 51 and 52 and the interposed layer 40 therebetween.

Figure 6B:
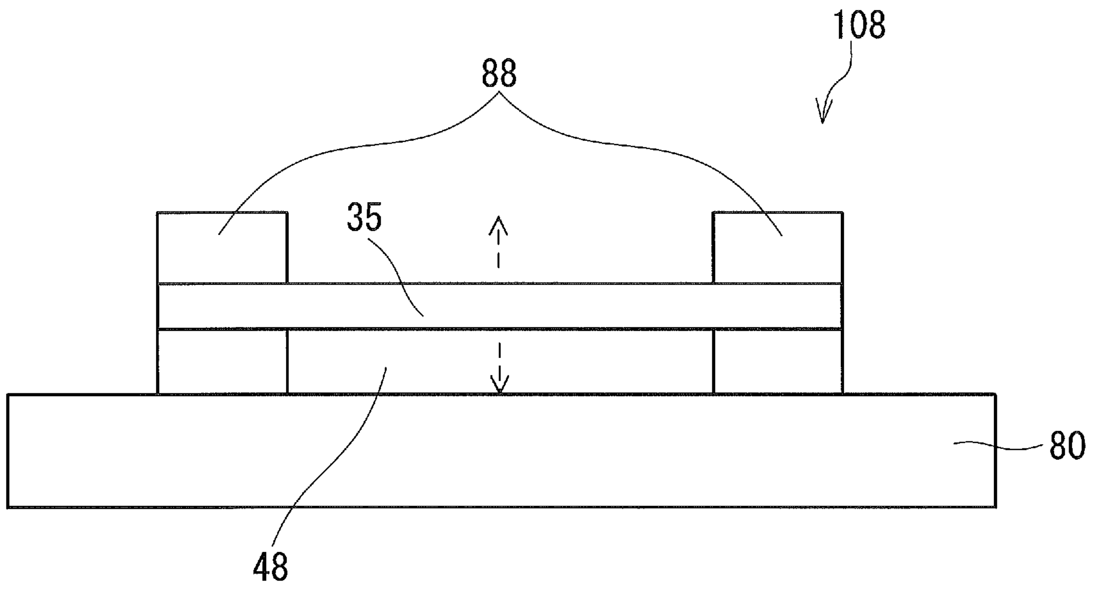
FIG. 6B is a diagram illustrating a supporting structure for a piezoelectric film.

It is also conceivable that a portion of the piezoelectric film 35 is supported to be spaced away from the structure 80 in order to prevent the structure 80 from hindering vibration of the piezoelectric film 35. An exemplary supporting structure based on this design concept is shown in FIG. 6B. In a hypothetical piezoelectric speaker 108 shown in FIG. 6B, a frame 88 supports a peripheral portion of the piezoelectric film 35 at a position distant from the structure 80.

It is easy to ensure a sufficient volume of sound emitted from a piezoelectric film already curved and fixed in one direction. Accordingly, it is conceivable that, for example, in the piezoelectric speaker 108, a nonuniformly thick interposed object having a convex upper surface is disposed in a space 48 surrounded by the piezoelectric film 35, the frame 88, and the structure 80 and a central portion of the piezoelectric film 35 is pushed upward. However, such an interposed object is not joined to the piezoelectric film 35 so as not to hinder vibration of the piezoelectric film 35. Accordingly, even with the interposed object disposed in the space 48, it is only the frame 88 that supports the piezoelectric film 35 so as to determine vibration of the piezoelectric film 35.

As described above, the piezoelectric speaker 108 shown in FIG. 6B employs the supporting structure locally supporting the piezoelectric film 35. On the other hand, the piezoelectric film 35 of the piezoelectric speaker 10 as in FIG. 6A and the like is not supported at a particular portion. Unexpectedly, the piezoelectric speaker 10 exhibits practical acoustic characteristics in spite of the fact that the entire surface of the piezoelectric film 35 is fixed to the structure 80. Specifically, in the piezoelectric speaker 10, even a peripheral portion of the piezoelectric film 35 possibly vibrates up and down. The piezoelectric film 35 can vibrate up and down as a whole. Accordingly, compared to the piezoelectric speaker 108, the piezoelectric speaker 10 has a higher degree of freedom of vibration and is relatively advantageous in achieving good sound emission characteristics.

As described with reference to FIG. 6A, the high degree of freedom of vibration may contribute to formation of the first wave front 16*a* and the second wave front 16*b*. In FIG. 6A, the case where the speaker 10 is the piezoelectric speaker 10 shown in FIG. 15 is illustrated. In FIG. 6A, the first joining layer 51 and the second joining layer 52 are not shown. A high degree of freedom of vibration can be obtained also in the case where the speaker 10 is the piezoelectric speaker 110 shown in FIG. 17.

According to the studies by the present inventors, the interposed layer being a porous body layer and/or a resin layer is suitable for achieving the degree of freedom of vibration. In fact, as shown in FIG. 25 to FIG. 41, in Samples E1 to E17 in which the interposed layer is a porous body layer and/or a resin layer, practical acoustic characteristics are exhibited in spite of the fact that the entire surface of the piezoelectric film 35 is fixed to the supporting member 680. Accordingly, it is considered that even in the case where the piezoelectric speaker 10 in the ANC evaluation system 800 is changed from a different size product of Sample E1 to different size products of Samples E2 to E17, a sound pressure distribution with the same tendency as in FIG. 49A to FIG. 52 appears.

The ANC system 500 according to the present invention can be interpreted as follows:

an ANC system 500 including:

a structure 80; and a speaker 10 attached to the structure 80, wherein the speaker 10 includes a radiation surface 15, a piezoelectric film 35, and an interposed layer 40 (or 140), the interposed layer 40 is disposed between the structure 80 and the piezoelectric film 35, and the interposed layer 40 is a porous body layer and/or a resin layer.

The invention claimed is:

1. An active noise control system comprising:

a structure;

a speaker attached to the structure, wherein the speaker includes a radiation surface, a piezoelectric film, and an interposed layer,
the interposed layer is disposed between the structure and the piezoelectric film, and
the interposed layer is at least one of a porous body layer or a resin layer,
the radiation surface has a first region, a second region, and a third region between the first region and the second region, and
a period appears during which a first wavefront propagates toward a reference axis so as to increase a distance between a first normal line and the first wavefront and during which a second wavefront propagates toward the reference axis so as to increase a distance between a second normal line and the second wavefront, wherein further
the first wavefront is a wavefront formed by the speaker to propagate from the first region,
the second wavefront is a wavefront formed by the speaker to propagate from the second region,
the first normal line is a normal line perpendicular to the first region,
the second normal line is a normal line perpendicular to the second region, and
the reference axis is an axis perpendicular to the third region and extending away from the radiation surface;
a controller, wherein
a certain frequency range is set in the controller,
the controller controls a frequency of sound to be output from the speaker to have a value within the frequency range, wherein further
when a wavelength of sound having an upper limit frequency of the frequency range is defined as a reference wavelength and the radiation surface is viewed in a plan view,
the radiation surface has a first end portion and a second end portion facing each other,
a first margin between the first end portion and an end portion of the structure is 0 or more and ⅓ or less of the reference wavelength, and
a second margin between the second end portion and an end portion of the structure is 0 or more and ⅓ or less of the reference wavelength,
an error microphone;
a reference microphone; and
wherein
the structure is disposed between the reference microphone and the error microphone,
the speaker is disposed between the structure and the error microphone,
the controller further performs feedforward control of controlling sound output from the speaker based on an output signal of the reference microphone and an output signal of the error microphone, and
the controller has at least one amplifier, at least one low-pass filter, at least one analog-to-digital converter, and at least one digital-to-analog converter.

2. The active noise control system according to claim 1, wherein the structure is a plate-like body.

3. An active noise control system comprising:
a structure;
a speaker attached to the structure, wherein
the speaker includes a radiation surface, a piezoelectric film, and an interposed layer,
the interposed layer is disposed between the structure and the piezoelectric film, and
the interposed layer is a porous body layer and/or a resin layer,
the radiation surface has a first region, a second region, and a third region between the first region and the second region,
a reference axis is an axis passing through the third region and extending away from the radiation surface, and
the speaker forms a first wavefront propagating from the first region so as to approach the reference axis and also forms a second wavefront propagating from the second region so as to approach the reference axis; and
a controller, wherein
a certain frequency range is set in the controller,
the controller controls a frequency of sound to be output from the speaker to have a value within the frequency range,
when a wavelength of sound having an upper limit frequency of the frequency range is defined as a reference wavelength and the radiation surface is viewed in a plan view, the radiation surface has a first end portion and a second end portion facing each other,
a first margin between the first end portion and an end portion of the structure is 0 or more and ⅓ or less of the reference wavelength, and
a second margin between the second end portion and an end portion of the structure is 0 or more and ⅓ or less of the reference wavelength,
an error microphone;
a reference microphone; and
wherein
the structure is disposed between the reference microphone and the error microphone,
the speaker is disposed between the structure and the error microphone,
the controller further performs feedforward control of controlling sound output from the speaker based on an output signal of the reference microphone and an output signal of the error microphone, and
the controller has at least one amplifier, at least one low-pass filter, at least one analog-to-digital converter, and at least one digital-to-analog converter.

4. An active noise control system comprising:
a structure;
a speaker attached to the structure, wherein
the speaker includes a radiation surface, a piezoelectric film, and an interposed layer,
the interposed layer is disposed between the structure and the piezoelectric film, and
the interposed layer is at least one of a porous body layer or a resin layer,
the radiation surface has a first region, a second region, and a third region between the first region and the second region, and
a period appears during which a first wavefront propagates toward a reference axis so as to increase a distance between a first normal line and the first wavefront and during which a second wavefront propagates toward the reference axis so as to increase a distance between a second normal line and the second wavefront, wherein further
the first wavefront is a wavefront formed by the speaker to propagate from the first region,
the second wavefront is a wavefront formed by the speaker to propagate from the second region, the first normal line is a normal line perpendicular to the first region, the second normal line is a normal line perpendicular to the second region, and the reference axis is an axis perpendicular to the third region and extending away from the radiation surface;

a controller, wherein a certain frequency range is set in the controller, the controller controls a frequency of sound to be output from the speaker to have a value within the frequency range, and wherein further when a wavelength of sound having an upper limit frequency of the frequency range is defined as a reference wavelength and the radiation surface is viewed in a plan view, the radiation surface has a first end portion and a second end portion facing each other, a first margin between the first end portion and an end portion of the structure is 0 or more and ⅓ or less of the reference wavelength, and a second margin between the second end portion and an end portion of the structure is 0 or more and ⅓ or less of the reference wavelength, an error microphone; and wherein the speaker is disposed between the structure and the error microphone, the controller further performs feedback control of controlling sound output from the speaker based on an output signal of the error microphone, and the controller has at least one amplifier, at least one low-pass filter, at least one analog-to-digital converter, and at least one digital-to-analog converter.

5. An active noise control system comprising:

a structure;

a speaker attached to the structure, wherein the speaker includes a radiation surface, a piezoelectric film, and an interposed layer, the interposed layer is disposed between the structure and the piezoelectric film, and the interposed layer is a porous body layer and/or a resin layer, the radiation surface has a first region, a second region, and a third region between the first region and the second region, a reference axis is an axis passing through the third region and extending away from the radiation surface, and the speaker forms a first wavefront propagating from the first region so as to approach the reference axis and also forms a second wavefront propagating from the second region so as to approach the reference axis; and a controller, wherein a certain frequency range is set in the controller, the controller controls a frequency of sound to be output from the speaker to have a value within the frequency range, when a wavelength of sound having an upper limit frequency of the frequency range is defined as a reference wavelength and the radiation surface is viewed in a plan view, the radiation surface has a first end portion and a second end portion facing each other, a first margin between the first end portion and an end portion of the structure is 0 or more and ⅓ or less of the reference wavelength, and a second margin between the second end portion and an end portion of the structure is 0 or more and ⅓ or less of the reference wavelength, an error microphone; and wherein the speaker is disposed between the structure and the error microphone, the controller further performs feedback control of controlling sound output from the speaker based on an output signal of the error microphone, and the controller has at least one amplifier, at least one low-pass filter, at least one analog-to-digital converter, and at least one digital-to-analog converter.

* * * * *